Figure 14:
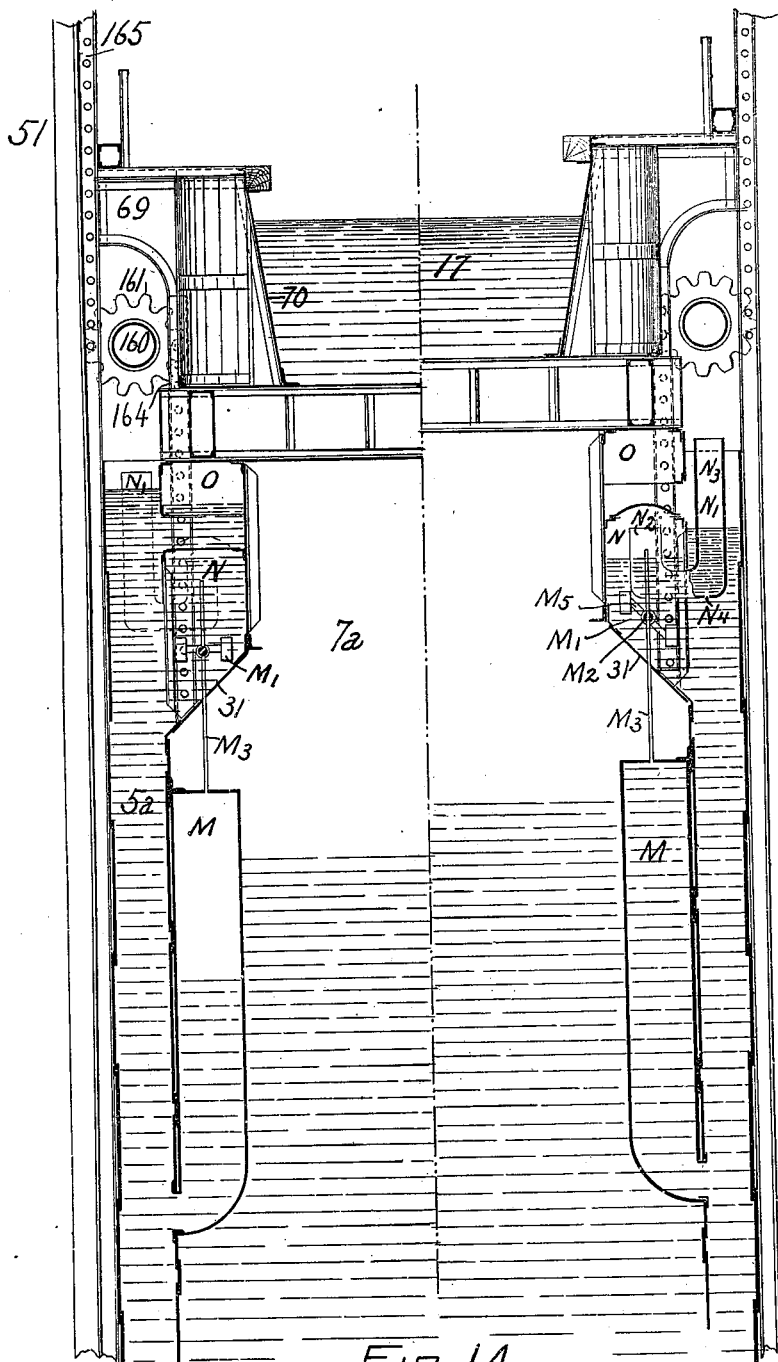

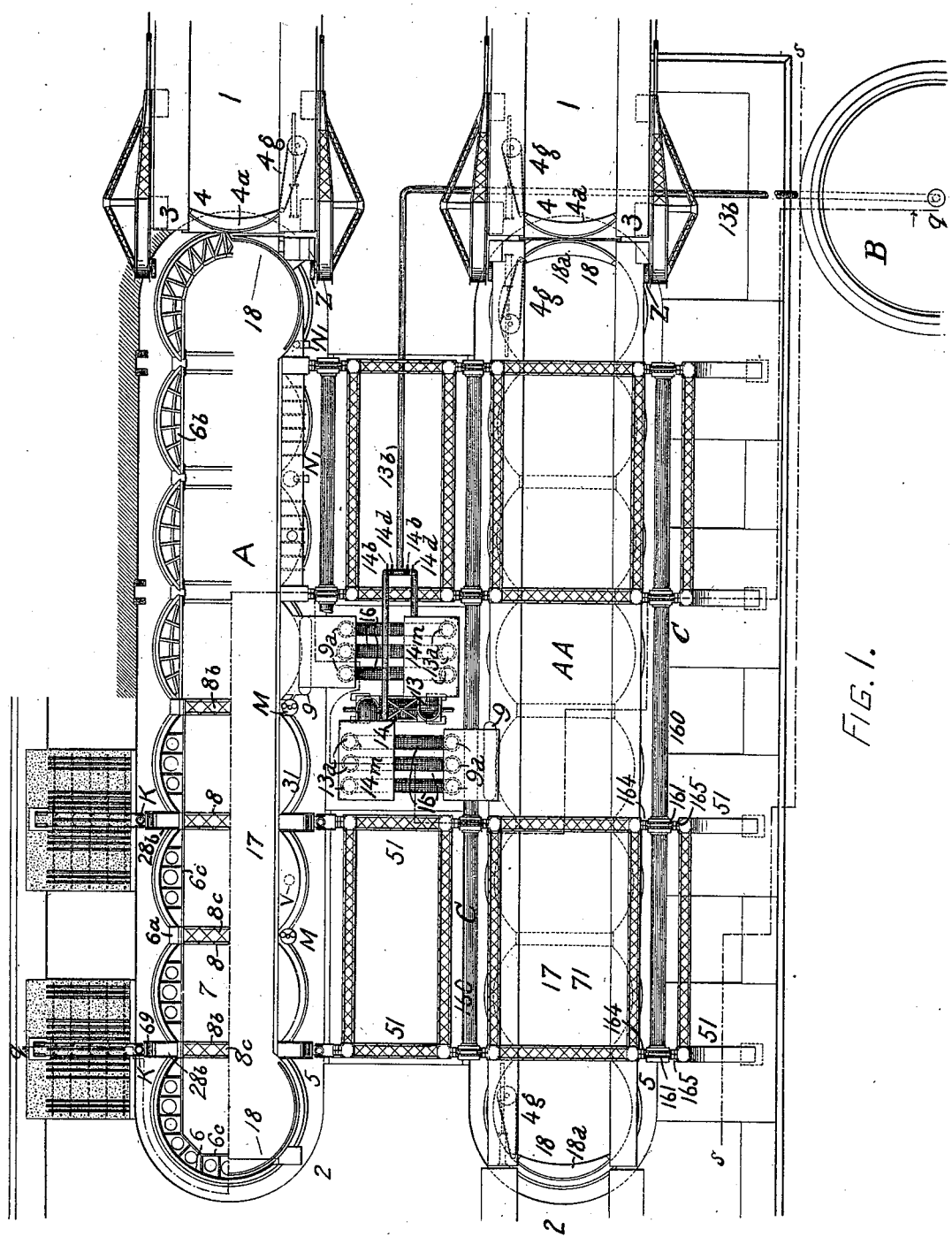

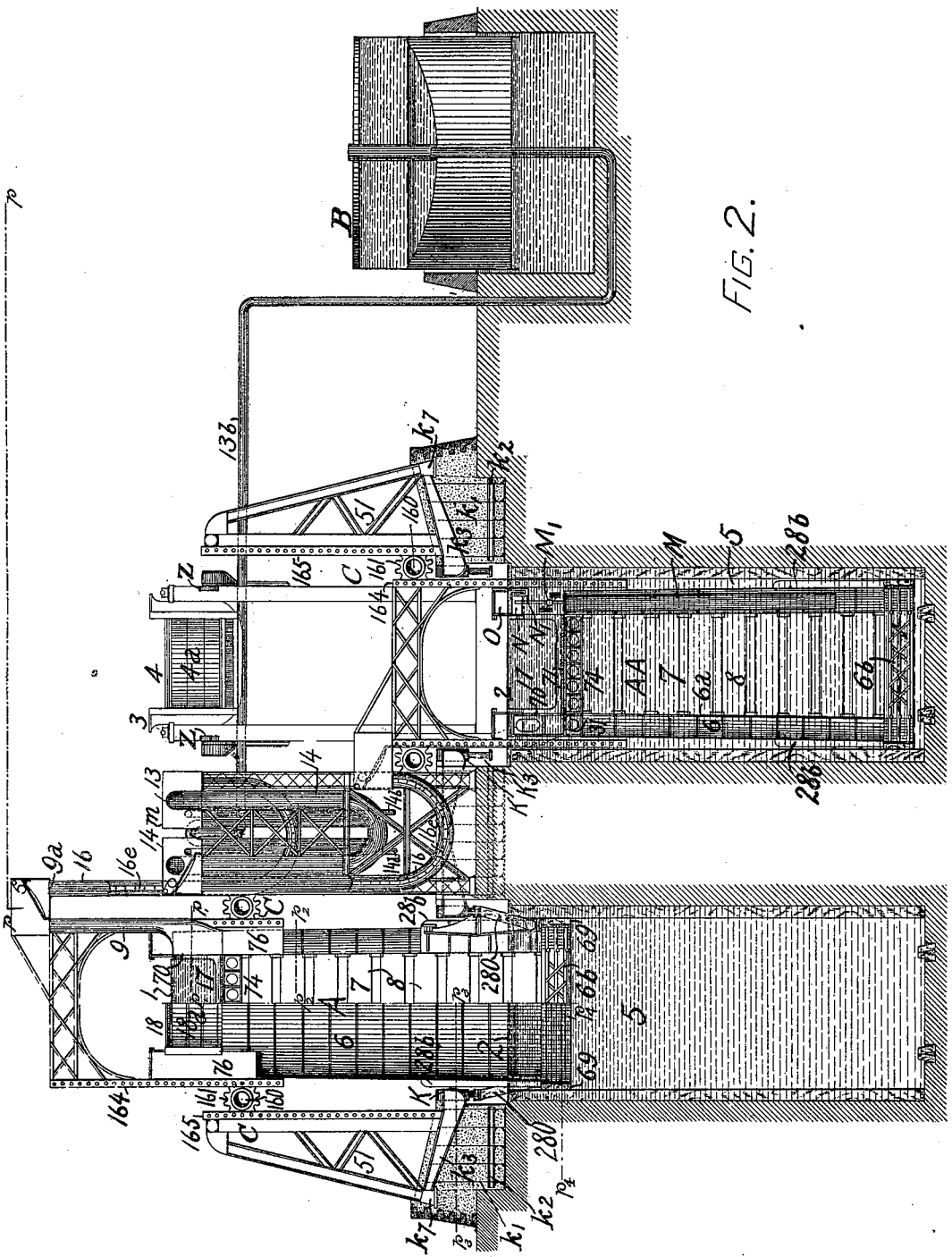

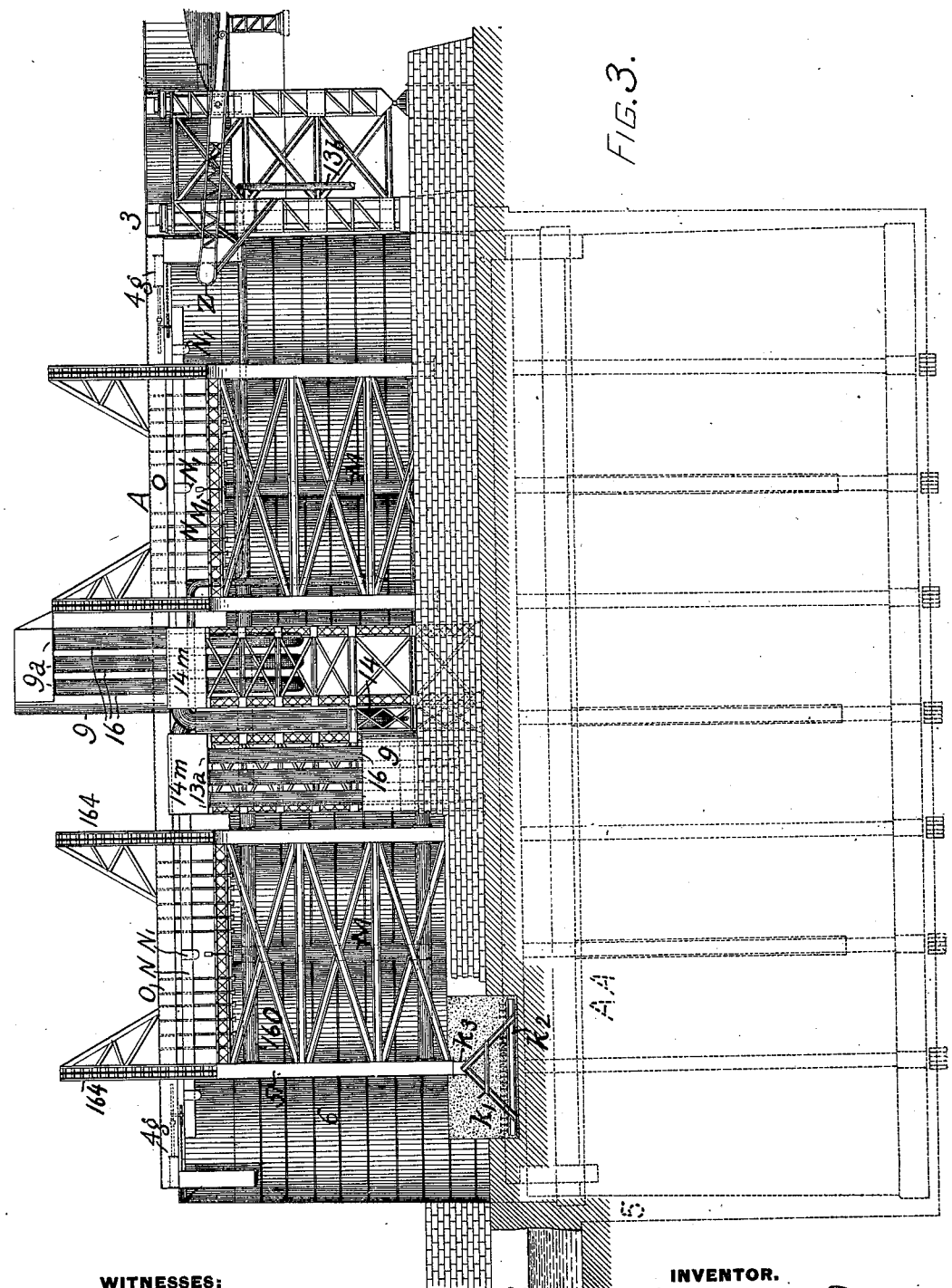

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 4.
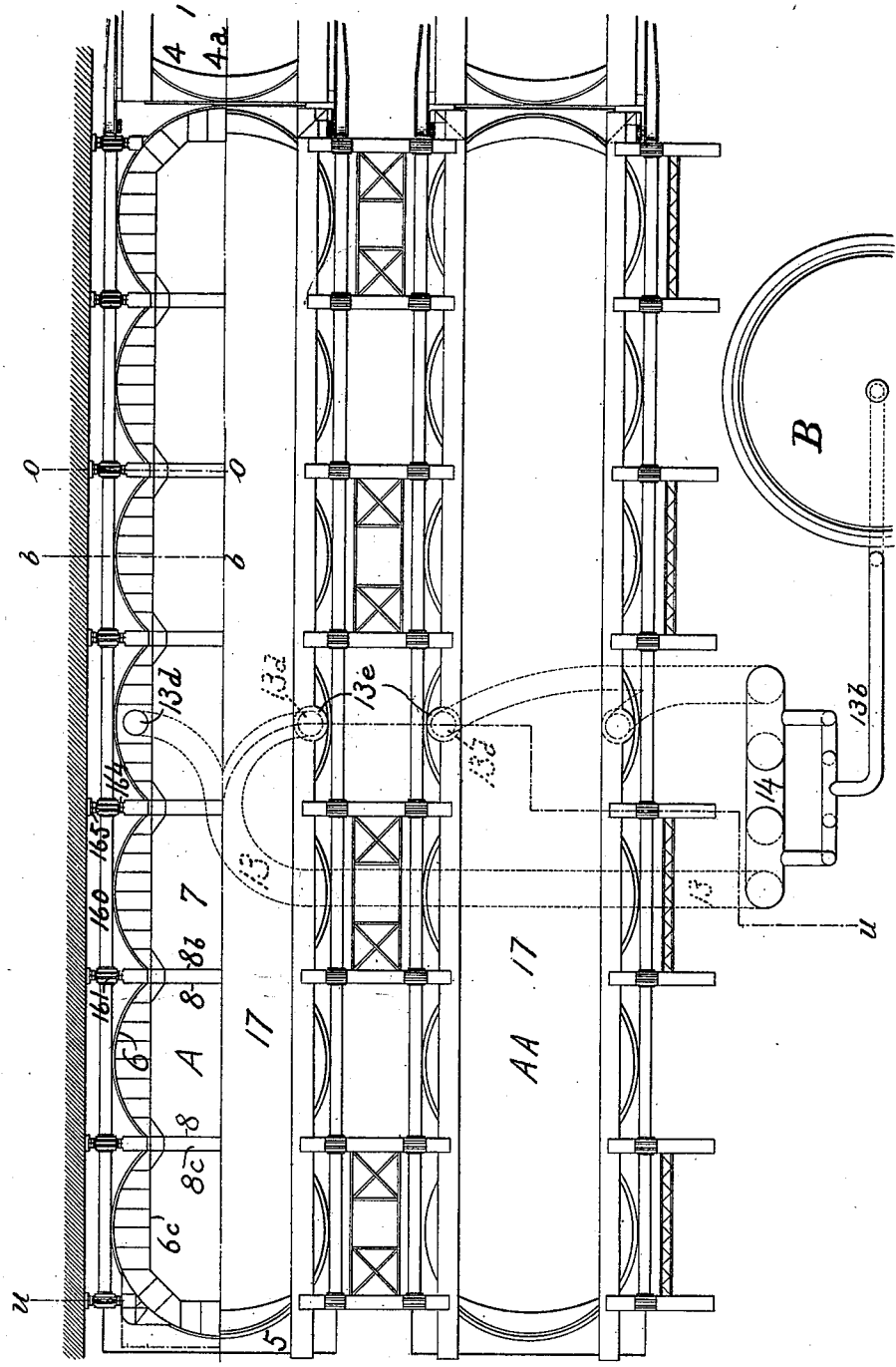

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 5.
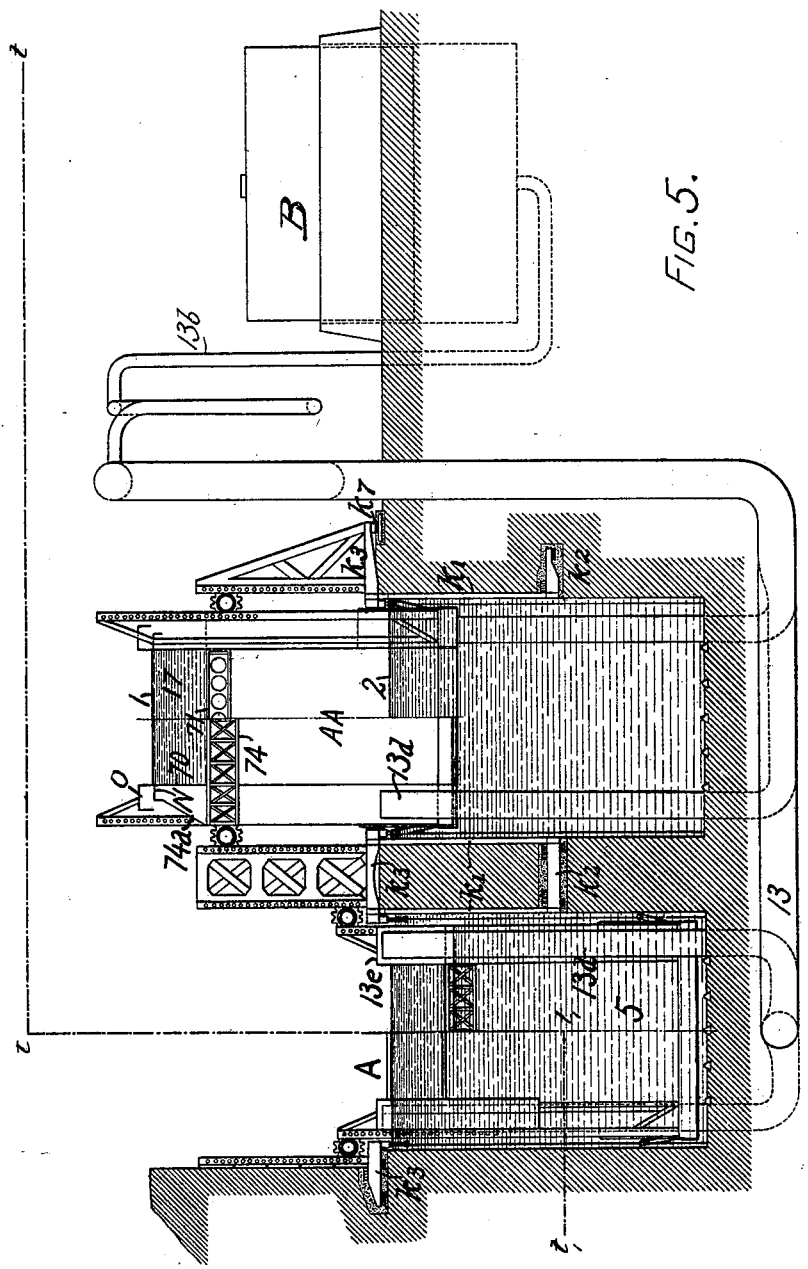
WITNESSES:
INVENTOR.

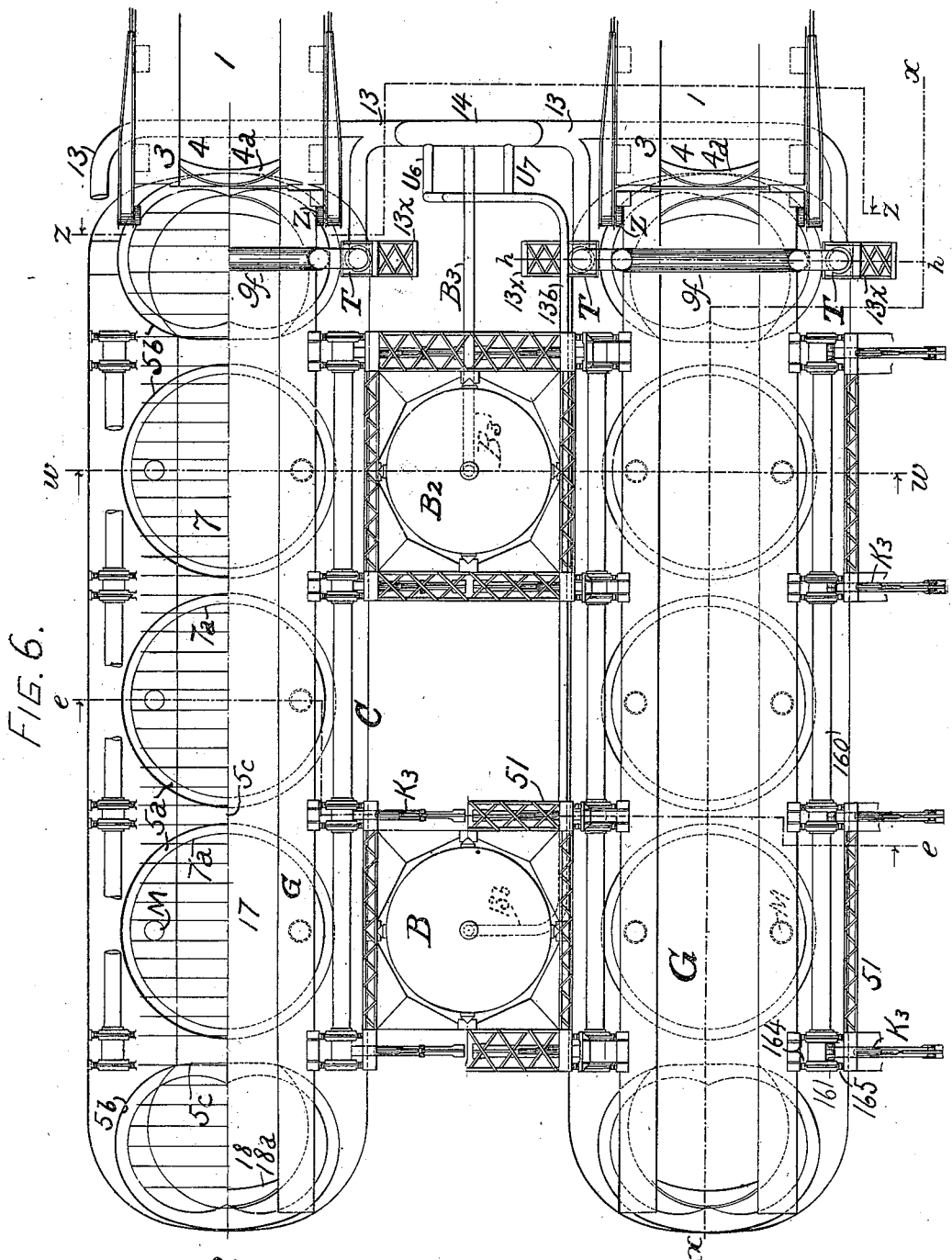

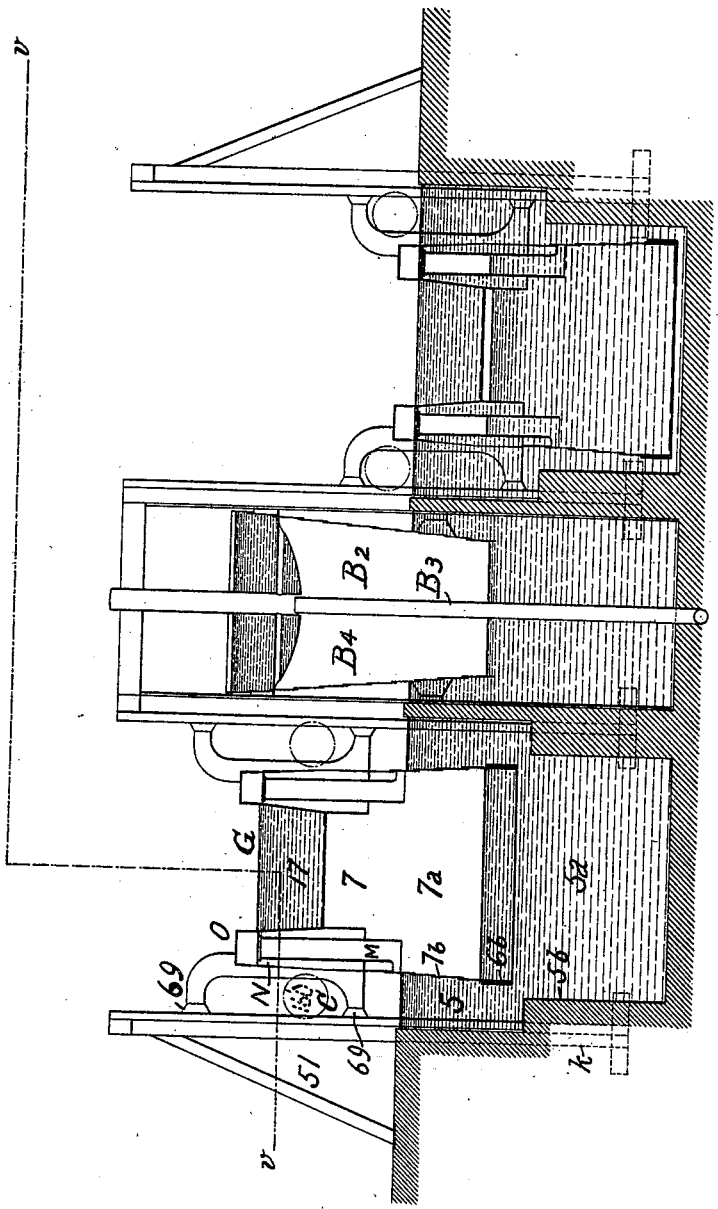

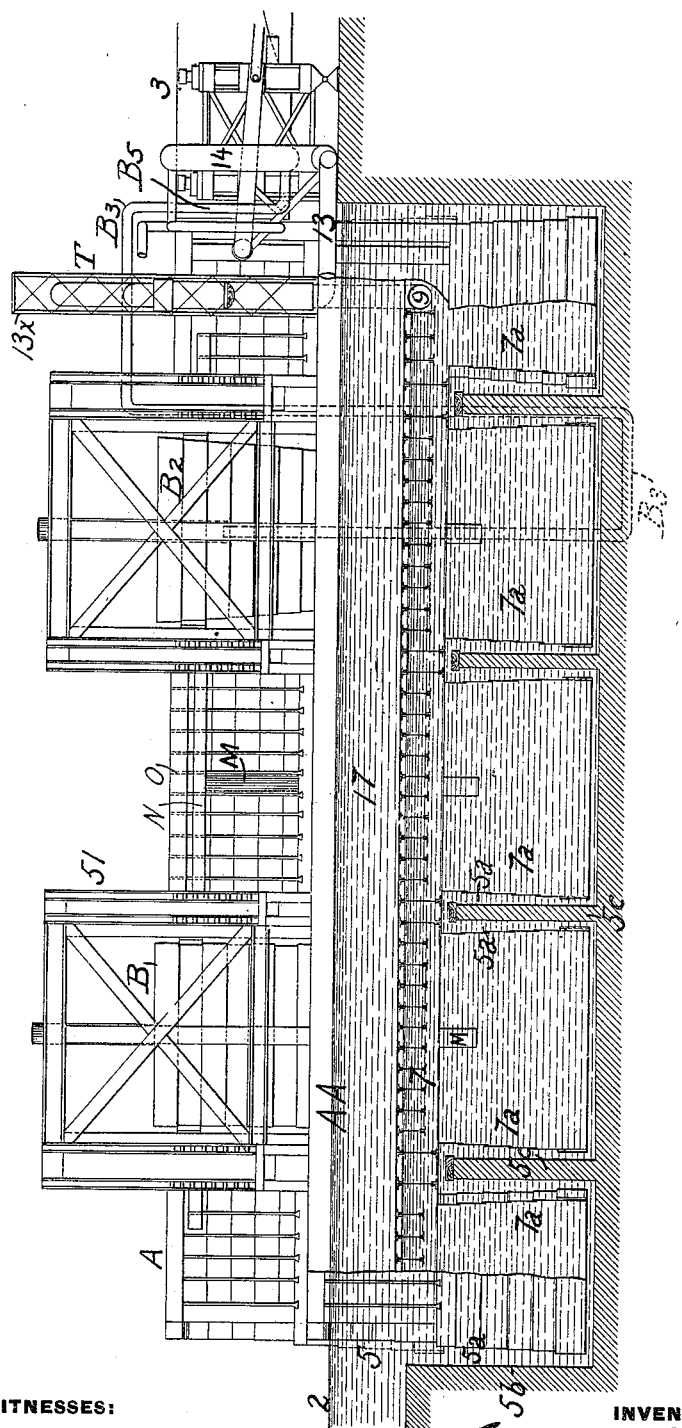

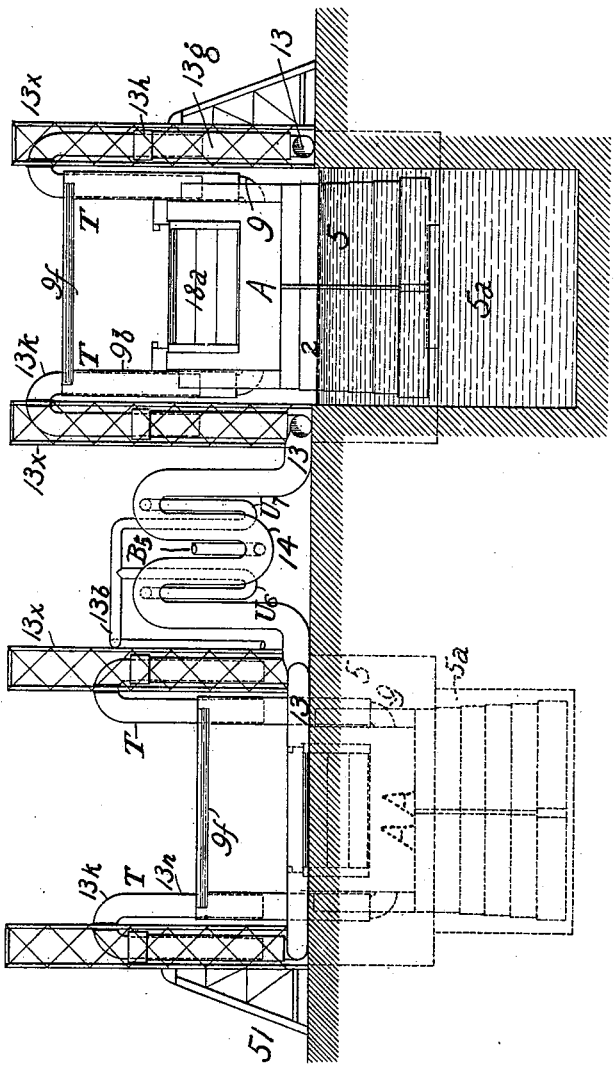

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 10.
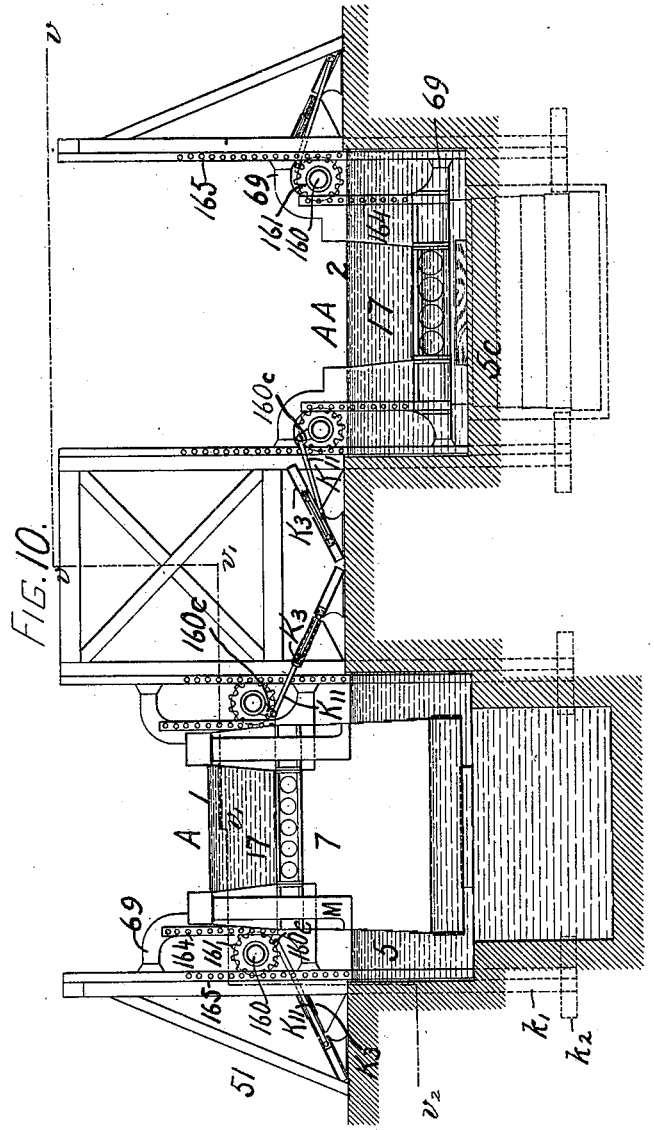
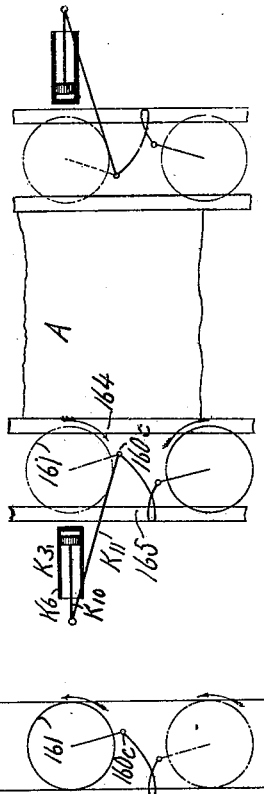
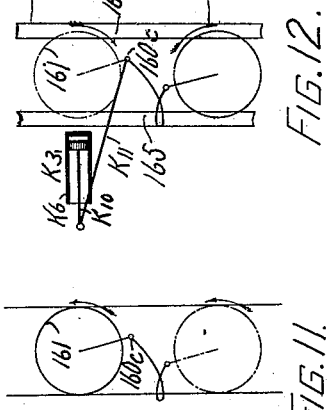
WITNESSES: INVENTOR

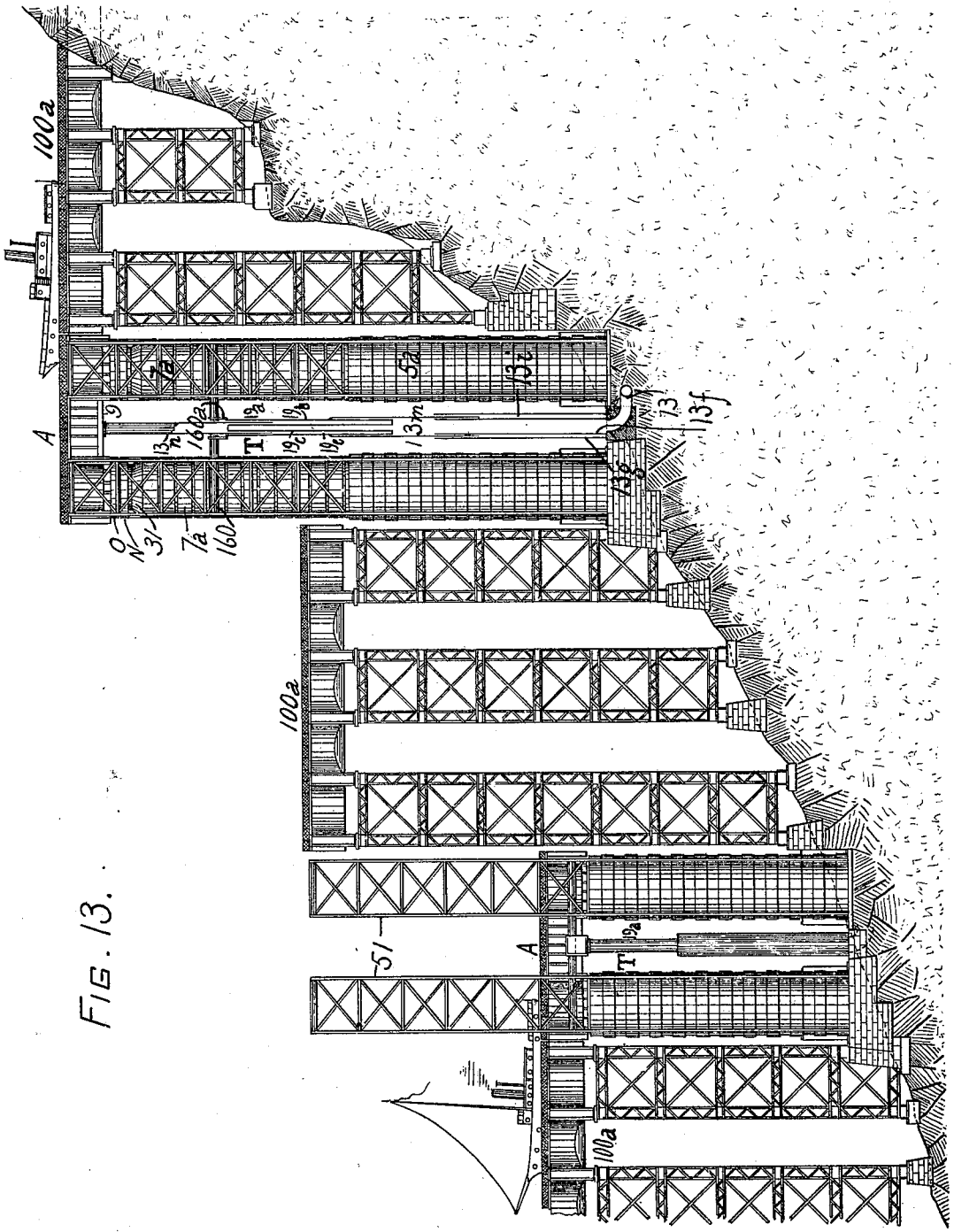

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 13.
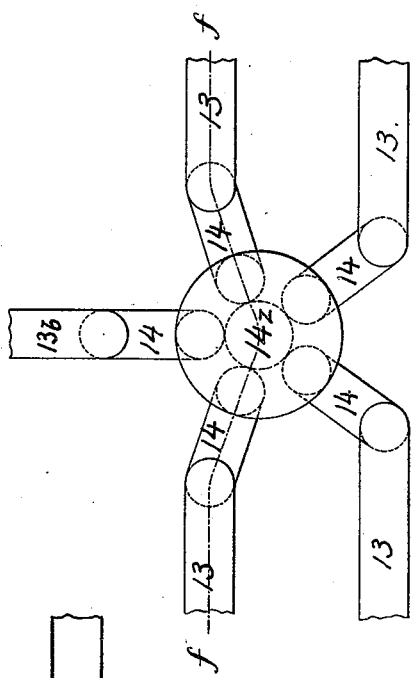
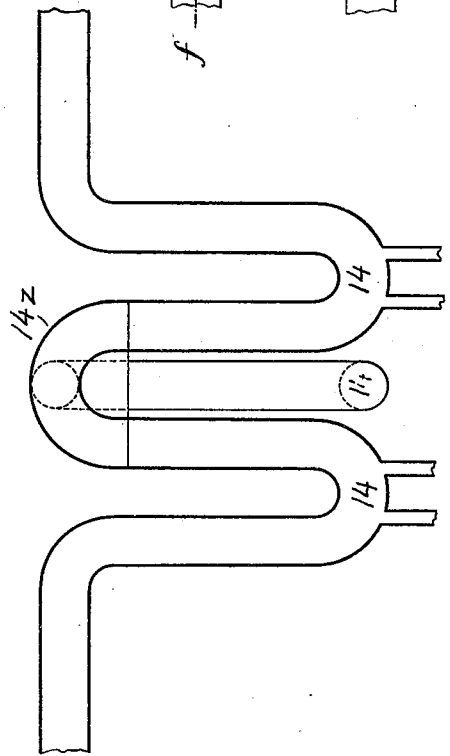
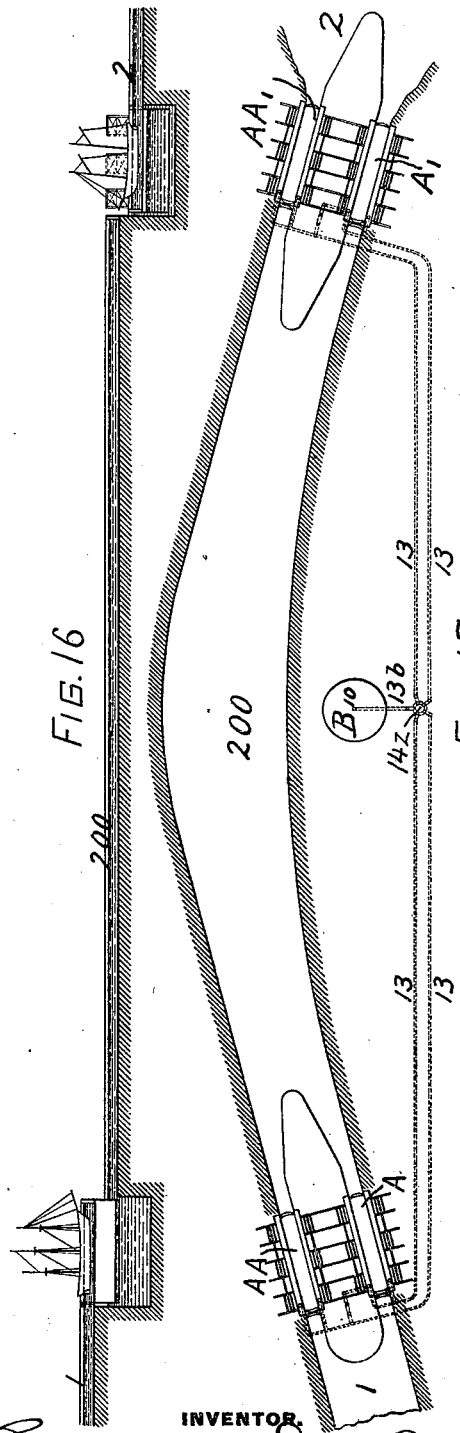
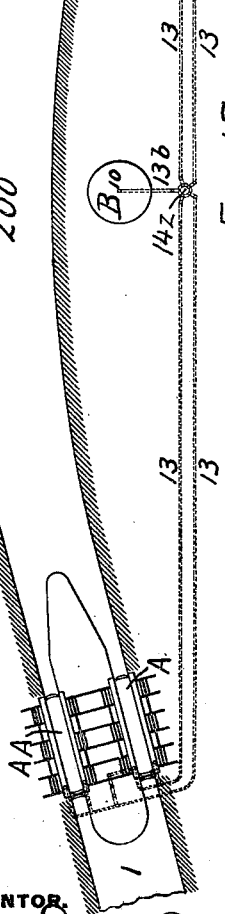
WITNESSES: INVENTOR.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 14.
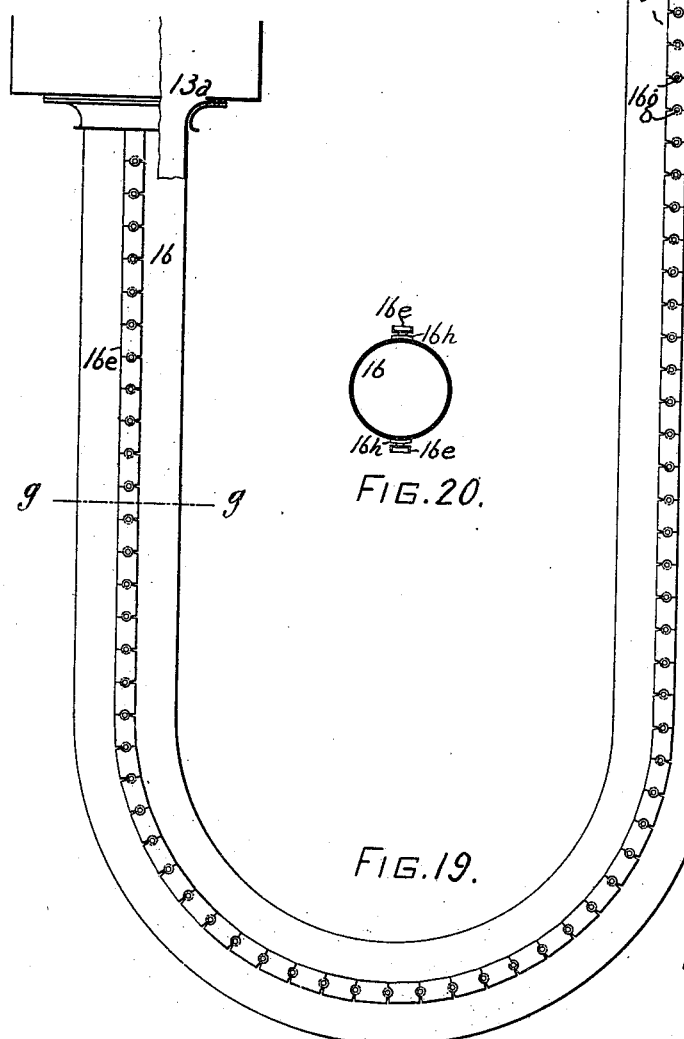
WITNESSES: INVENTOR.
Att'y.
THE NORRIS PETERS CO., PHOTO-LITHO., WASHINGTON, D. C.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 15.
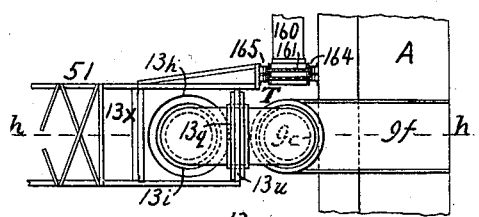
FIG. 26.
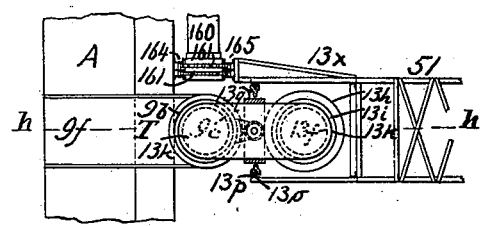
FIG. 27.
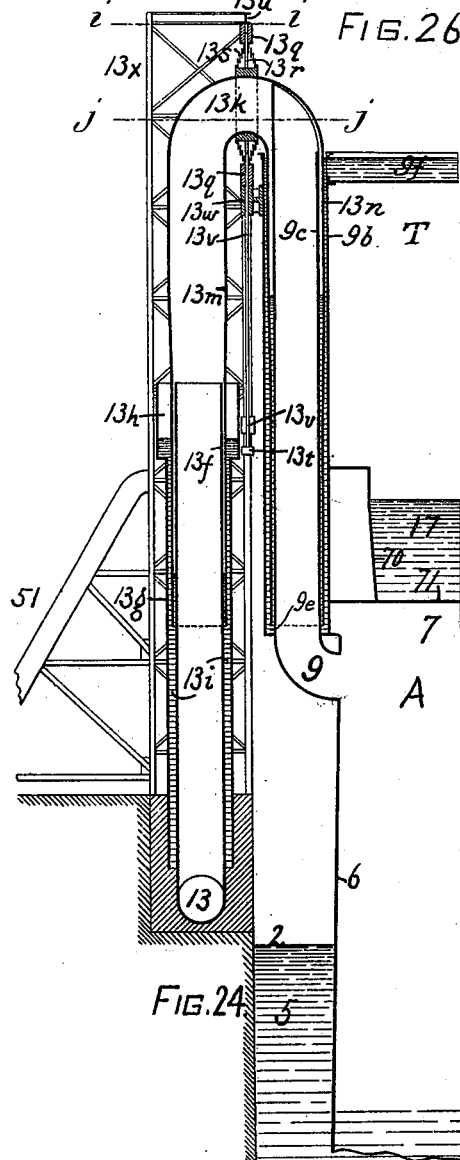
FIG. 24.
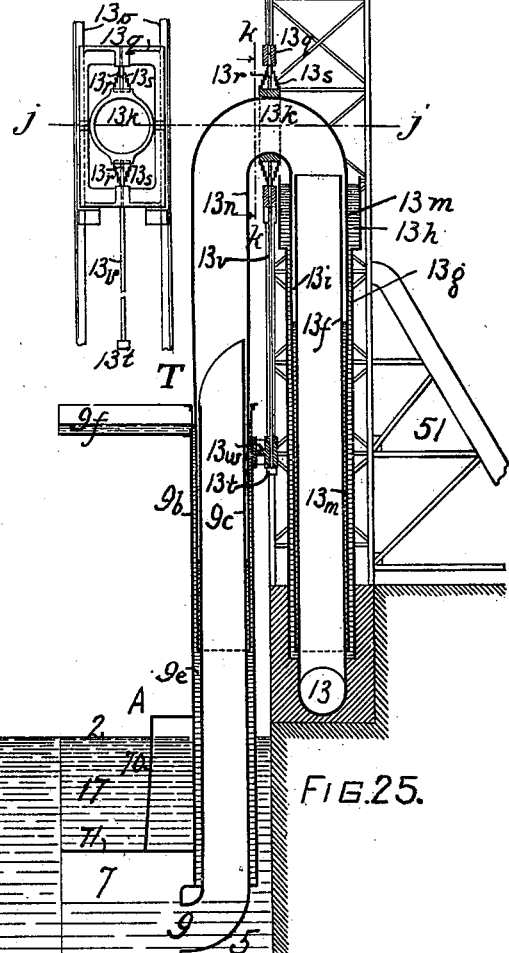
FIG. 28.
FIG. 25.
WITNESSES:
Paul F. Fiebrich
Paul Denrot
INVENTOR
Chauncey N. Dutton
by J. Snowden Bell
Att'y.

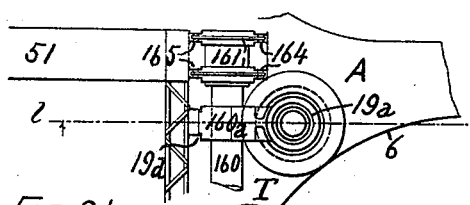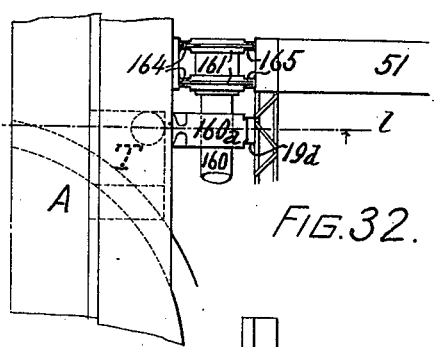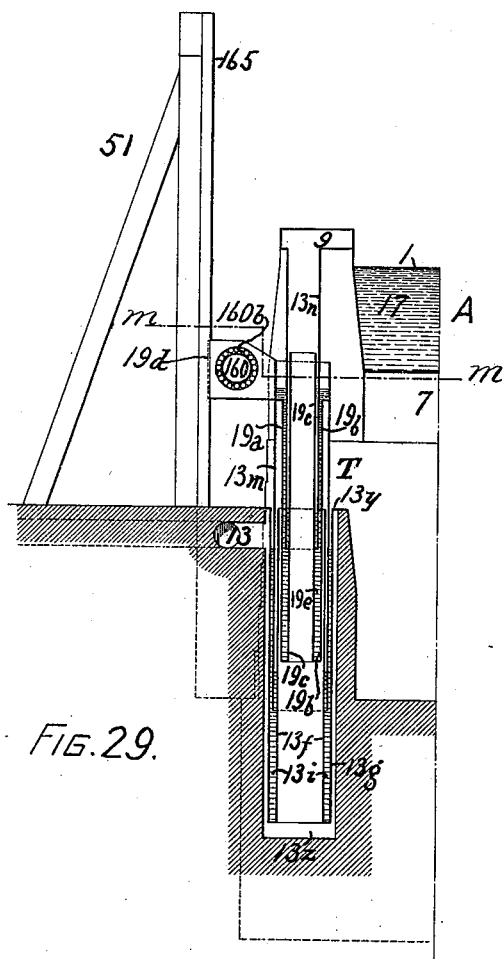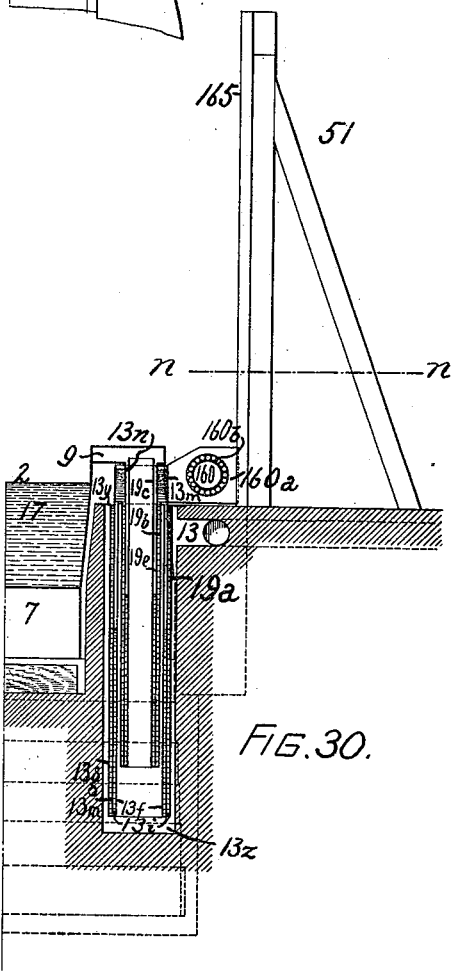

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 17.
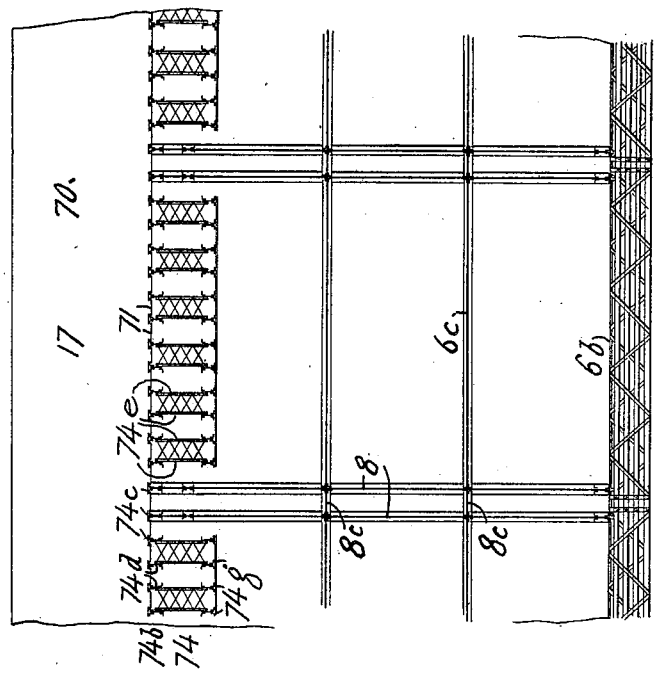
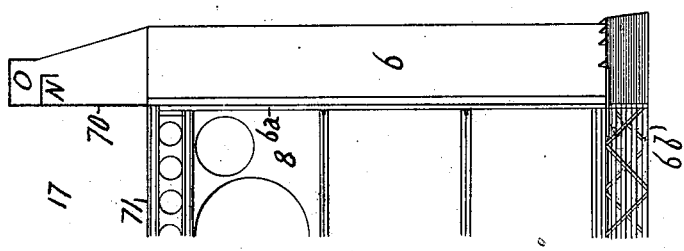
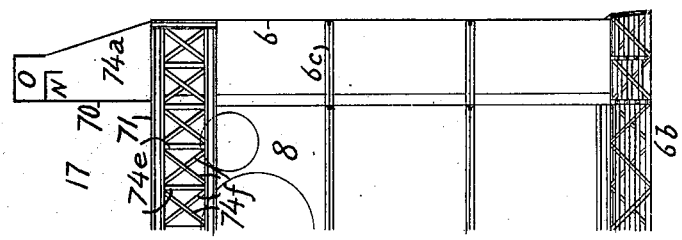
WITNESSES: INVENTOR, No. 665,414. Patented Jan. 8, 1901.
C. N. DUTTON.
PNEUMATIC BALANCE LOCK.
(Application filed Aug. 23, 1898.)
(No Model.) 32 Sheets—Sheet 18.
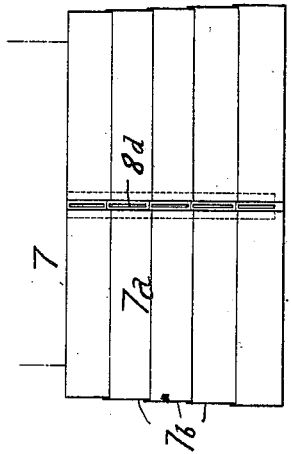
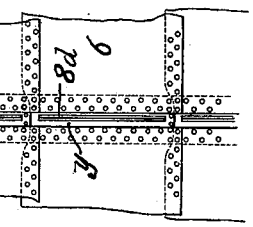
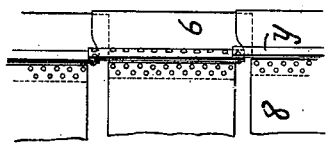
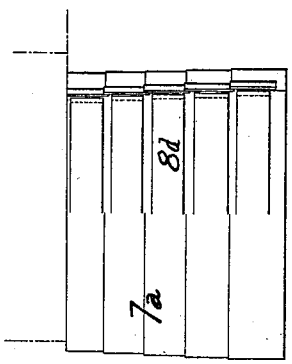
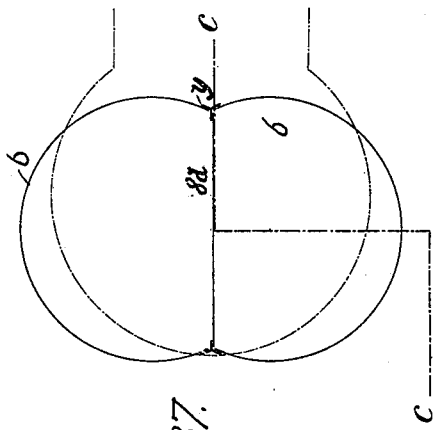
WITNESSES: INVENTOR.

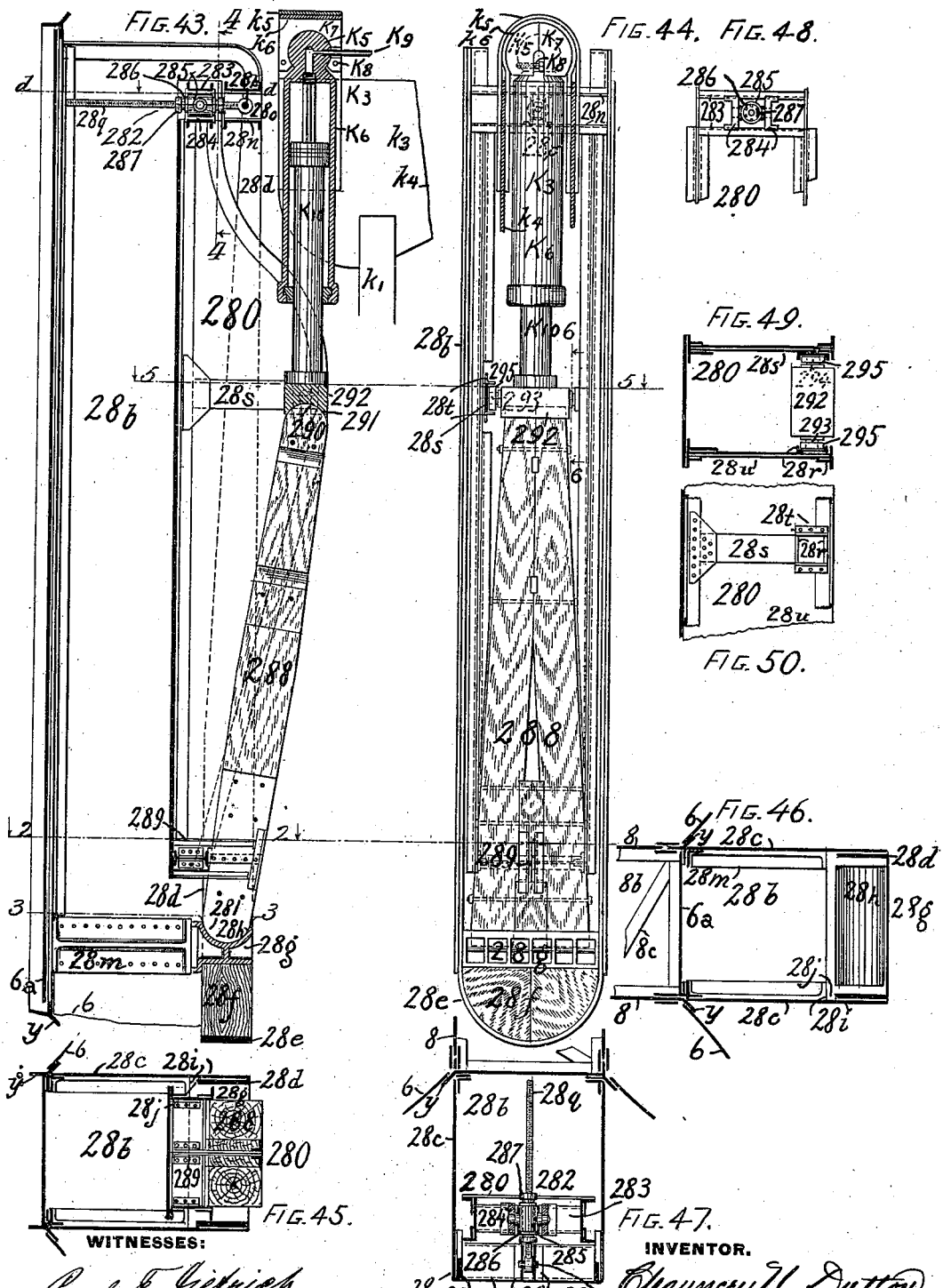

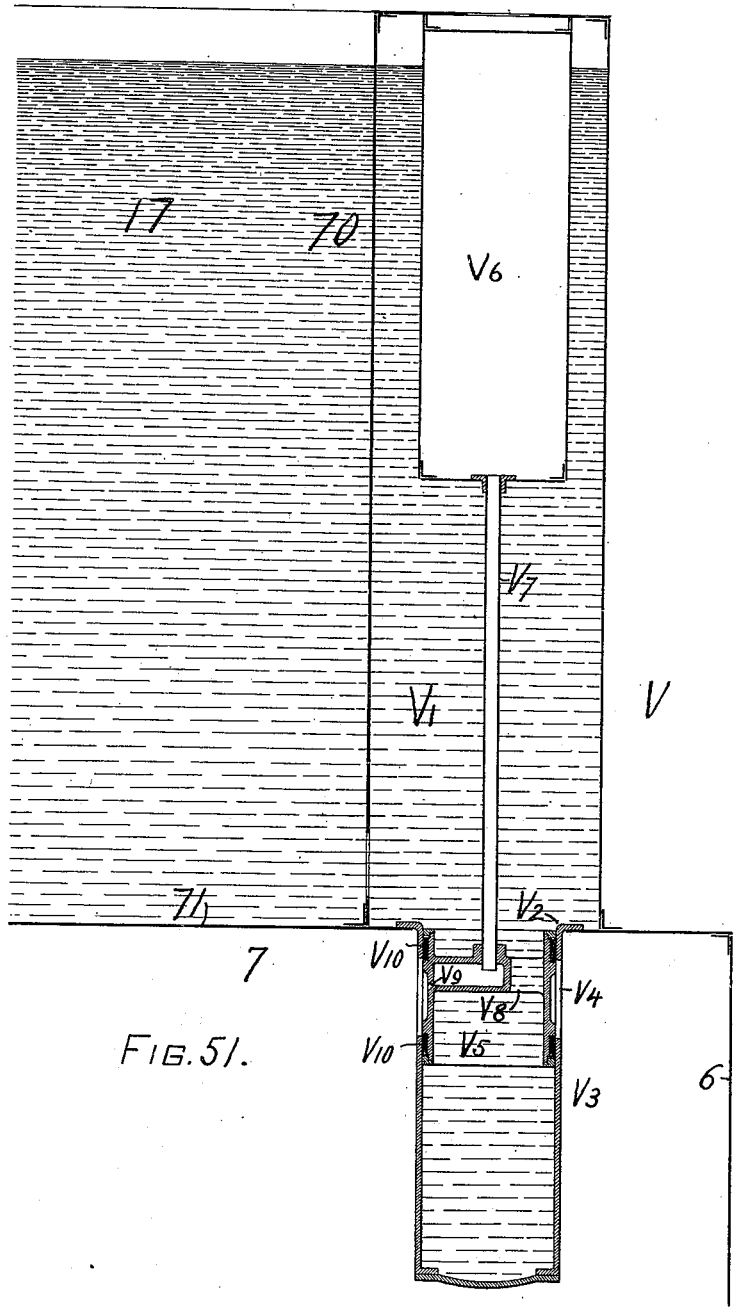

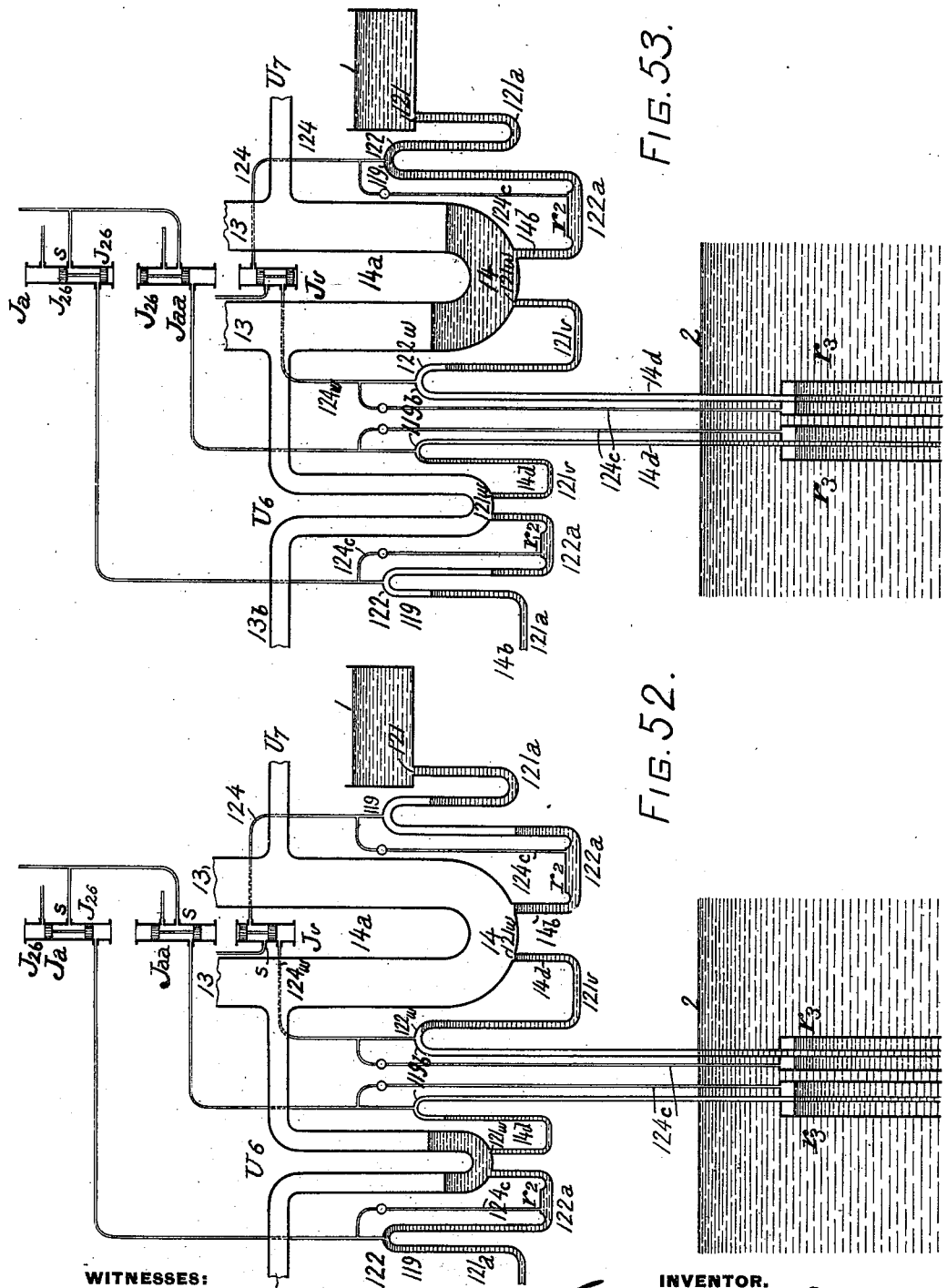

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 22.
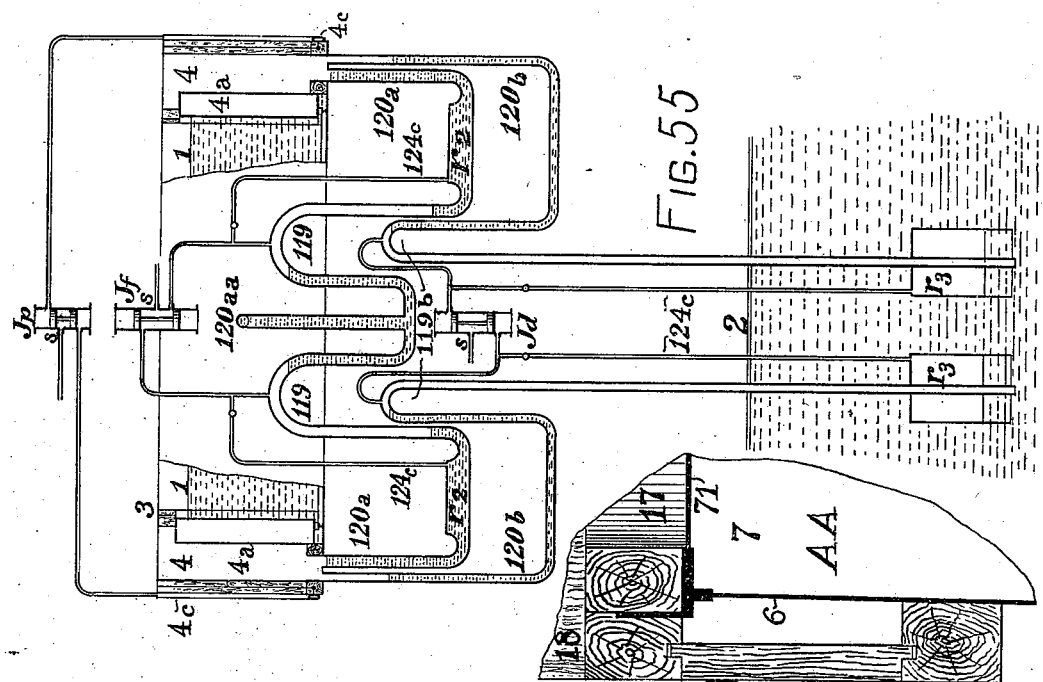
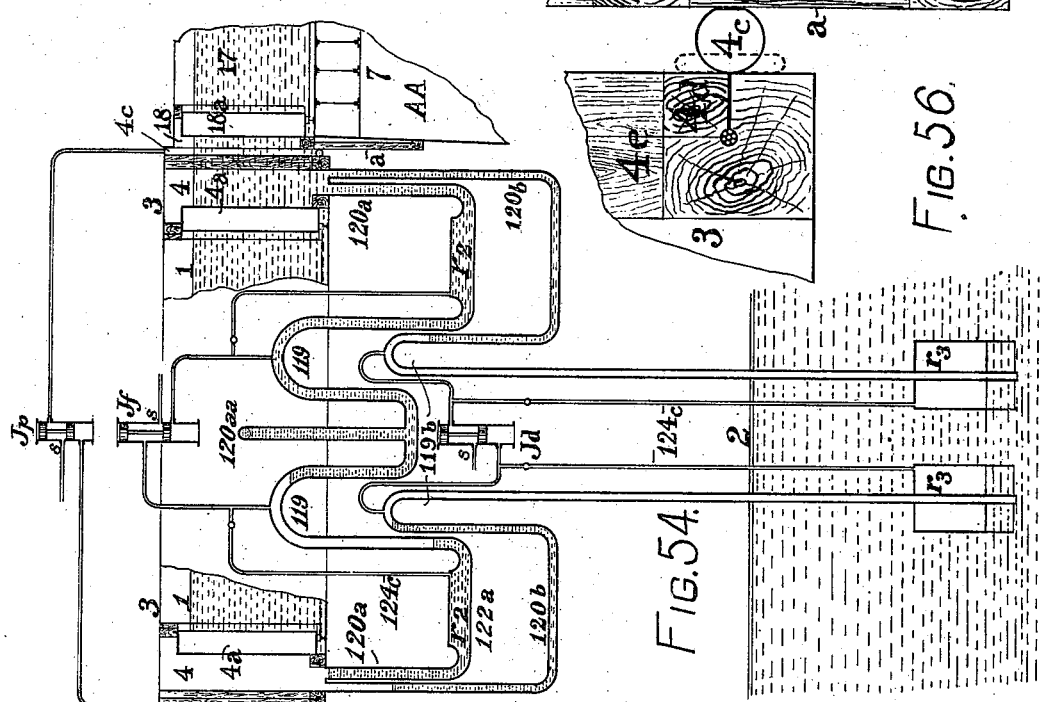
WITNESSES: INVENTOR.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 23.

WITNESSES: INVENTOR.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 24.
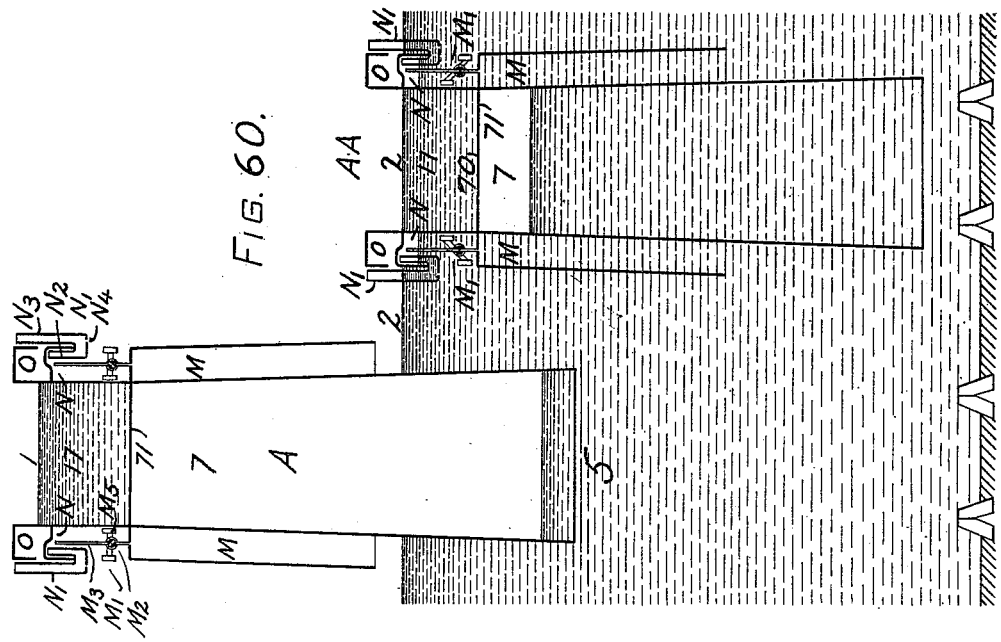
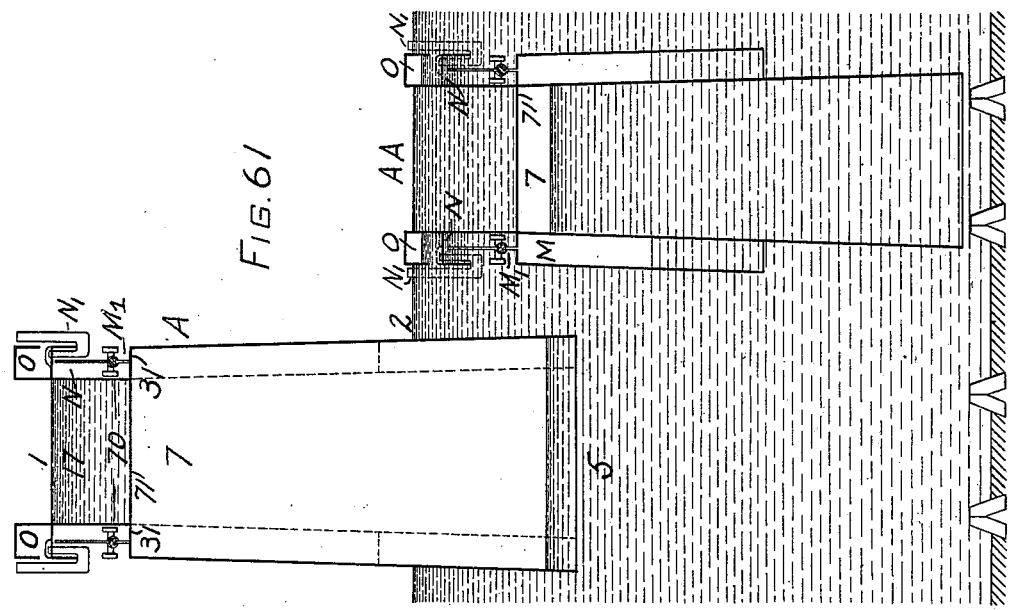
WITNESSES: INVENTOR.
Chauncey N. Dutton
Att'y.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 25.
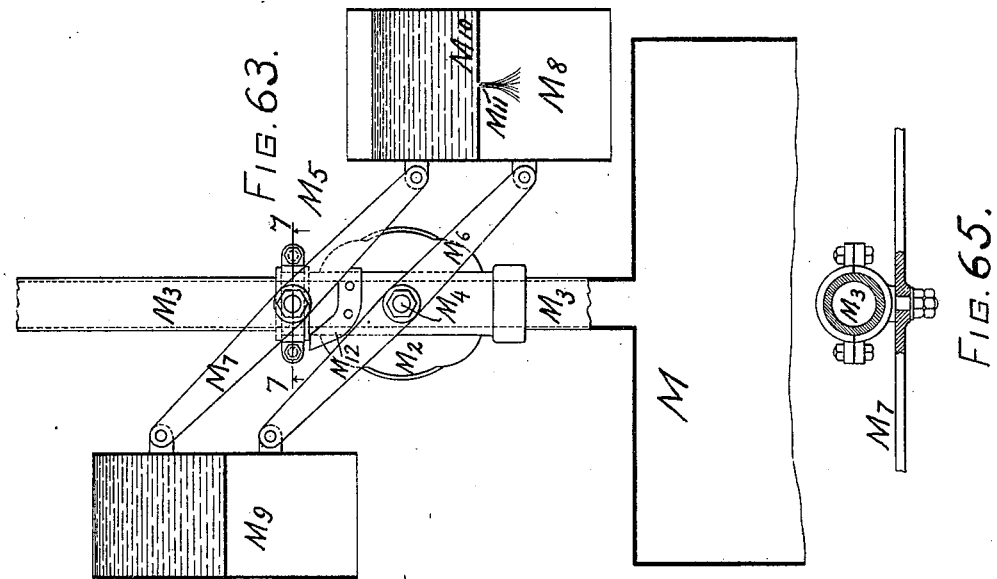
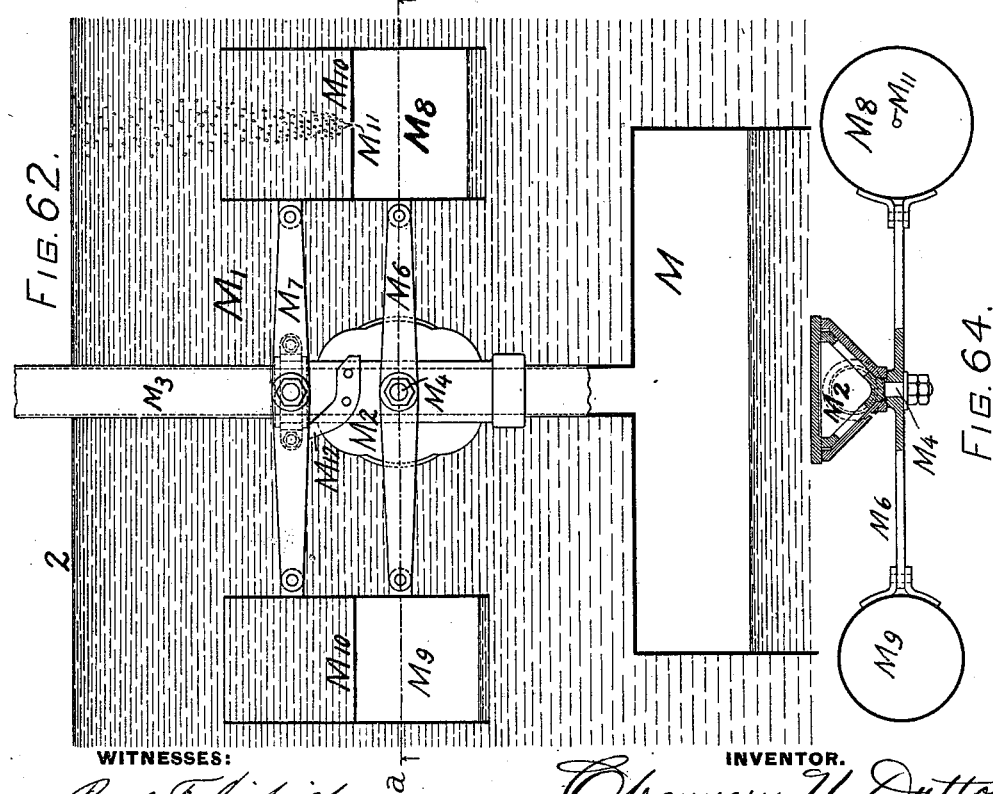

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 26.
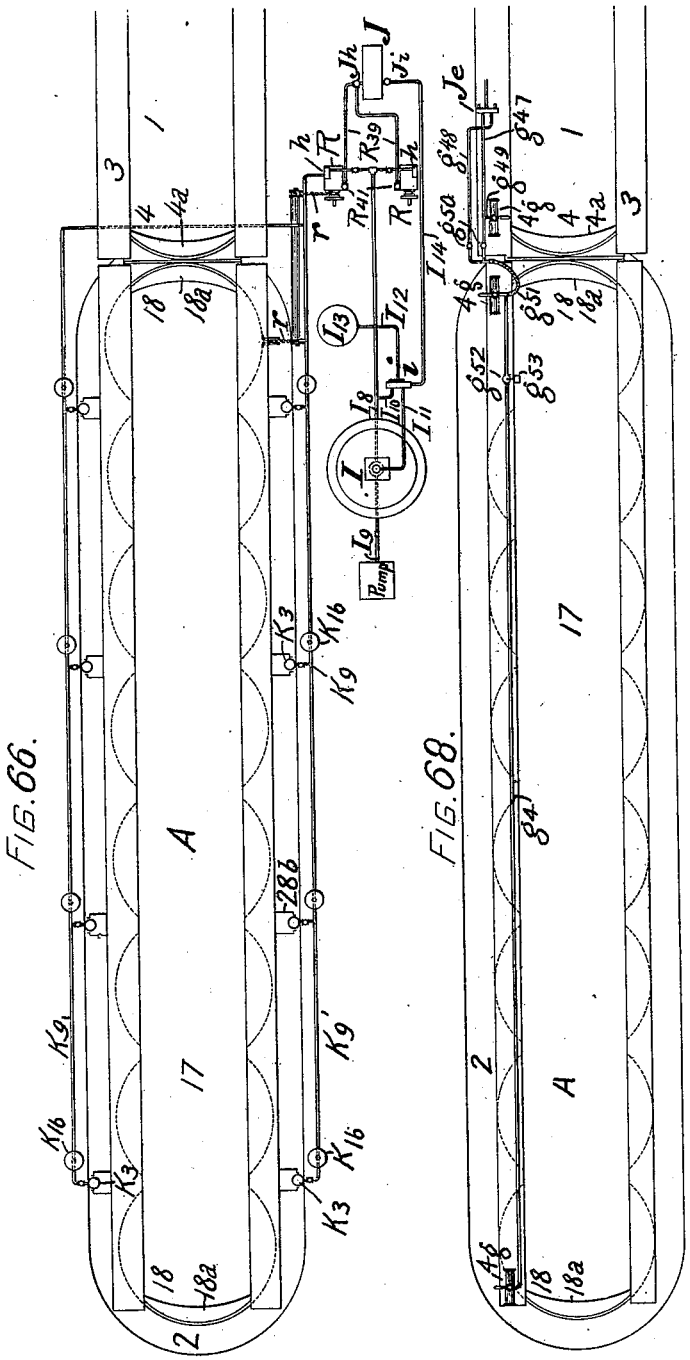
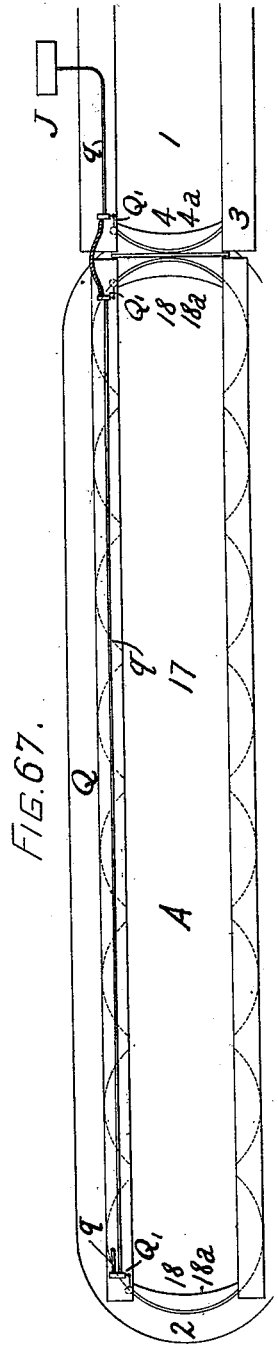
WITNESSES: INVENTOR.

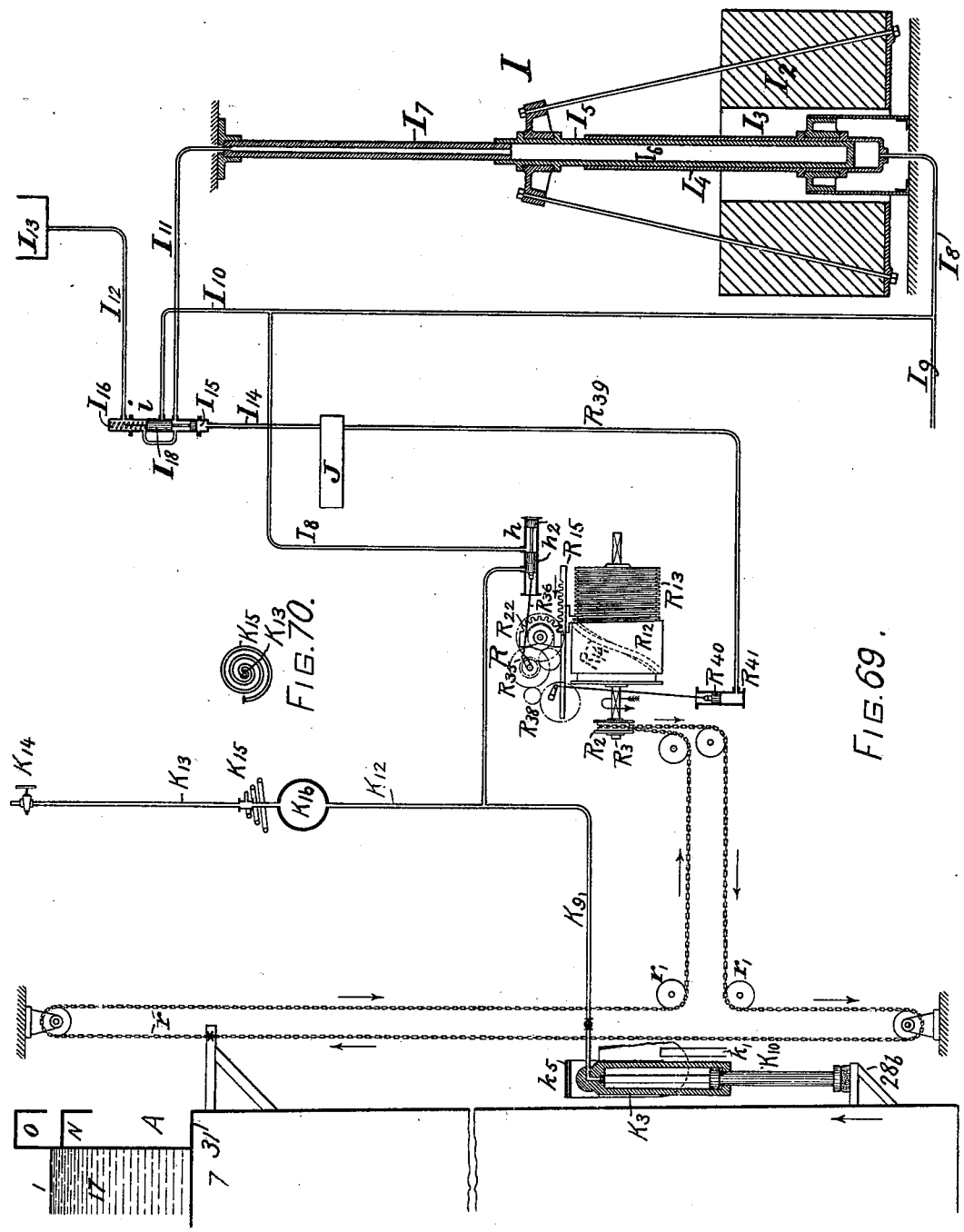

No. 665,414. Patented Jan. 8, 1901.
C. N. DUTTON.
PNEUMATIC BALANCE LOCK.
(Application filed Aug. 23, 1898.)

(No Model.) 32 Sheets—Sheet 28.

WITNESSES: Paul F. Dietrich, Paul Demot

INVENTOR. Chauncey N. Dutton,
by J. Snowden Bell, Att'y.

THE NORRIS PETERS CO., PHOTO-LITHO., WASHINGTON, D. C.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 29.

WITNESSES: INVENTOR.
Paul F. Diebrich Chauncey N. Dutton
Paul Perrot by Snowden Bell
Att'y.

THE NORRIS PETERS CO., PHOTO-LITHO., WASHINGTON, D. C.

No. 665,414. Patented Jan. 8, 1901.
C. N. DUTTON.
PNEUMATIC BALANCE LOCK.
(Application filed Aug. 23, 1898.)
(No Model.) 32 Sheets—Sheet 30.
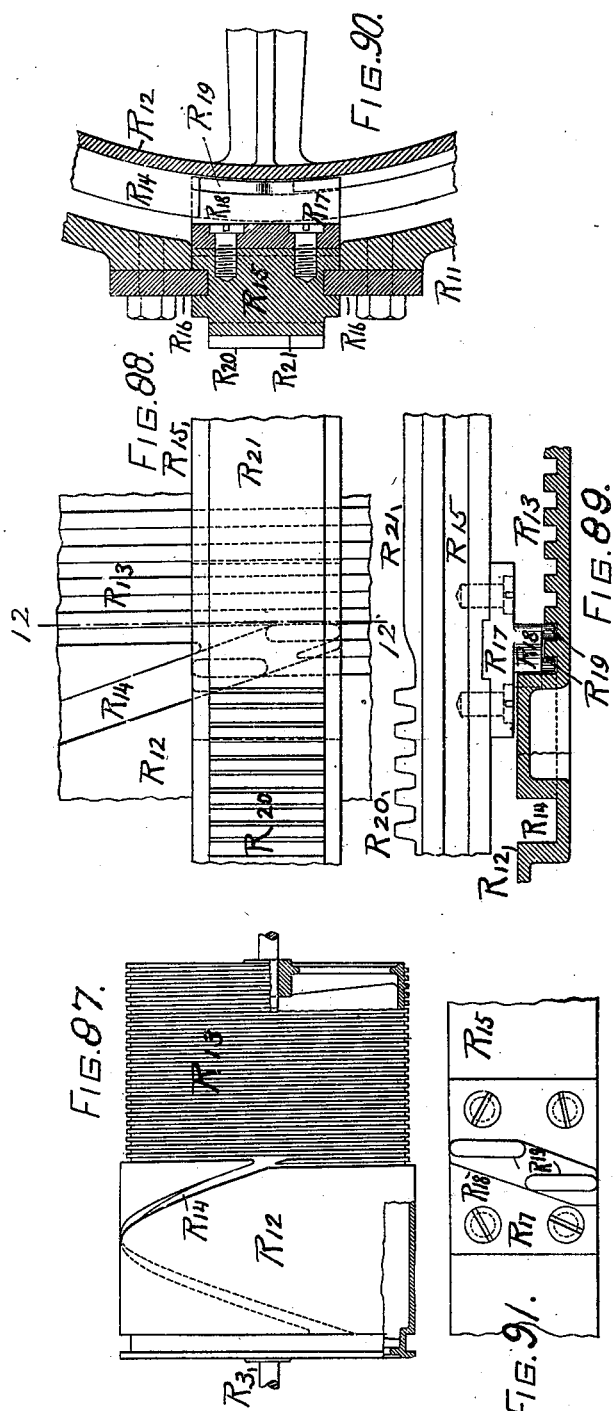

No. 665,414. Patented Jan. 8, 1901.
C. N. DUTTON.
PNEUMATIC BALANCE LOCK.
(Application filed Aug. 23, 1898.)

(No Model.) 32 Sheets—Sheet 31.

WITNESSES: INVENTOR.
Chauncey N. Dutton,
Att'y.

No. 665,414. Patented Jan. 8, 1901.
C. N. DUTTON.
PNEUMATIC BALANCE LOCK.
(Application filed Aug. 23, 1898.)
(No Model.)
32 Sheets—Sheet 32.
FIG. 99
FIG. 100.
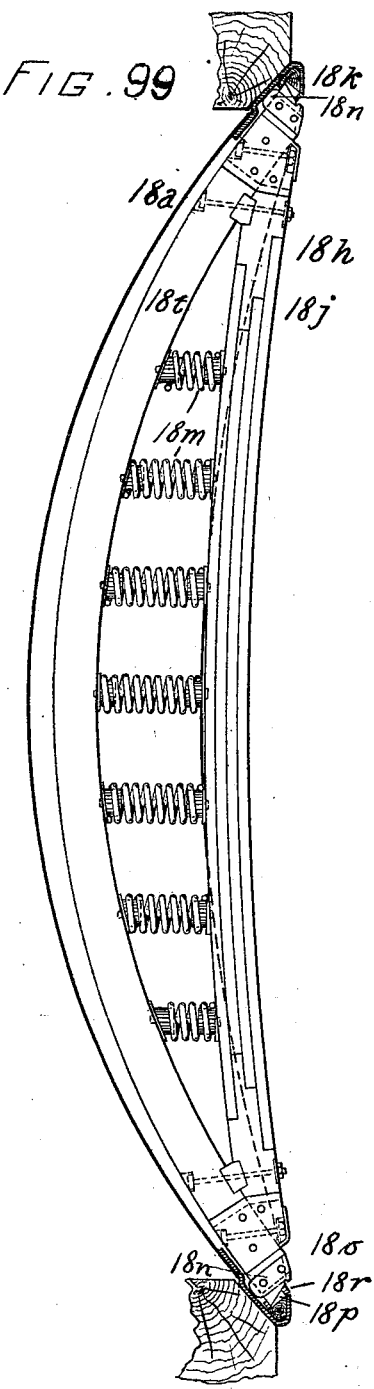
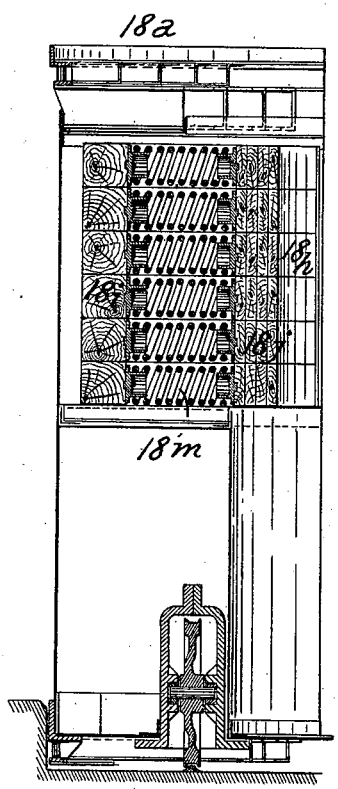
WITNESSES:
INVENTOR.
Att'y.
THE NORRIS PETERS CO., PHOTO-LITHO., WASHINGTON, D. C.

UNITED STATES PATENT OFFICE.

CHAUNCEY N. DUTTON, OF NEW YORK, N. Y.

PNEUMATIC BALANCE-LOCK.

SPECIFICATION forming part of Letters Patent No. 665,414, dated January 8, 1901.

Application filed August 23, 1898. Serial No. 689,276. (No model.)

*To all whom it may concern:*

Be it known that I, CHAUNCEY N. DUTTON, of the city, county, and State of New York, have invented a certain new and useful Improvement in Pneumatic Balance-Locks, of which improvement the following is a specification.

The objects of my invention are to provide pneumatic balance-locks which shall be automatic in their principal functions and at the same time to simplify and facilitate their construction and operation, my improvement being a progressive development of the principles of the pneumatic balance-lock set forth in Letters Patent of the United States No. 457,528, granted to me August 11, 1891, and Nos. 557,564 and 557,566, each granted to me April 7, 1896.

My present invention especially continues and perfects that of Letters Patent last specified.

As in the Letters Patent above referred to, the locks of my present invention are operated in a balance system, each lock floating and being vertically movable in the water of the lower level of a canal or waterway and having an upper gated lock-chamber and a lower downwardly-opening air-chamber adapted to retain compressed air by "sealing" or permanently immersing its lower walls in the water of the lower level in which it floats; and, as set forth in Patent No. 557,566, the locks are operated on the superbuoyant principle—that is to say, the compressed air in the chamber of the elevated lock is maintained at a pressure considerably in excess of the pressure which would exert a lift in equilibrium with the downward effort of the elevated lock when loaded with its maximum load, the volume and weight of water displaced by the compressed air from the interior of the lower open-bottomed air-chamber exceeding the weight of the loaded lock by a safe working margin—say twenty-five per cent—and the lock being restrained from rising higher than is desired by engagement with stops or anchors which are collectively subject to stress equal to the difference between the total weight and total displacement of the lock. At the same time the depressed lock floats like a pontoon and requires no care, as it automatically varies its displacement, so as to adjust its plane of flotation and to contain within its lock-chamber the draft of water required or desirable therein in the different periods of its cycle of movement.

The locks are restrained from tilting sidewise by fixed guides and from pitching endwise by hollow synchronizing shafts set parallel with the locks and provided with pinions the teeth of which mesh with racks fixed on *terra firma* on one side and on the other side with similar parallel racks fixed to the lock structure, the shaft having no bearings, but hanging loosely on the engaging teeth in its pinions and the racks and rolling when the lock moves, its traverse being one-half the traverse of the lock.

As set forth in Patent No. 557,566, the successful use of the superbuoyant system for operating pneumatic-balance locks contemplated the use of two pneumatic accumulators, one of which was to be connected with the lock when it was elevated and the other when it was being depressed and the load on each of which was to be varied every time the locks were operated, a system involving, structurally, possible objection as to complication in the apparatus, and operatively the introduction of the personal equation to a greater extent than is desirable.

My present invention accomplishes the successful use of the superbuoyant system of operation for pneumatic locks with a single pneumatic accumulator, the load on which is constant and substantially eliminates the personal equation by making the locks automatic in their essential sequential conditions, they being so proportioned as to automatically vary the pressure of the compressed-air charge within them at the proper time and to the proper extent to insure their safe and successful use. It also obviates the necessity for closely regulating the water-levels in the waterway-sections which the locks connect, thus rendering guard-locks and waste-weirs unnecessary and securing the greatest possible economy in the use of water. It has always been wasteful, often difficult, and at times of flood impossible to regulate water-levels in canals within the narrow limits desirable for their efficient operation as now generally constructed. The apparatus herein described accomplishes the greatest possible economy in this particular by its adaptability to have its stroke varied within the limits necessary for the purpose and by the automatic functioning of the locks, which latter is obtained mainly by variations of contour of the body of the movable locking member—to wit, the proper proportioning of the elements thereof. The descending lock automatically varies or regulates its contained air-pressures as it approaches its lowest position and comes to rest and thereafter automatically adjusts its plane of flotation relatively to the water-surface then obtaining in the lower level, (wherever that level may be,) so that it will float at such height that its lock-chamber will contain precisely the draft and weight of water with which it is desired the lock shall ascend, and these functions require no care from the operator further than to see that the apparatus does not become clogged or obstructed. The automatic stopping of the ascending lock when it has reached the upper limit of its stroke is effected by an automatic stop apparatus which is adapted to be adjusted to varying stages of water in the upper level, and the several functions incident to locking vessels are all automatically stopped and some automatically controlled throughout. Thus the interference of the operator with the locks is reduced to adjusting the apparatus, seeing that it is kept clean, and initiating motion, which cannot be initiated out of sequence or when the apparatus is not perfectly ordered for its functions.

In the accompanying drawings, which illustrate an embodiment of my invention, Figure 1 is a plan view showing a lock installation adapted to moderate sizes and high lifts where the excavation is in rock, the figure showing views at the horizontal planes $p$ $p$ $p'$ $p'$ $p^2$ $p^2$ $p^3$ $p^3$ $p^4$ $p^4$ of Fig. 2. Fig. 2 is a transverse section of the same at the line $q$ $q$ of Fig. 1. Fig. 3 is a side view of the same, partly in section, on the line $s$ $s$ of Fig. 1. Figs. 4 and 5 illustrate a construction adapted to a lock of great size, Fig. 4 being a plan showing views in the horizontal planes $t$ $t$ $t'$ $t'$ of Fig. 5, and Fig. 5 a transverse section on the line $u$ $u$ of Fig. 4. Figs. 6 to 14, inclusive, illustrate a type of construction peculiarly adapted to flights of locks overcoming considerable differences of level in mountainous countries and to soft soils, Fig. 6 being a plan showing views at the planes $v$ $v$, $v'$ $v'$, and $v^2$ $v^2$ of Figs. 7 and 10; Fig. 7, a transverse section on the line $w$ $w$ of Fig. 6; Fig. 8, a longitudinal section and side view on the line $x$ $x$ of Fig. 6; Fig. 9, a transverse section on the line $z$ $z$ of Fig. 6; Fig. 10, a similar section on the line $e$ $e$ of Fig. 6; Figs. 11 and 12, diagrams showing the relation of the motion of the leveling-shaft to the stops or anchors; Fig. 13, a side view of a flight of locks climbing a steep hillside with little work in excavation, and Fig. 14 a transverse section showing a modified construction peculiarly well adapted to such uses. Figs. 15 and 16 illustrate a preferred method of setting and connecting a battery of locks to overcome a considerable lift, Fig. 15 being a plan and Fig. 16 a profile. Figs. 17 and 18 illustrate a preferred arrangement of valves for such a setting, Fig. 17 being a diagrammatic plan, and Fig. 18 a similar section on the line $ff$ of Fig. 17. Figs. 19 to 32, inclusive, illustrate means for making the pneumatic connection between the movable locking member and the air-conduit on *terra firma*, Figs. 19 to 23, inclusive, showing a flexible-tube connection; Figs. 24 to 28, inclusive, a type of hydraulic-seal telescopic-joint connection operative above the lock, and Figs. 29 to 32 a similar connection operative beneath the lock. Fig. 19 is a side view, partly in section, of a flexible tube having side chains of moderate flexibility to prevent it from bending undesirably; Fig. 20, a section on the line $g$ $g$ of Fig. 19; Fig. 21, a front view, and Figs. 22 and 23, respectively, an enlarged side view and a longitudinal section of the chain. In the hydraulic-seal telescopic-pipe connection operative above the lock shown in Figs. 24 to 28, inclusive, Figs. 24 and 25 are sections on the line $h$ $h$ of Figs. 26 and 27, showing, respectively, the relations of the conduit on *terra firma* and the movable conduit-section to the movable locking member when the same is in its high and low positions. Fig. 26 is a view on the line $i$ $i$; Fig. 27, a view on the line $j$ $j$ of Figs. 24, 25, and 28; and Fig. 28, a view on the line $k$ $k$ of Figs. 26 and 27. In the modification of the hydraulic-seal telescopic connection operative below the lock shown in Figs. 29 to 32, inclusive, in which the movable conduit-section is carried on the leveling-shafts, Figs. 29 and 30 are transverse sections on the line 1 1 of Figs. 31 and 32, showing, respectively, the relations of the several parts when the movable locking member is in high and low positions; Fig. 31, a horizontal section at the plane $m$ $m$ of Fig. 29, and Fig. 32 a horizontal view from the plane $n$ $n$ of Fig. 30. Figs. 33 to 36 illustrate details of a lock of the type shown in Figs. 4 and 5, Fig. 33 being a partial plan through one bay of the air-chamber of such a lock; Fig. 34, a partial longitudinal central section; and Figs. 35 and 36, respectively, transverse sections on the lines $o$ $o$ and $b$ $b$ of Figs. 4 and 33. Figs. 37 to 42, inclusive, illustrate details of construction of the end section of the tubulous air-chamber of a lock of the type shown in Figs. 6 to 10, inclusive, Fig. 37 being a plan; Fig. 38, a view on the line $c$ $c$ of Fig. 37; Fig. 39, a section at right angles therewith; and Figs. 40 to 42, inclusive, enlarged detail views showing the means of connecting the curved walls and transverse ties thereof. Figs. 43 to 50, inclusive, illustrate an improved method and apparatus for effecting the engagement of the elevated superbuoyant lock with the stops or anchors, Fig. 43 being a vertical central section; Fig. 44, a face view, partly in section; Fig. 45, a horizontal section on the line 2 2 of Figs. 43 and 44; Fig.

Figures 57, 58, 59:
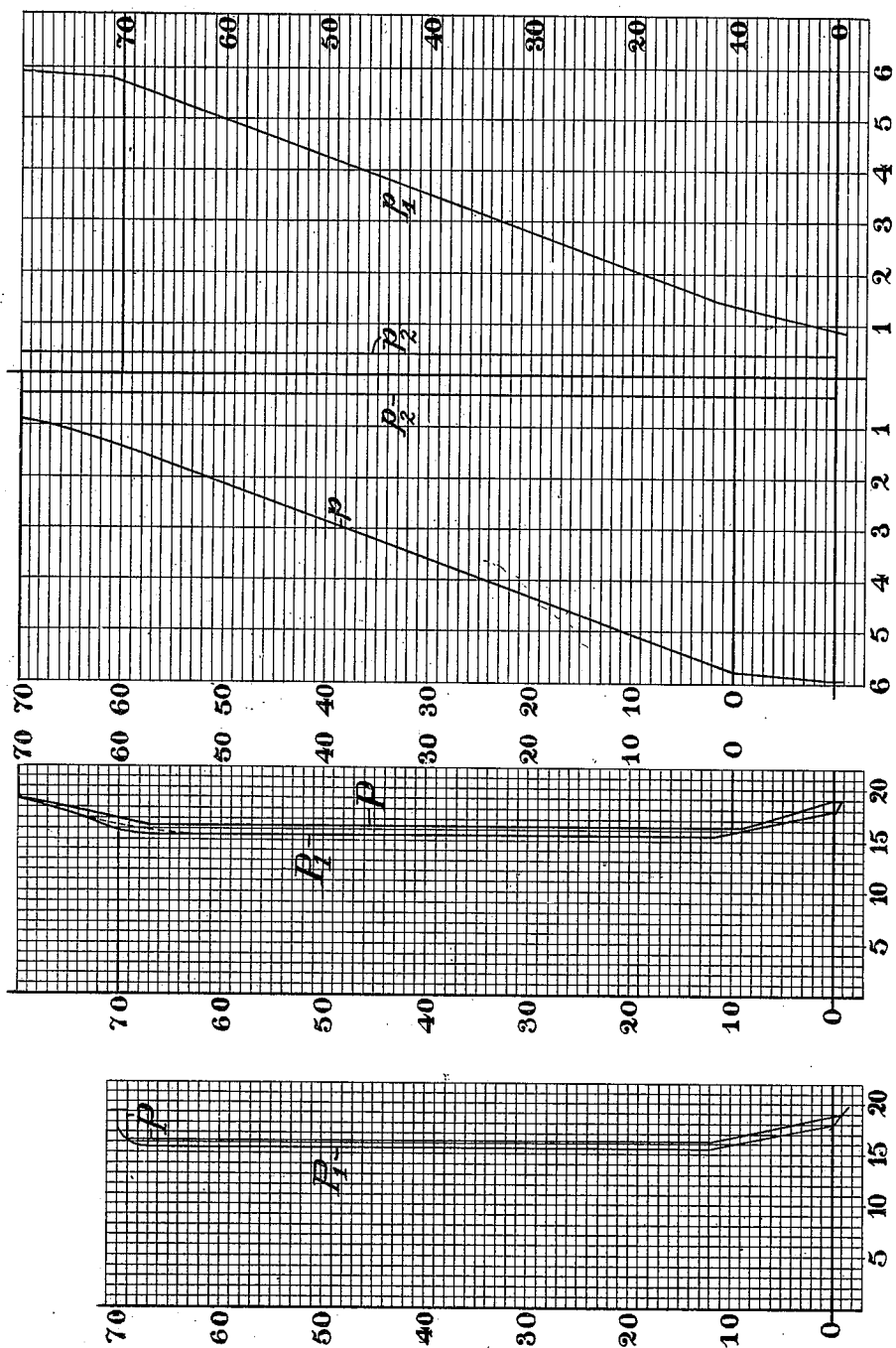
Figure 72:
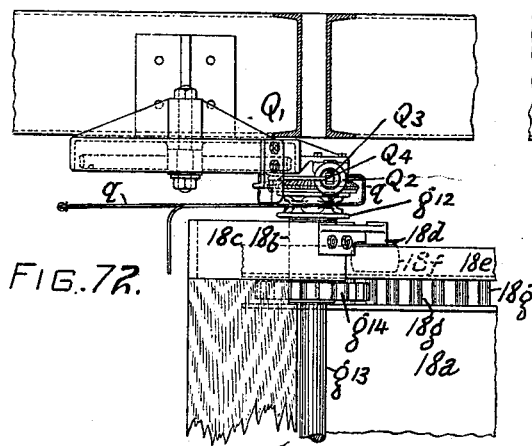
Figure 73:
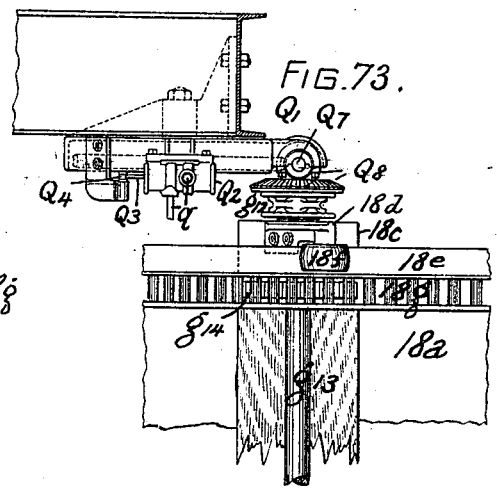
Figure 71:
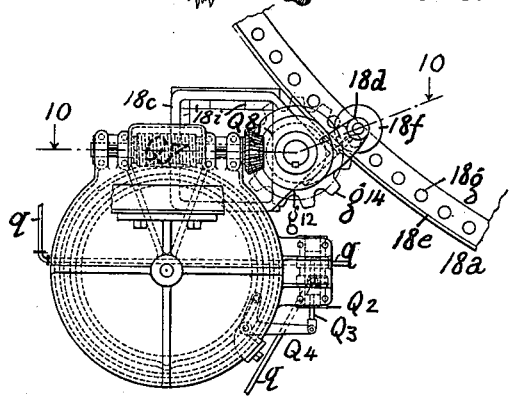
Figure 75:
Figure 76:
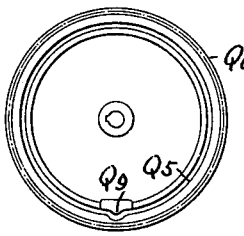
Figure 74:
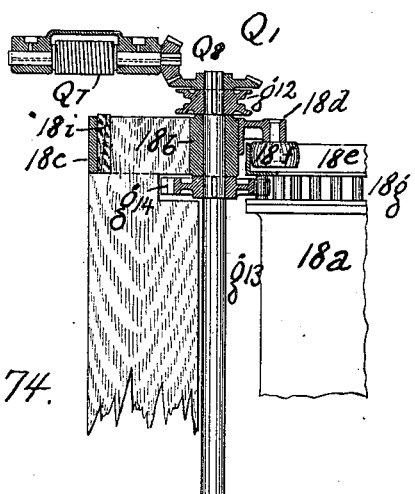
Figure 77:
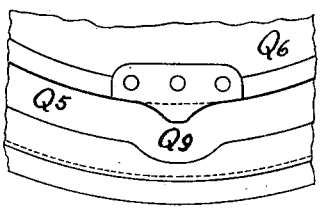
Figure 78:
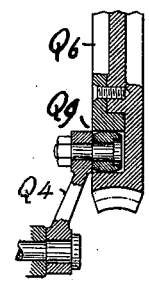
Figure 81:
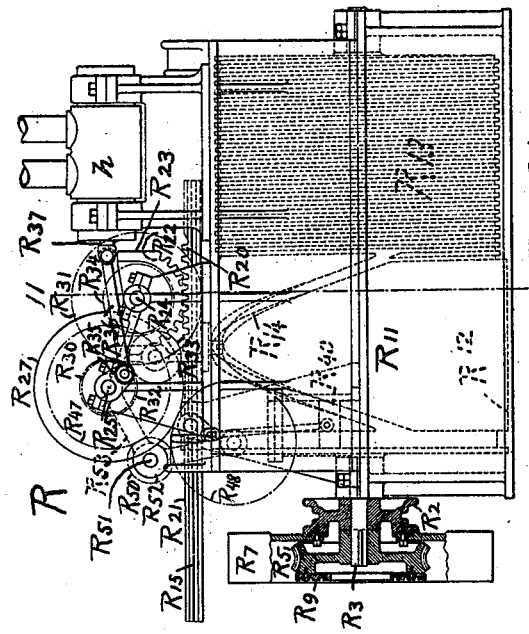
Figure 82:
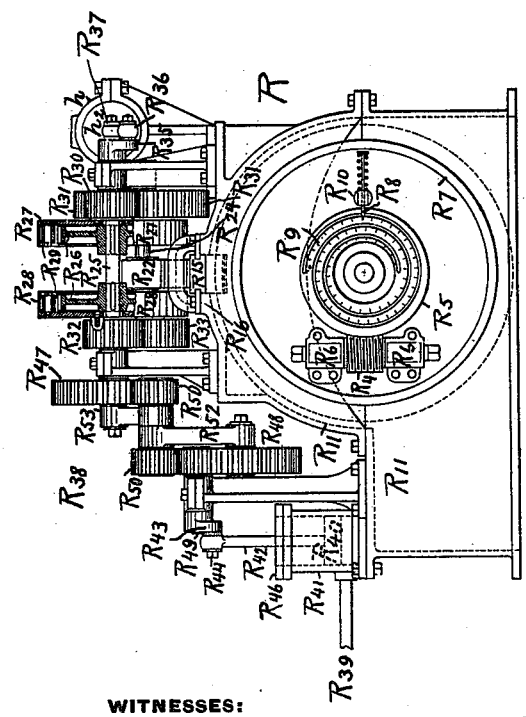
Figures 83, 84, 85, 86:
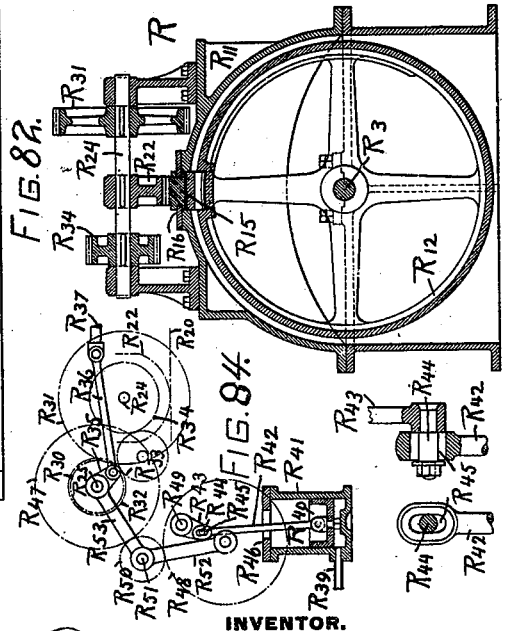
Figure 96:
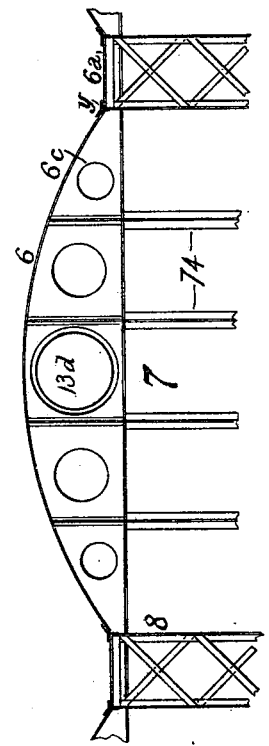

46, a plan at the plane 3 3 of the same figures; Fig. 47, a plan on the line d d of Fig. 43; Fig. 48, a face view from the plane 4 4 of Fig. 43; Fig. 49, a partial plan at the line 5 5 of Figs. 43 and 44, and Fig. 50 a view from the plane 6 6 of Figs. 44 and 49. Fig. 51 is a sectional view of a pneumatic relief-valve. Figs. 52 and 53 are diagrammatic views illustrating the mode of operating the main valve of the air-conduit connecting the air-chambers of the movable locking members; Figs. 54 and 55, similar views showing the mode of operating the valves controlling the water feed and waste pipes to the space between the adjacent gates of an elevated lock and the upper level of the waterway, and Fig. 56 a detailed view of the packing of the joint between an elevated lock and the upper level. Figs. 57 and 58 are diagrams showing the variations in air-pressure automatically induced in the locks at different parts of their stroke, and Fig. 59 a diagram showing the movement of the air charge from lock to lock during the stroke. Figs. 60 and 61 are diagrammatic views illustrating the method of automatically inducing the desired surplus buoyancy in the elevated lock and pontooning the depressed lock; and Figs. 62 to 65, inclusive, views of the pontooning-valves connected with the compensating storage-reservoirs, Figs. 62 and 63 being front views, partly in section, showing the valves closed and open, respectively; Fig. 64, a section on the line $a\,a$ of Fig. 62, and Fig. 65 a section on the line 7 7 of Fig. 63. Figs. 66, 67, and 68 are diagrammatic views illustrating automatic methods and mechanism for controlling, timing, starting, and stopping the motions of the locks, Fig. 66 being a diagrammatic plan showing a lock with its automatic stop or controlling apparatus; Fig. 67, a similar view showing an organization for preventing the initiation of motion when the gates are not properly closed, and Fig. 68 a similar view showing the piping system connected with the gate-operating engine. Fig. 69 is a diagrammatic elevation or profile showing a lock in combination with hydraulic stops, a hydraulic accumulator-intensifier, and an automatic stop or control apparatus; and Fig. 70, a view of an improved hydraulic pipe-buffer. Figs. 71 to 79, inclusive, illustrate a controlling mechanism connected with each of the gates to prevent the initiation of motion in the locks until the gates are all properly closed and seated, Fig. 71 being a plan; Fig. 72, an end view; Fig. 73, a side view; Fig. 74, a section on the line 10 10 of Fig. 71; Fig. 75, a view of the cam-wheel detached; Fig. 76, a transverse section of the same; Fig. 77, an enlarged view of the operative part of the cam; Fig. 78, a section thereof, showing the cam engaged; and Fig. 79, a side view, partly in section, of the valve. Figs. 80 to 95, inclusive, illustrate an automatic adjustable stop or control machine for connection to each lock to automatically control and stop the motions thereof, Fig. 80 being a plan; Fig. 81, a side view, partly in section; Fig. 82, an end view, partly in section; Fig. 83, a partial transverse section on the line 11 11 of Figs. 80 and 81; Fig. 84, a diagrammatic view of the transmission-gear and positive differential crank motion; Figs. 85 and 86, details of the crank connection between the same and a pneumatic engine; Fig. 87, an enlarged view, partly in section, of the differentially-threaded drum of the apparatus; Fig. 88, an enlarged top view of the differential thread and the traveler or functioning member meshing therewith; Fig. 89, a side view of the traveler meshed with the female differential thread, which is shown in section; Fig. 90, a section on the line 12 12 of Fig. 88; Fig. 91, a plan of the male differential thread on the traveler; Fig. 92, a face view, and Fig. 93 a section, of a ratchet gear-wheel; Fig. 94, a face view, and Fig. 95 a section, of the engagement and adjustment wheels of the apparatus. Fig. 96 is a partial plan, Fig. 97 a partial longitudinal section, and Fig. 98 a partial transverse section, showing a construction in which the movable locking member automatically graduates and throttles the air discharge from its air-chamber near and at the lower limit of its stroke. Fig. 99 is a plan, and Fig. 100 a vertical section, through a gate, showing a buffer device to prevent injury by the concussion of vessels.

In describing the improvement herein set forth the same reference-symbol will always have a similar significance and whenever possible a significance similar to that given it in my several Letters Patent before referred to.

As described in said Letters Patent, the lock is suitably located where it is desired to transfer vessels in a waterway between upper and lower levels 1 and 2 thereof, a head-wall 3 or other suitable structure retaining and supporting the upper level. Openings 4, controlled by gates 4ª, are provided in said head-wall 3, so that vessels may be admitted to and from the locks and the water retained in the level 1, as desired. Adjacent to the head-wall 3 the lower level 2 is expanded and deepened to form a pit or well 5. Floating and moving vertically in the water of the lower level in the pit 5 are similar locking members A AA, each made with an open-bottomed lower air-chamber 7, adapted to retain a compressed-air charge by a seal formed by permanently immersing the lower walls in the water of the pit 5 and an upper gated lock chamber or trough 17, having end openings 18 and gates 18ª.

The locks are prevented from pitching endwise by an auxiliary apparatus C, consisting of synchronizing-shafts 160, which extend horizontally along beside the locks and are provided with pinions 161, which mesh with racks 164 on the lock, and other racks 165 on *terra firma* parallel thereto. The shafts have no bearings, but hang on the engaged teeth of their pinions and the racks. The racks 165 on *terra firma* are carried in suitable frames 51, which also guide the locks in their movements. The racks 164 on the lock are fastened to its walls or to suitable girder constructions 76, framed therewith.

The locks are prevented from tipping sidewise by guides 69 on the lock-body and by the shafts 160, which act as rollers, the guides 69 and shafts working on corresponding guides or slides attached to or part of the frames 51 or the side walls of the pit 5.

The locks when elevated are superbuoyant and are restrained from rising too high by engagement with stops K, in this instance shown as hydraulic engines $K^3$, which are secured to anchors $k$, framed with or making the foundations of the guide-frames 51.

The mode shown for attaching the elevated locks to the head-wall 3 is by means of an engagement device Z, which consists of a roller securely anchored to *terra firma* and engaging with runways or shoulders framed on the lock-body, the construction being similar to one which is shown in my Letters Patent No. 621,470, dated March 21, 1899, for improvement in aqueducts, which construction permits the elevated lock to be moved vertically while registering and connected with the upper level 1 and subject to outward hydrostatic pressure, which is sustained by the engagement above noted.

As in my Letters Patent aforesaid, I provide a main air-conduit 13 on *terra firma*, controlled by a valve 14, and means for connecting the conduit on *terra firma* with the air-chambers of the movable locking members A AA and that of the pneumatic accumulator B by means of a conduit $13^b$, which is branched and connected with the legs of the valve 14 by valve organizations $U^6 U^7$, Fig. 6.

In the types of lock shown in Figs. 1 to 5, inclusive, the horizontal sectional area of the air-chamber 7 considerably exceeds the area of the floor 71 of the lock-chamber 17, the outward extensions of the air-chamber 7 beyond the lock-chamber 17 being closed at the top by plates 31, which plates may be extensions of the floor 71 or be suitably joined thereto.

The better to facilitate attaching and furnish support to the engagement-brackets $28^b$, the racks 164, guides 69, and other elements of the structure, the practical uses of which may give rise to compressive strains or bending, the segmental cylindrical walls 6 of the air-chamber 7, which have nearly vertical axes, are somewhat separated at their edges, and the spaces between them are closed by wall-plates $6^a$, which are shown flat, but which may advantageously be buckled plates, their horizontal projections being parallel with the axis of the lock, and the transverse ties 8, the wall-plates $6^a$, and the segmental cylindrical walls 6 are united at their adjacent edges, preferably by means of a Y-shaped member $y$, Figs. 37 and 40, which is readily formed by flanging a T shape, the tie-plates 8 being riveted to one leg of the Y, the wall-plates $6^a$ to another, and the segmental cylindrical plates to the remaining leg, this mode of union avoiding improper strains and resulting in plain shears on all the rivets. A peculiarity resulting from this organization is that the tie-plates 8 are disposed in pairs a convenient distance apart, so that by joining the ties 8 of a pair, either by plates or by lacing-bars $8^c$, stiff transverse strut members $8^b$ may be readily and economically formed, which are well adapted to sustain tension, compression, and bending. In practice transverse ties 8 are conveniently and economically formed of separated plates in locks of moderate size, as shown in Figs. 1, 2, and 3, while in locks of great size they are more economically formed in solid plates or partitions perforated for the passage of air. To further stiffen the air-chamber structure 7, so that it may act as a beam, I provide horizontal chord-plates $6^c$, riveted or otherwise united to the walls of the air-chamber and to the stiff transverse members $8^b$, these structural elements being introduced at such locations as are subject to extraneous forces and where desirable to form the entire air-chamber into a girder or beam. This type of lock structure adapted to the largest locks is shown in Figs. 4 and 5 and 33 to 36, inclusive. In such a lock the water-load and the air uplift per square foot of floor are respectively about a ton and one and one-fourth tons. The span of the floor-girders 74 must exceed the beam of great ships. Therefore the girders must be numerous and of great strength, and whatever reduces their weight will save great sums of money. I therefore frame the floor system so as to utilize the metal in the floor-plates 71 as part of the necessary flange-section of the girders 74, the said plates being laid on transversely in comparatively narrow sections, the contiguous edges of adjacent plates being riveted to horizontally-projecting legs of angle-bars $74^b$, which are covered with a cover-plate $74^c$, the downwardly-projecting legs of the angles being riveted to a web-plate $74^d$, to which are riveted the compression and tension web members $74^e$ and $74^f$, respectively, of the floor-girders 74, the bottom flange $74^g$ being suitably constructed and the compression web members $74^e$ in adjacent planes being latticed, as shown in Fig. 34, this system of construction combining the maximum strength with moderate cost.

The constructions above described require a pit 5 for each lock undivided throughout its entire length. In soft or yielding soils this construction would be needlessly expensive, and for sites where the earth is other than rock I prefer to use a type of construction similar to that shown in Figs. 6 to 10, inclusive, in which the upper part G of the structure constitutes a box-girder adapted to resist all stresses due to extraneous forces, and the air-chamber, or preferably its lower part, is formed into a tubulous series of dependent separate elements $7^a$, connected at the top and open at the bottom, so that the lower part of the pit 5 can be formed in a series of wells 5ᵃ with arched side and end walls 5ᵇ and transverse walls 5ᶜ, thus reducing the cube of excavation and the amount of masonry necessary to sustain the adjacent soil and to provide supports and anchorage for the guiding structures 51 and anchors $k$. When practicable, I prefer to make the tubular parts 7ᵃ of the air-chamber 7 slightly conical, lapping the several sheets 7ᵇ, each zone over that above it, so that the natural increase in diameter thus obtained may equate the lock and compensate for the varying displacement of the immersed parts of the lock structures as the lock moves up and down.

When it may be necessary or desirable to vary from the cylindrical form, a preferred type of tubulous construction is shown in Figs. 37 to 42, inclusive, in which type two segments of cylinders 6 are united at their vertical edges with one another and with tie-plates 8ᵈ, the joint being made safely, without lengthwise pull on the rivets, by means of a Y-shaped piece of steel $y$, which can be readily formed by flanging the common T shape. When it is desired to equate the tubular body thus framed, the Y shapes are cut in sections corresponding in length with the zones of the cylindrical wall-plates 6, and the zones are lapped each over that next higher and under the next lower, good tight joints well adapted to calking being thus obtained.

The tubulous construction of the air and the water seal chambers is not only advantageous in soft soils, but is also peculiarly adapted to the construction of navigable waterways in localities so rugged and broken in their topography that other systems of construction involve prohibitive first cost. Fig. 13 shows the system so applied to overcome a great and abrupt elevation. In planning such a flight of locks the engineer after bringing the upper and lower sections of his waterway to the brink and foot, respectively, of the mountain will establish the profile of the connecting waterway-sections at such height above the ground as to require the minimum excavation and will build up from the ground to his profile with steel structures, the finished structures appearing as a series of aqueduct-sections 100ᵃ 100ᵃ at successive levels and a series of locks A A, each adapted to lift and lower vessels between two adjacent aqueduct-sections, the aqueduct-sections 100ᵃ being gated, and the lock-chambers 17 of the locks A likewise gated and adapted to connect at each end with a gated end of one of the two successive adjacent aqueduct-sections. In this construction the water seal in which the air-chambers of a movable locking member is operative is preferably contained in a tubulous series of chambers 5ᵃ, built in the form of steel cylinders, like stand-pipes, and the air-chamber of the movable locking member is formed in a like tubulous series of depending separate elements 7ᵃ, each adapted to be sealed and to operate in one of the tubular water-chambers or stand-pipes 5ᵃ, the air-chambers of the several movable locking members being pneumatically connected and the mode of operation of the locks being functionally similar to that herein described. Fig. 14 shows a transverse section of a movable locking member especially adapted to such use. The guide-frames 51 and the racks 164 and 165 on the lock and on *terra firma*, respectively, are suitably extended, proportionately to the stroke of the movable locking member. The tubular air-chamber sections 7ᵃ are provided with the accessories proper to the usual functions of the apparatus, as herein described, the cushion-chambers O and flotation-chambers N being attached at the top of the air-chamber sections 7ᵃ and the compensating storage-reservoirs M being interior therein, and all having the same functions and relations to the water in which the movable locking member is operative, as hereinafter described.

In all the types of locks shown and described herein the floor 71 is subject to upward air-pressure in excess of the weight of the superincumbent water, and girders 74 must be provided to hold the floor 71, which is connected thereto, and frames 74ᵃ to sustain the side walls 70 of the lock-chamber 17 against the hydrostatic pressure, and at the racks 164, gate-openings 18, and wherever special strength is required girder constructions 76 are provided.

As in Patents Nos. 557,564 and 557,566, above referred to, I provide a valve-controlled air conduit or main 13 on *terra firma* and suitable means of connecting the air-chambers of the locks and the pneumatic accumulator B therewith. This connection may be of any preferred and suitable form. The simplest method, when natural conditions and the proportions of the work admit of its use, is that shown in Figs. 4 and 5, in which the conduit 13 is mainly a rock-cut tunnel, and connection with the air-chambers of the movable members is made by means of vertical open-ended stand-pipes 13ᵈ, extending upwardly well above the water-level 2 in the pit 5 beneath hoods 13ᵉ, formed on the movable members, which hoods telescope the upper parts of the stand pipes when the movable members descend. Another form similar to that shown in the patents above referred to is shown in Figs. 1, 2, and 3 and in detail in Figs. 19 to 23, inclusive, in which figures the suspended loop of flexible tubing 16 is reinforced by side chains 16ᵉ, the links of which are pivoted on pins 16ᵍ and held off from the body of the tube 16 by separators 16ʰ. When free from pressure, such a tube tends to hang in a curve approximating a catenary, and when subject to heavy pressure it tends to extend itself in a right line, because the pressure-surface on the convex or outer side of the loop is greater than the pressure-surface on the inner side. To counteract this tendency and prevent the tube 16 from kinking, the chains 16$^e$ are provided and have their links 16$^f$ formed with their adjacent faces perpendicular to the axis of the chain on the outer side of the loop and splayed or inclined on the inner side thereof, so that the tendency of the loop of tubing to kink is restrained by the chains, because chains so made cannot without rupture form a curve convex toward the axis of the loop or of less radius than that of which they are an element.

Figs. 1, 2, and 3 illustrate an improved mode of combining the flexible tube connection with a pair of locks and a conduit and valve on *terra firma*. Where the situation favors such an organization, the conduit-sections 9 on the movable locking members are provided with a series of downward openings 9$^a$ and the U-valve 14 is located centrally between the locks, with its axis transverse to them. Horizontal extensions or manifolds 14$^m$, extending in opposite directions parallel with the locks, connect each with one of the legs of the valve 14 and are provided with a series of downward openings 13$^a$, corresponding with the similar series 9$^a$ on the conduit-section 9 of the opposite lock, and a suspended loop of flexible hose 16 connects each of the openings of a series 13$^a$ with one of the series 9$^a$ on the opposite lock. This construction greatly shortens the distance traveled by the air in passing from lock to lock and correspondingly reduces the friction and the cost of the conduit. Subdividing the flexible pipe decreases the necessary diameter and weight thereof, while the reverse connection increases the radius of curvature in the loop and, together with the decrease in the diameter of the tubing, greatly facilitates bending without danger of cracking it.

The flexible tube connection, while direct, accessible, and readily inspected and repaired, is perishable. The open-ended stand-pipe standing in the air-chamber becomes too flexible in locks of great lift and, moreover, is not accessible for extensive repairs while the lock is in operation. I have therefore designed the hydraulically-sealed telescopic-joint connection T, (shown applied in Figs. 6, 8, and 9 and in detail shown in Figs. 24 to 32, inclusive,) in which every part is readily accessible at all times. No perishable material is used, and because the telescopic pipes never cease to register the flexibility of the pipes cannot cause them to foul one another while moving, and their total length and the head of water and consequent collapsing pressure on them is very materially reduced. The total traverse of the lock is accommodated in this device by relative motions of the conduit-sections composing it, which can be any determined fraction of the lock traverse—for example, one-half, one-third, or any fraction. In the combinations of elements shown the relative motion is one-half the lock traverse.

In general terms the device can be described as a combination of conduit-sections, at least one of which must be connected with the lock and one with the conduit on *terra firma* and the remaining sections must be given the desired traverse, which may or may not be equal in the several movable sections, as good mechanical design may dictate, part of the conduit-sections extending vertically and being each provided with an enveloping water seal and part depending vertically, each depending section enveloping one of the vertically-extending sections and having its lower walls permanently immersed in the water seal to a depth such that the compressed air cannot escape. The section on the lock is connected with the air-chamber 7 thereof, the section on *terra firma* is connected with the conduit 13, and the intermediate movable sections are properly joined, so that there is no outlet for the compressed air except by the sections connected with the lock and conduit.

In the variation shown applied in Figs. 6, 8, and 9 and in detail in Figs. 24 to 28, inclusive, of the telescopic hydraulic seal connection T it is preferred to use two such organizations, one on each side of the lock, to reduce the size and balance the weights, and when masted ships do not use the locks they may be connected overhead and stiffened by a transverse girder connection 9$^f$, which may also serve as a reservoir and contain water to replenish or regulate the water seal. The lock connection is an upwardly-extending conduit-section 9$^c$, connected at the bottom with the air-chamber 7 and enveloped by a larger tube 9$^b$, the annular space 9$^e$ being open at the top and closed at the bottom to retain the water seal. Adjacent to the structure just described the *terra-firma* conduit 13 connects with an upwardly-extending section 13$^f$, which may be located below the water-level 2 in the pit 5, in which case the water therein would envelop it and form the seal, but for convenience should generally be above such water-level and enveloped by a pipe 13$^g$, connected to the section 13$^f$ at the bottom and expanded at its top to form a reservoir 13$^h$, which will regulate and replenish the water seal in the annular space 13$^i$. In this variation a U-bend 13$^k$ unites the vertically-depending conduit-sections 13$^m$ and 13$^n$, which respectively envelop the *terra-firma* section 13$^f$ and the lock-section 9$^c$, which sections are permanently sealed and operative in the annular water-chambers 13$^i$ and 9$^e$. It is intended that the traverse of the movable sections 13$^m$ and 13$^n$ shall be approximately one-half the lock traverse. To reduce the stresses overcome in moving them, they are as nearly as may be counterbalanced to equilibrium with the air-pressure and are moved by the lock, which in ascending picks them up about at its mid-stroke, as shown in Fig. 24, and in descending, when about at its mid-stroke, deposits them on the *terra-firma* section, where they remain until the lock returns, as shown in Fig. 25. To free the organization from moments due to outhanging weights and to counteract the wind-pressure, a tower $13^x$, with guides $13^o$, is provided adjacent to or enveloping the *terra firma* conduit-section $13^f$, and the movable sections have guides $13^p$, engaging those $13^o$ on the tower $13^x$, the preferred construction being that the guides $13^p$ are formed on an open guide-frame $13^q$, in which the sections are pivoted by means of studs or trunnions $13^r$ and cushioned on springs $13^s$. A stop $13^u$ on the tower $13^x$ prevents the movable sections being raised so high that the section $13^m$ will have an insufficient seal, and a stop $13^t$, attached to the movable sections, preferably formed on a rod $13^v$, depending from the guide-frame $13^q$, is adapted to engage the lock by a slotted arm $13^w$, formed on it, so that when the lock descends it will catch and draw down said movable sections and prevent the section $13^n$ from receding so far relatively to the water seal in the annular chamber $9^e$ that the compressed air can break seal and escape. The immersed parts of the depending conduit-sections $13^m$ and $13^n$ are preferably tapered toward the bottom to equate their varying displacement when immersed to different depths. As before stated, they are ballasted or counterbalanced, preferably, so that the air-pressure necessary to overcome their weight is a mean between the maximum and minimum of the air-pressures in the locks, and the stops $13^t$ and $13^u$, together with the rod $13^v$ and the arm $13^w$, form a limiting connection confining the relative motions of the conduit-sections within proper safe limits. The operation of this device is as follows: Free communication exists between the air-chamber 7 of the lock and the conduit 13 by means of the telescopic joint connection T, the movable conduit-sections $13^m$ and $13^n$ moving relatively to the *terra-firma* and lock sections $13^f$ and $9^c$ and the compressed air being retained by the water seal in the annular spaces $9^e$ and $13^i$. The bend $13^k$ and the connected conduit-sections $13^m$ and $13^n$ are free to slide vertically on the guides $13^o$ and to vibrate about the studs $13^p$; but their vertical motions and positions are limited relatively to the conduit-section $13^f$ on *terra firma* by the stop $13^u$ and relatively to the stand-pipe $9^c$ on the lock by the rod $13^v$ and the engagement of its head $13^t$ with the arm $13^w$ on the lock, so that the bend $13^k$ and the sections $13^m$ and $13^n$ can never move so high relatively to the vertically-extending sections as to "break seal" in either of the water sealed annular spaces $9^e$ or $13^i$. The rigid tower $13^x$ by the engagement of its guides $13^o$ with the guides $13^p$ of the guide-frame $13^q$, in which the bend $13^k$ is supported, takes all racking strains and moments off from the stand-pipe organizations, which would otherwise be subject to them. The advantages of this type of connection are that the telescopic parts are always in register, and therefore not liable to foul one another. The conduit-sections are much shorter than in the form shown in Figs. 4 and 5. The collapsing pressure on them is very much less, and they are much more accessible for inspection and repair.

A modification of the telescopic-joint connection T, in which it is located below the top of the lock, is shown applied in Fig. 13 and in detail in Figs. 29 to 32, inclusive. It is obvious, as in the preceding case, that the conduit-section $13^f$ on *terra firma* might be located at such a level that the vertical section $13^f$ could be in the pit 5, the water therein enveloping it and forming a sufficient seal; but to render the parts conveniently accessible when applied to locks working in the lower level 2 and in such case to avoid a deep tunneled portion of the conduit 13 the vertical conduit-section $13^f$, its enveloping tube $13^g$, and water-chamber $13^i$ are suspended from a cap $13^y$ in downwardly-extending enlargement $13^z$ of the conduit 13, to the walls of which the cap $13^y$ is united. One vertically-depending conduit-section $13^n$ is connected with the conduit 9 on the lock, and thereby with its air-chamber 7. The other vertically-depending section $13^m$ is connected at its top with the enveloping tube $19^b$ of the vertically-extending conduit-section $19^c$, between which is formed the annular water-seal chamber $19^e$, the depending section $13^m$, envelop $19^b$, and vertically-extending section $19^c$ being united in a unital structure $19^a$, which is so supported and controlled in its motions as to move vertically coincidently with and at substantially one-half the speed of the lock, a convenient means of supporting and controlling it being to connect the unital body $19^a$ with the synchronizing-shafts 160—as, for example, by a frame $160^a$, having an internal roller-bearing $160^b$, in which the shaft turns and guides $19^d$, engaging vertical guides on a frame 51.

As shown in the drawings, the conduit-sections are all concentric. Their functional relations, register, and relative motions are the same as in the instance previously described, although their appearance is dissimilar.

The drawings show improved methods of constructing the anchorages K and engaging the elevated lock therewith. Hydraulic engines or stops $K^3$ are substituted for the adjustably-fixed mechanical stops of Patent No. 557,566 and are hydraulically connected to a source of hydraulic power, preferably an improved form of accumulator, constituting a hydraulic accumulator-intensifier I, Fig. 75. The anchors $k$ are made in the form of plates $k'$ for greater convenience of attachment and are secured at the bottom to girder constructions $k^2$, which in Figs. 1, 2, and 3 are shown embedded in masses of concrete and in Fig. 5 are let into and secured in the natural rock, both constructions being practical, but that shown in Figs. 1, 2, and 3 being preferable, as the steelwork is thereby elevated above the water-level 2. The tops of the anchor-plates $k$ are secured to rigid girders $k^3$, forming the bottom member of the guide-frames 51, the outboard ends of which may have suitable shoes $k^7$, and the inboard ends project into the pit 5, being adapted to receive and support the hydraulic members $k^3$, with which the lock engages.

Figs. 1, 2, 3, 43, and 44 show generally and in detail the mode of connecting the several parts of the organization. The anchor-plates $k'$ are riveted to the web-plates $k^4$ of the girder $k^3$, and stirrup-plates $k^5$ are also riveted thereto, forming a substantially cylindrical socket $k^6$, in which the hydraulic member $K^3$ may be supported and pivoted, preferably in a split bearing-block $K^7$, having a cylindrical outer surface to fit the socket $k^6$ in the stirrup-plates and an inner spherical socket to fit and engage a spherical head $K^5$, formed on the hydraulic cylinder $K^6$, the hydraulic member $K^3$ being similar in construction and operation to that described in my Letters Patent, No. 635,848, dated October 31, 1899. The split form of the bearing-block $K^7$ facilitates manufacture and assembling, and a tight fit in the stirrup is secured by making the cylindrical outer surface and the spherical inner bearing slightly eccentric, the block being opened at the top when it is to be entered and thereafter its halves forced up to close together at the top by retracting the set-screws $K^8$. The hydraulic pipe $K^9$ connects with the cylinder through the head $K^5$, and the ram $K^{10}$ operates downwardly and is kept from falling out by a split ring making a bayonet-joint with the mouth of the cylinder, and the rate of admitting and exhausting liquid to the engine is automatically regulated, all as set forth in my Letters Patent No. 635,848, above referred to.

The engaging brackets $28^b$ on the lock member are preferably tall plate constructions of relatively little projection, and their web-plates $28^c$ are practically in plane with the cross-ties 8 in the air-chamber, being thus spaced wide enough, so that a retractable engaging member 280 can operate between them. Long suspension-plates $28^d$ are attached to the outer edges of the web-plates $28^c$, formed into a stirrup $28^e$ at the bottom and preferably cut away toward the tops to equalize the elasticity of the bracket and the strains in the rivets.

In order to reduce shock and the strains due to suddenly-applied loads, wood is used wherever it can be done advantageously. The stirrup $28^e$ has a wooden filler $28^f$, made in two quadrants of black locust with the fibers inclined forty-five degrees and converging to the center. A shoe $28^g$ lies on the upper surface of the locust fillers $28^f$ and has a hollow cylindrical bearing $28^h$ for the reception of the end of the engaging member 280 and shoulders $28^i$ with planed vertical faces which lie in vertical grooves $28^j$, formed on the inner faces of the bracket $28^b$, preferably between the suspension-plates $28^d$ and distance-blocks $28^m$, which also form the bottom flange members or stiffeners of the bracket. The engaging member 280 is made movable, so that it can be retracted and pass the stop K when it is desired to raise the lock member for inspection, painting, and repairs. To this end, it has a pivotal bearing 281 at the bottom in the cylindrical bearing $28^h$ of the shoe $28^g$, and a mechanism 282 is connected with its upper end, by which it can be drawn forward in position to engage the stop K or retracted so as to pass it. In this organization a frame $28^m$, preferably made of two channels, is united with the webs of the bracket $28^b$ and connects them, and central cheek-blocks $28^o$ give bearings to a pin $28^p$, on which is pivoted a threaded rod $28^q$. A transverse frame 283 is formed in the upper end of the engaging member 280, and is provided with cheek-blocks 284, in which is pivoted a trunnioned split sleeve-block 285, having an inner cylindrical socket containing a nut 286, which engages the threaded rod $28^q$ and is provided with toothed end wheels 287, to which a spanner may be applied to turn the nut 286 and move the engaging member 280. The metal body of the engaging member is in the form of an open girder, C-shaped in plan, and the lower front compression member or strut 288 is of timber, preferably in two parts, bolted and keyed together in an A-frame, secured near its bottom to the body of the engaging member by a lateral tie-frame 289 and having cylindrical bearings at bottom and top, the bottom bearing 281 pivoting the entire member 280 in the cylindrical bearing $28^h$ of the shoe $28^g$ and the top bearing 290 being pivoted in a bearing 291, formed in a contact-block 292, which directly engages the stop K and has end trunnions 293, which engage sockets 294, formed in rectangular sliding blocks 295, which lie and work in guides $28^r$, provided on the inner faces of the webs $28^u$ of the engaging member, preferably in the central tie-stiffener $28^s$, which should be a forging, the sliding blocks after they are entered being retained by stops $28^t$, preferably made of angles riveted to the webs $28^u$. The operation of this organization is as follows: When it is desired to raise the lock so that its lower walls may be accessible for inspection, painting, and repairs, the engaging member 280 not being in contact with the stop K a spanner is applied to one or the other of the end wheels 287 on the nut 286, which is thereby turned and the engaging member retracted so that it will pass the stop K and the lock can be raised. When it is desired that the stops shall function, the spanner is applied to the nuts, which are turned in reverse direction, and the engaging member 280 is moved forward until its upper end bears against the transverse frame $28^n$ of the bracket $28^b$. The construction employed permits the various members to adjust themselves to strain and to stretch and contract without binding or bending. The spherical head of the hydraulic engine $K^3$ permits it to move slightly to facilitate motion of the ram coincidently with any slight vibration or shifting of the lock without cramping the ram in the cylinder.

The timber filler $28^f$ and strut 288 interpose a substance of considerable length and relatively great elasticity between the hydraulic stop and the metal body of the bracket and lock, thus cushioning the effect of suddenly-applied loads. The sliding swiveled contact-block 292 and its cylindrical surface of contact with the timber strut 288 permit a considerable elastic movement and, together with the similar form of contact between the strut and the shoe $28^g$, insure that stresses will always be conveyed between normal surfaces, and the parallel guiding-surfaces of the shoulders $28^i$ and the grooves $28^j$ permit the shoe $28^g$ to move vertically sufficiently to take up the elasticity of the timber filler $28^f$ without subjecting the members to bending or cramping.

Another form of engagement device specially applicable to small locks of low lift is shown applied in Figs 10 to 12, inclusive, in which the hydraulic engines $K^3$ are inclined and pivotally connected by links $K^{11}$ with arms $160^c$ on the synchronizing-shafts 160, the length of the hydraulic cylinders being sufficient so that the ram is never drawn out of them and the pin connections of the links $K^{11}$ with the shank of the ram being made on a cross-head working on guides. Figs. 11 and 12 illustrate, diagrammatically, the operation of such a construction. The pin on the arm $160^c$ describes a part of a cycloidal curve, as there shown, and the motion is favorable to the use of such a construction. The operation of this modification is as follows: When the lock is depressed, the shafts 160 are in the lower of the two positions shown in Figs. 11 and 12, and as they move upward the pins by which the links $K^{11}$ are connected to the arms $160^c$ on the shafts 160 describe cycloidal curves, as shown in Figs. 11 and 12, and first extend and then retract the hydraulic rams $K^{10}$. This device can be made singularly free from undesirable moments. When it operates to arrest the lock, the upward lift thereof is transferred through the engaging teeth of the lock-racks 164 and the pinions 161 to the shafts 160, which, being prevented from rotating by their connection with the hydraulic stops, react on the fixed racks 165, tending to lift them, the lifting tendency being resisted by the anchors $k$ and the masses to which they are connected. If the hydraulic members are connected to or bear against the racks and their location relatively to the shafts is slightly shifted, so that when the stop function is utilized the hydraulic members and the shafts are practically in one horizontal axial plane, as shown in Fig. 12, then the inward opposite reactions of the hydraulic members on the opposite sides will be sustained by compressive strain in the intervening members and the locks, shafts, and racks will be clamped together, and the uplift of the locks will induce a straight pull on the anchors without moments in the frames 51. The drawings show permanent connections between the hydraulic members and the shaft, a mode of organization which can be used only where the lift is small; but it is evident that the cycloidal motion of the arm $160^c$ on the shaft 160 is such and, moreover, can be so readily modified by shifting its angular position and by extending or shortening the arm $160^c$ that the arm can be readily adapted to automatically engage and disengage the hydraulic member in any desired relation to the motion of the locks, as shown in Fig. 12, thus adapting this type of hydraulic engagement to any height of lift.

The object of the retractable engagements 280, which when extended engage the stops and pass them when retracted, is to permit the movable locking members to be raised, so that the steelwork will be clear of the water and accessible for inspection, repairs, and painting. To facilitate this end, the lower part $6^b$ of the walls 6 of the air-chamber may be made of timber properly framed and united to the metal part of the structure, so as to be air-tight. In practice the height of this timber portion should be such that when the lock-chamber is unwatered and the unloaded movable member is raised by admitting compressed air to its air-chamber the volume of water necessarily displaced out of the air-chamber will be less than the volume inclosed between the wooden walls $6^b$ and their top and bottom planes, so that the unloaded lock can be floated so high as to raise all its metal work clear of the water.

To provide against overstraining the anchors in case the lock were unexpectedly unwatered, a relief-valve V, connected with the air-chamber and adapted to open in such event and allow the compressed air therein to escape, may be employed. Such an organization is shown in detail in Fig. 51, in which a chamber V' is formed alongside of and communicating with the lock-chamber 17 and having a bottom opening $V^2$, closed by a tubular valve-case $V^3$, which projects into the air-chamber 7 and has ports $V^4$ opening thereinto, which are normally covered by a hollow piston-valve $V^5$, open at both ends and connected with and upheld by a hollow float $V^6$, which, so long as the water in the lock-chamber 17 is at a safe height, floats high and holds the valve $V^5$ over the ports $V^4$; but when the water in the lock-chamber recedes to a dangerous stage the float descends, lowers the valve $V^5$, and uncovers the ports $V^4$, so that air will escape from the air-chamber of the lock. Drainage for the float $V^6$ to prevent it from becoming water-logged is provided for by using an open pipe $V^7$ to suspend the valve from the float, the pipe being secured in the bottom head of the float and into a hollow cross-arm $V^8$ of the valve, from which a passage $V^9$ opens opposite the ports $V^4$ between the valve-packings $V^{10}$. If water leaks into the float, it will drain out through the open pipe $V^7$, the hollow cross-arm $V^8$, passage $V^9$, and the ports $V^4$ into the air-chamber of the lock.

Patent No. 557,564 aforesaid sets forth a water-seal "U-valve" used to control the flow of air through the conduit and Patent No. 557,566 a pneumatic weir in which an air-trap is utilized as a valve to control the flow of water through a water-pipe. Figs. 52 to 55, inclusive, illustrate a combination of these two variations of the principle of the fluid seal, by means of which the U-valve organization may be operated and the flow of a very large air-conduit—say ten to twenty feet in diameter—thereby controlled by the manipulation of an air-valve so small as to be readily movable by hand—say a two-inch to six-inch air-valve. In the practice of my invention these valves are preferably located in and form parts of an interlocking apparatus or sequence-machine J, preferably similar to that shown in diagram in Figs. 66 and 67; but in the diagrammatic views, Figs. 52 and 53, said small valves, for clearness of illustration, are depicted as adjacent to the U-valve organization, in which the conduit 13 is provided with a main valve 14, formed of a U-bend $14^a$, adapted to be charged or sealed with water and discharged or unsealed to close and open the conduit 13, the water being fed into the bend 14 from any convenient source, as the upper level 1 or a reservoir, through a feed-pipe $14^b$ and discharged therefrom through a waste-pipe $14^d$. These pipes are provided with bends and with valve-controlled air supply and exhaust pipes and circulating air-pipes, so as to constitute pneumatic weirs 119 $119^b$, by which the feed and waste of the water can be readily controlled. The feed-weir 119 communicates with a source of the water-supply by an opening 121, descends to a lower bend $121^a$, ascends to an upper bend 122, descends to a lower bend $122^a$, rises again, and connects with the main-valve U-bend $14^a$, preferably near or at its lowest point. The vertical legs of the valve and weirs are preferably each of sufficient height so that if the water in the supply or reservoir were to escape the water remaining in the legs would be under sufficient head to prevent the escape of compressed air. The waste-weir $119^b$ is similar in function. It communicates by an opening $121^w$ with the lower part of the main valve or bend 14, descends to a lower bend $121^v$, rises to an upper bend $122^w$, and thence descends into water and is permanently sealed—as, for example, in the water of the lower level 2 of the waterway. A supply-port $s$, connected with a source of compressed air, supplies compressed air to a double-acting air-valve $J^v$ between its pistons $J^{26}$, which valve, as above recited, is a part of the interlocking apparatus, and pipes 124 and $124^w$ connect the upper and lower distribution-ports of the valve $J^v$, respectively, with the upper bends of the feed-weir 119 and the waste-weir $119^b$.

Fig. 52 shows the main valve 14 open, and Fig. 53 shows it trapped and closed. To open the main valve 14, the pistons of the valve $J^v$ are moved to the position shown in Fig. 52, whereupon the compressed air entering the shell of the valve $J^b$ between its pistons $J^{26}$ feeds through the upper distribution-port and the pipe 124 into the upper bend 122 of the feed-weir 119, and because the air-pressure exceeds the head of water at that point the air will enter the bend 122, force down the water in the ascending leg of the weir to a position of equilibrium of pressures, and shut off the flow thereof, while at the same time the lower piston of the valve $J^v$ having been raised above the distribution-port communicating with the air-pipe $124^w$, connected with the waste-weir, the air in the upper bend $122^w$ thereof escapes into the atmosphere, the waste-weir is unsealed, and the water in the main valve 14 escapes through it, being forced out by the pressure of the compressed air in the main air-conduit 13 and valve 14, the height of the rising leg of the waste-weir being such that the water remaining therein after the main valve is untrapped makes a strong seal and prevents waste of air from the main valve after it is untrapped, and its discharge-opening is deeply immersed for the same purpose in the lower level 2 or other convenient body of water. When it is desired to again trap and close the main valve 14, the valve $J^v$ is moved to the position shown in Fig. 53, inclosing between its pistons $J^{26}$ the supply-port and the distribution-port connecting with the waste-weir air-supply pipe $124^w$, the upper piston excluding the distribution-port of the feed-weir air-supply pipe 124, whereupon the compressed air passes from the supply through the supply-port $s$ and the shell of the valve $J^v$, between the pistons thereof, and the lower distribution-port and the pipe $124^w$ into the upper bend $122^w$ of the waste-weir $119^b$ and prevents the flow of water therethrough, while the compressed air in the upper bend 122 of the feed-weir 119 wastes through the pipe 124 and its open distribution-port, and the water from the upper level or supply-reservoir flows freely into the main valve 14, rises therein to a position of equilibrium with the pressure of the air therein, and effectually closes the conduit. An organization of such character, if proportioned to that end, acts as an air-compressor, the air in its upper section being enmeshed in the flowing water carried away thereby and compressed as it descends and is subject to increasing heads of water. In order to compensate for such action and prevent the loss of air thereby, enlargements or gathering-reservoirs $r^2 r^3$ are provided, located adjacent to and on the discharge side of the lowest points of the water feed and waste pipes $14^b 14^d$, in which the entrained air can be gathered as it escapes from the enmeshing water, and circulating air-pipes $124^c$ connecting the gathering-reservoirs with the upper bends 122 122$^w$ preferably by being connected with the air-supply pipes 124 124$^w$. This device materially reduces the size of the air-supply pipes, saves air, and shortens the time necessary to charge the pneumatic weirs when the water is flowing, as air entrained by the flowing water is caught in the gathering-reservoirs and returns to the upper bends circulated instead of wasting.

In order that the pneumatic accumulator B may readily be independently connected with either lock A or A A when it is elevated and disconnected from it, the air-conduit 13$^b$ from the accumulator B is branched, and each branch is controlled by a U-valve organization like that above described, one of which, as U$^6$, is shown in Figs. 52 and 53 as connected with the left leg of the main valve 14, and thereby with the lock, as A, to that side, the other, U$^7$, being connected with the other leg of the valve 14, and thereby with the other lock, the organization U$^7$, except its connection with the main-valve leg, being omitted for the sake of clearness. In these organizations the valves J$^a$ J$^{aa}$ are slightly different from the valve J$^v$ in the disposition of their ports and pistons, so that when one accumulator-valve, as U$^6$, is opened the other, U$^7$, may be closed, and vice versa. To this end, the distribution-ports of the valves J$^a$ J$^{aa}$ instead of being connected one to the feed-weir and the other to the waste-weir of the same organization U$^6$ or U$^7$ are connected as follows: One of the distribution-ports of the valve J$^a$ is connected with the feed-weir of the organization U$^6$, the other with the feed-weir of the organization U$^7$, and one of the distribution-ports of the valve J$^{aa}$ is connected with the waste-weir of U$^6$, the other with the waste-weir of U$^7$. Hence when the valves are in the mean position, as shown in Fig. 52, both ports of the valve J$^a$ are uncovered, the feed-weirs of both the accumulator-valve organizations U$^6$ and U$^7$ are untrapped, and the water-supply flows into and traps both accumulator-valves, while all the ports of the valve J$^{aa}$ are inclosed between its pistons, and the compressed air flows through the connecting-pipes to the waste-weirs of both the accumulator-valve organizations U$^6$ and U$^7$ and traps them, so that the sealing-water in the accumulator-valves is retained therein. When the valves J$^a$ and J$^{aa}$ are moved, respectively, to opposite limits of their stroke, as shown in Fig. 53, that distribution-port of the valve J$^a$ which connects with the feed-weir of the valve organization U$^6$ is inclosed with the supply-port between the pistons of the valve, and the air feeds therethrough to the said feed-weir, traps it, and cuts off the feed-water from the accumulator-valve of the organization U$^6$, while that distribution-port of the valve J$^{aa}$ which communicates with the waste-weir of the organization U$^6$ is uncovered, so that the air trapped in said waste-weir is wasted, and the seal-water in the accumulator-valve of the system can waste through the waste-pipe and untrap and open the accumulator-valve of the organization U$^6$, so that the pneumatic accumulator can communicate with the left-hand side of the main valve and with the lock A to that side, while at the same time the distribution-port of the valve J$^a$ which communicates with the feed-weir of the valve organization U$^7$ remains uncovered, as before, and the distribution-port of the valve J$^{aa}$ which communicates with the waste-weir of said organization remains covered, as before, so that the accumulator-valve of the system U$^7$ remains closed when that of the system U$^6$ is opened. Vice versa, if the valve J$^a$ were moved to the upper limit of its stroke and the valve J$^{aa}$ to the lower limit the accumulator-valve of the organization U$^7$ would be opened, while that of the organization U$^6$ would be undisturbed.

A similar organization of feed and waste pipes to those just described is shown diagrammatically in Figs. 54 and 55 to feed water to the space inclosed between the gate 4$^a$ of the upper level 1 and the gate 18$^a$ of a lock, as A A, when it is elevated and has its gate-opening 18 registered with that, 4, of the upper level 1. In this organization pneumatic weirs are formed in feed-water pipes 120$^a$ and in waste-water pipes 120$^b$, the system being shown in duplicate as adapted to a pair of locks. The water-supply is derived from the upper level, being shown as feeding through a pipe 120$^{aa}$, and the waste-pipes descend into and seal in the lower level 2. As in the case of the pneumatic-accumulator valves U$^6$ and U$^7$ the separate pipes must operate independently, and also, as above recited, the operative air-valves J$^f$ and J$^d$, while shown in the diagram for the sake of clearness, are located in and are part of the interlocking apparatus before referred to. The air-valves J$^f$ and J$^d$ are double-acting and generally similar to those before described, the supply-ports s admitting compressed air centrally to the valve-shells between the end pistons and the distribution-ports and pipe connections being disposed exterior to the supply-port.

In Fig. 54 the section of the upper level 1 (shown in the left of the figure) has its gate 4$^a$ closed and no lock in register, and the section of the upper level 1 (shown in the right of the figure) has a lock A A registering therewith, the joint between the lock and upper level being packed to retain water by a rubber pipe 4$^c$, which is dilated by compressed air admitted to it from a supply through a valve J$^p$ and pipe connection, the valve being shown as similar to those already described. The feed-weir 120$^a$ in the left of the figure is trapped, so that water cannot flow through it, and the corresponding waste-weir 120$^b$ may be either trapped or untrapped, as it is not operative at such time; but the design of the controlling-valve is simplified if the functions thereof are alternate. Therefore said weir is shown untrapped, while the feed-weir 120$^a$ in the right of the figure is untrapped and the corresponding waste-weir 120$^b$ is trapped. Water can flow into the space in the right of the figure, between the registering and connected gated openings 4 and 18 of the upper level section 1 and lock A A, and such water will be retained therein, because the connected waste-weir 120$^b$ is sealed, and the joint between the registering faces of the lock and upper level is packed by inflating the rubber packing-pipe 4$^c$ with compressed air.

Fig. 55 shows both the upper level sections 1 without registering locks, both the rubber packing-pipes 4$^c$ deflated, both the feed-weirs 120$^a$ trapped, and both the waste-weirs 120$^b$ untrapped, the valve J$^f$ controlling the feed-weirs being placed so that all three of its ports are inclosed between its end pistons and the compressed-air supply is piped to both the feed-weirs, closing them, the valve J$^d$ controlling the waste-weirs being so placed that both the distribution-ports are uncovered and both waste-weirs exhausted of compressed air and the valve J$^p$, controlling the compressed-air supply to the packing-pipes 4$^c$, being so placed that both its distribution-ports are exterior to the valve-pistons and both the packing-pipes deflated.

In Fig. 54 a lock is shown with its gated opening 18 registering and connected with the gated opening 4 in the right of the figure, while the similar openings in the left of Fig. 54 and in Fig. 55 have no lock registering with them. Therefore the valve J$^p$, controlling the air-supply to the dilatable packing-pipes 4$^c$, is shown in Fig. 55 as in position to uncover and waste air from both its distribution-ports and deflate the pipes 4$^c$ and in Fig. 54 in position to uncover and waste air from the distribution-port connected with the packing-pipe 4$^c$ in the left of the figure and inclosing its supply-port and the distribution-port connected with the packing-pipe 4$^c$ in the right of the figure, where the lock is shown in register, so that said packing-pipe will be charged with air and inflated and pack the joint between the registering faces, so as to retain water therein, the valves J$^f$ and J$^d$ being shown in position to supply water to and prevent its waste from the said registered space. To that end the valve J$^d$ has its supply-port connected with the distribution-port communicating with the pneumatic weir in said right-hand waste-pipe, so as to close it and prevent the discharge of water, its other distribution-port connected with the left-hand weir being uncovered and the air in the said weir wasted, and the valve J$^f$ is in position to uncover the distribution-port connected with and waste air from the right-hand feed-pipe pneumatic weir, so that water can feed into the registering spaces, while the other distribution-port of the valve J$^f$ is inclosed with the supply-port and air is fed into the left-hand feed-pipe pneumatic weir and prevents the flow of water while no lock is in register.

In Fig. 55 the valve J$^f$ incloses all of its ports, so that both the feed-pipes are closed, and the valve J$^d$ excludes both its distribution-ports, so that both the waste-pipes are open.

In the operation of the locks, as hereinafter set forth, it is desired to move a lock while it is registering with and connected to an opening 4 of the upper level without breaking joints. To this end the packing is made of rubber or other suitable material in the form shown in Fig. 56. The packing-pipe 4$^c$ is curved, so as to remain flat when deflected, and has a projecting fin 4$^d$, the outer edge of which is bulbed, the fin lying in a rabbet formed in the jamb 4$^e$ of one of the openings, preferably the upper-level opening 4, and being suitably clamped there or otherwise secured. The contact-face, against which the pipe 4$^c$ presses when inflated, is preferably on the lock, is made of timber for convenience in construction and repair, and its lower part is prolonged into an apron $a$ of a height exceeding the probable variation between the highest and lowest stages of water in the upper level, so that no matter how the stage of water varies the lock can make a joint in such a position relating to the water-surface in the upper level that the proper operative depths and weights of water will obtain in the lock-chambers 17 when connected with the upper level.

As hereinbefore recited, the surcharged lock in descending to its lowest position relatively to the water of the lower level 2 functions to automatically induce the desired maximum air-pressure in the compressed-air charge and maximum displacement and surplus buoyancy in the newly-elevated lock, whereupon the main valve 14 in the air-conduit 13 should be closed. In this function of the locks a great part of the air-charge is transferred into the newly-elevated lock at maximum pressure, and the surplus power of the descending surcharge of water or overplus of weight in the recently-descended lock, over and above the power necessary to overcome the friction and accelerate the motion, is stored up in the recently-ascended lock in the form of high tension in the compressed air therein, and is safely retained by the closing of the valve 14 in the air-conduit 13. At a future period this power is utilized to initiate the upstroke of the depressed lock and raise it so high as to reduce the extraneous load of water on the plates 31, so that the surcharged elevated lock can raise it and itself descend. In order that the stored power may be so diverted, it is necessary to reduce the pressure in the depressed lock to a pressure less than the maximum pressure of equality which subsisted throughout the system when the main valve was closed. An approved automatic method of and apparatus for so doing is illustrated in Figs. 1 to 3, 6 to 9, inclusive, and 13 and 14 and in diagram in Figs. 60 and 61, which show compensating storage-reservoirs M of considerable height relatively to their horizontal cross-sectional area, preferably extending from near the top of the air-chamber to, or nearly to, the lower water level 2 when the lock is elevated, being shown exterior to the air-chamber in Figs. 1, 2, and 3 and interior thereto in Figs. 6 to 9, inclusive, and 14, which compensating storage-reservoirs have valvular mechanism M', preferably automatic, at or near their tops, which at proper times opens to admit air to and discharge it from them and closes to retain it, and located above the said reservoirs are flotation-chambers N, of very large horizontal cross-sectional area relatively to their height, closed on all sides except the bottom, and placed at such a height that when the movable locking member is ready to ascend they are partially immersed in the water in which said member floats. Valves N' are connected with the flotation-chambers to permit the escape of the air caught in them when the elevated lock descends, and floats or cushion members O, closed on all sides except the bottom, are located above the flotation-chambers.

The preferred form of automatic valvular mechanism M' consists in a rotating valve $M^2$, Figs. 63 and 64, connected with the reservoir M and having a riser-pipe $M^3$, extending under and toward or into the flotation-chamber N, the stem $M^4$ of the valve being connected with a rocking device $M^5$, consisting in two walking-beams $M^6$ and $M^7$, one fastened to the stem $M^4$ of the valve $M^2$, which forms its pivot, the other pivoted independently, both walking-beams being of equal length and pivotally connected at their ends to two cylinders, one, $M^8$, being of large area relatively to the other, $M^9$, and both divided into upper and lower parts by transverse diaphragms $M^{10}$, that of the smaller cylinder $M^9$ being air and water tight and that of the larger cylinder $M^8$ having a small perforation $M^{11}$. A stop $M^{12}$ limits the motion of the walking-beam. The operation of this device is as follows: Water which is in the upper part of the smaller cylinder $M^9$ cannot escape, and when it is immersed in water the air which is caught in the lower part of said cylinder cannot escape. On the contrary, water which may lie in the upper division of the large cylinder $M^8$ will escape through the perforation $M^{11}$, and when said cylinder is immersed the air which is caught in the lower division likewise escapes by said perforation. When the lock descends, the rocking mechanism $M^5$ is immersed, air is caught in the lower divisions of both cylinders, and their upper divisions become filled with water. Before immersion the weight of water in the small cylinder keeps the rocking mechanism $M^5$ horizontal and the valve $M^2$ closed, and at the time of immersion the volume of air caught in the lower division of the small cylinder $M^9$ is less than that in the lower division of the large cylinder $M^8$, and the greater displacement of water by the air in the large cylinder overmasters the similar displacement of the small cylinder, and, for a time, holds the rocking mechanism $M^5$ horizontal and the valve $M^2$ closed, retaining the air in the reservoir M; but the air in the large cylinder $M^8$ escapes through the perforation $M^{11}$, being forced out by the head of water acting on it, and the buoyancy of the large cylinder continues to decrease until it is less than the buoyancy of the small cylinder $M^9$, which thereupon rises, rocking the walking-beams and the valve $M^2$, opening it and permitting the air in the reservoir M to escape. When the lock rises and the rocking mechanism $M^5$ is lifted out of the water, the greater weight of water contained in the upper division of the large cylinder $M^8$ over that in the small cylinder $M^9$ overbalances and raises the latter and holds the valve $M^2$ open until the lock is fully elevated, so that air can enter the compensating storage-reservoirs M as they rise out of the water and until so much of its load of water has escaped from the large cylinder through the perforation $M^{11}$ that the small cylinder is heavier, whereupon the small cylinder will overbalance the large cylinder and raise it and close the valve $M^2$ and keep it closed until after it is again immersed, retaining the air in the compensating storage-reservoirs as they descend, as is clearly shown in Figs. 62 and 63. The valve N' in the flotation-chamber N consists in a U bend, having a short leg $N^2$, rising in the flotation-chamber N to or nearly to its top, a longer leg $N^3$ on the outside thereof, and a hole $N^4$, very small relatively to the transverse area of the bend, in its bottom. When the lock descends and the lower walls of the flotation-chamber N seal in the water of the lower level, the air therein being subject to pressure or "head" proportionately to the degree of immersion escapes through the U bends or valves N'. At the same time the water enters them through the hole $N^4$; but the hole $N^4$ being very small relatively to the transverse area of the bend and, moreover, because air at atmospheric pressure is twenty-eight times as mobile as water all the air in the flotation-chambers will escape before any considerable quantity of water will enter the valve N' through the perforation $N^4$, and when all the air in said chambers has escaped the water will flow over the top of the short leg $N^2$ and fill the valve N', and thereafter the valve N' will be inert until some little time after the lock has risen and the valve N' has been raised clear of the water a sufficient time to permit the water in said valve to escape through the hole $N^4$.

The automatic functioning of the locks and of the apparatus just described to induce the desired pressures and control the positions of the locks will be readily understood by reference to the general drawings and to the illustrative Figs. 60 to 65, inclusive. Beginning the description with one lock elevated, its lock-chamber containing the surcharge and its air-chamber containing the maximum air-pressure, the main valve 14 being closed and the other lock floating in the water of the lower level, ready to ascend, and containing in its lock-chamber the draft and weight of water desired at such times, which is less than the draft and weight of water in the surcharged elevated lock and in its air-chamber a less air-pressure than the maximum obtaining in the elevated member, the upward lift of which lesser pressure is in equilibrium with the downward effort of the weights of the depressed lock, the water in its lock-chamber, and the extraneous load of water on the projecting plates 31, then if the gates and the pneumatic accumulator-valve be closed and the main valve 14 be opened the air in the elevated lock will begin to expand into the place of less pressure— i. e., the air-chamber of the depressed lock— and to raise the same, and as the air-charge in the elevated lock expands its pressure falls, so that it cannot exclude from its air-chamber so great a depth of water, and water enters its air-chamber, seeking to establish conditions of equilibrium with the lowering air-pressure therein and in so doing expels still more air from the air-chamber of the elevated lock to that of the depressed lock, and as the depressed lock rises the depth and weight of water on the projecting plates 31 become less and the air within its air-chamber expands, tending to establish equilibrium with the lessening weight, raising the lock still higher, and these functions continue until the depressed lock has been raised so high that the depth and weight of water on the plates 31 have been so reduced that the pressure of equilibrium in its air-chamber is less than the pressure of equilibrium in the air-chamber of the elevated lock, whereupon the elevated lock begins to descend and the depressed lock continues to ascend until it comes in contact with its stops K and its upward motion is arrested. At such times the pressure in the newly-elevated lock being necessarily less than the pressure in the descending lock by the amount necessary to overcome friction and accelerate the motions the depressed lock continues to descend, seeking to establish equilibrium between its load and its contained air-pressure, and the plates 31 on the descending lock become immersed and subject to the weight of the water which has covered them. This weight being thus augmented proportionately to the degree of immersion of said plates and the pressure of equilibrium correspondingly raised, the lock continues to descend to induce yet higher pressures in its air-charge and to transfer said air-pressure to the newly-elevated lock, such functioning continuing until the descending lock has reached its lowest desired position, at which time it has induced the desired maximum pressure in the air-charge throughout the system and the desired maximum displacement and surplus buoyancy in the newly-elevated lock, the newly-depressed lock finding a position of equilibrium in which it floats in the desired lowest position, being at such time floated by the combined displacements of the immersed parts of its structure, the air within its air-chamber 7, the highly-compressed air in its compensating storage-reservoir M, as clearly shown in Fig. 61, and the floats, which latter are preferably made, as shown, in the form of open-bottomed cushion-chambers O, the effective displacement of which is the displacement of the air caught and trapped therein, and the degree of immersion of which regulates the degree of immersion of the movable member and the maximum pressure induced in the air-charge in the air-chamber 7, the volume of displacement and floating power of said floats being such that when the movable member is depressed any slight variation thereof from its desired position is automatically compensated by the increased or decreased displacement of said floats.

While the cushion-chambers O and flotation-chambers N have been herein set forth as separate, and such construction is preferred as giving a greater economy and precision in operating the movable member, it will be obvious to those skilled in the art that the cushion-chamber can, if desired, be made to include and discharge the function of the flotation-chamber also by extending the side walls of the cushion-chamber downwardly to the location occupied by the flotation-chamber and affixing the valve N' thereto in such position that when the movable member is descending a portion of air is discharged from said chamber sufficient to allow the member to be depressed to the desired position, and a portion of air is retained in said chamber sufficient to graduate and cushion the descent of the movable member and to float it at the desired position. The main valve 14 must now be closed. After the gates are opened and the elevated lock has received its surcharge of water the depressed lock is automatically pontooned, so that it will float at a higher level, expel the surcharge from its lock-chamber, and establish a lower air-pressure in its air-chamber, the pontooning being automatically effected by the transferral of air from the compensating storage-reservoirs M to the flotation-chambers N, while in the compensating storage-reservoirs the air was under a great head of water and its volume and floating power reduced to a minimum. When it is liberated and permitted to rise to the flotation-chambers, which are but slightly submerged, it is subject to a much less head and expands nearly to atmospheric pressure and its original volume and displacing power, thus increasing the displacement of the lock and causing it to rise, the transfer of air from the compensating storage-reservoirs to the flotation-chambers being automatically effected by the valvular mechanisms M', connected with the reservoirs M, the large cylinders $M^3$ keeping the valves $M^2$ closed after the lock reaches its lowest position for some little time, sufficient to permit the opening of the gates $18^a$ of the depressed lock, and thereafter, the air having escaped from the large cylinders $M^8$, the small cylinders $M^9$ rise because of the buoyancy induced by their retained volumes of compressed air, operate the rocking mechanisms $M^5$, and open the valves $M^2$, permitting the air to rise from the compensating storage-reservoirs M to the flotation-chambers N, thus automatically pontooning the lock. When it is desired to again translate the locks, the lock-gates are closed, the elevated lock is cut off from the pneumatic accumulator B, the main valve 14 is opened, and the above cycle of operations takes place between the now elevated and depressed locks. Figs. 57, 58, and 59 illustrate these functions clearly in diagrams which show the actual conditions existing in a pair of locks, ten feet draft, twenty feet wide, and seventy feet lift, the vertical divisions representing feet of lift, the horizontal divisions in Figs. 57 and 58 representing feet head of pressure on the compressed air, and in Fig. 59 representing hundreds of thousands of cubic feet of volume.

In Fig. 57 the lines P and P' bounding, respectively, the ordinates representing the pressures in the locks both read to agree with the actual vertical positions of the respective locks, so that the pressure indicated by the line P in the elevated lock at the top of the figure corresponds in time with the pressure indicated by the line P' at the bottom, and vice versa, and the motions of the two locks shown are opposite in direction, as they actually occur. For clearer comparisons, in Figs. 58 and 59 said lines are arranged so that the pressure in one lock relative to the pressure in the other lock at the same instant is shown by the same horizontal ordinate, and the lines P p, representing the condition in the descending lock, read its motions in the direction opposite to the actual motion of the lock. In Fig. 57 the horizontal upper portion of the line P represents the fall in pressure between the times of opening the valve 14 and the beginning of the descent of the lock. The vertical portion represents the pressure obtaining while the lock is descending and before the plates 31 become immersed. The inclined part represents the increase of pressure between the said and the last or lowest positions. The sharply-inclined bottom portion of the line P' represents the fall in pressure which occurs when the lock is pontooned. The sharp break at the zero-line represents the friction of rest, which must be overcome before the lock can begin to ascend. The inclined portion of the line P' represents the fall in pressure due to the diminishing load of water on the projecting plates 31 as the lock ascends. The vertical portion represents the uniform pressure obtaining while the lock is ascending after its plates 31 leave the water and before it engages with its stops, and the curved and horizontal portions at the top of the line represent the increase of pressure while the lock is overcoming these stops and after they have arrested its motion and the maximum pressure is being induced therein by the automatic functioning of the descending lock.

In Fig. 58 the lower inclined parts and the vertical part of the line P' have a similar significance, and the increase of pressure is indicated by the curved top portion, which, however, is not accompanied by motion of the newly-elevated lock, but is extended upward from the line 70 to keep it opposite the portions of the line P, indicating coincident pressures. The straight vertical part at the bottom of the line P in Fig. 58 and at the top of said line in Fig. 57 indicates a motion given to the lock, the purpose of which will hereinafter be explained. The inclined lower portion of said line P in Fig. 58 indicates the expansion of the air in its air-chamber after the valve 14 is opened and before the lock begins to descend and the reduction of head thereon the vertical portion, the pressure obtaining during the motion of translation and the inclined upper portion the increase of pressure after the plates 31 are immersed, the pressures indicated by any ordinate of the two lines P and P' in said figure being coincident in time. Fig. 59 represents by the length of its horizontal ordinates the total volume of the compressed-air charge, the inclined line $p$ representing the volume in the descending lock, the line $p'$ representing the volume in the ascending lock, and the space between the vertical lines $p^2$ representing the volume of air contained in the conduits. The amount of divergence of the lower inclined parts of the lines $p$ $p'$ represents the amount of expansion of the air while the depressed lock is moving the first part of its stroke and before the elevated lock begins to descend. The inclined parallel central portions represent the transferral of air without expansion during the middle part of their stroke, and the amount of convergence of the upper parts of the two lines $p$ and $p'$ represents the compression which takes place after the newly-elevated lock is arrested by its stops and while the descending lock is completing its stroke and coming to rest in its lowest desired position.

It is clearly shown that the motion of the two locks is not exactly synchronous, the depressed lock leading the motion of the elevated lock in this case by ten feet, this being a necessary sequence of the utilization of the expansive quality of the air as a storage-reservoir for power, in which power is stored at convenient seasons, to be subsequently released to do useful work, thus rendering the locks truly automatic in function and resulting in great economy in their construction and operation. Practical experience has demonstrated that this storage of power can be successfully accomplished without other extraneous appliances in all cases when the lift of the lock exceeds twice the maximum head, acting on the compressed-air charge. Obviously the relation between the maximum and minimum pressure of the compressed air and the volume thereof must be such that the reduction of pressure and the expansion will cause a flow of air from the elevated into the depressed lock sufficient to raise the latter safely beyond the critical point, at which its pressure of equilibrium would be equal to the pressure of equilibrium in the elevated lock. In locks of low lift it is difficult to realize this volume of expansion, and for such installations I prefer to use means of the character shown in Figs. 6 to 9, inclusive, in which a differential auxiliary air-tank $B^2$ is provided, which has a constant load and is differentiated by being made conical—small at the bottom and larger at the top—so that its weight is supported by a figure of displacement which varies in area directly as and in depth in proportion inversely to its degree of immersion. The load being constant, the volume of displacement necessary to support it must be constant, and the pressure will be least when the tank $B^2$ is fully immersed, because at that time the figure of displacement is of maximum area and least depth and the air-pressure a minimum, while when the tank $B^2$ is fully elevated the figure of displacement is of least area and maximum depth and the air-pressure maximum. The tank $B^2$ when making its cycle of movements receives from and gives back to the locks A AA a volume of air sufficient, when added to the volume of expansion of the air in the locks themselves, to compensate for the deficiency in the amount of such expansion and accomplish the desired automatic functioning, as above described. For example, assume a pair of locks seventy feet lift, ten feet draft, twenty feet wide, and two hundred and forty-five feet long, weighing when fully loaded three thousand seven hundred and fifty tons, requiring a maximum air-pressure equivalent to nineteen feet head of water, the pressure of equilibrium in the surcharged lock being sixteen feet and the volume of air in the two locks six hundred and fifty thousand cubic feet when at maximum pressure. The volume necessary to be expanded and displaced from the elevated to the depressed lock in order to raise the latter safely past the critical point would be sixty-one thousand five hundred cubic feet, of which thirty-nine thousand would be supplied by the expansion due to the reduction of head and twenty-two thousand five hundred would be due to the inflow of water into the air-chamber of the elevated lock. Obviously if the lift of the locks were reduced one-half the volume of the compressed-air charge would be reduced in nearly the same ratio and the thirty-nine thousand cubic feet of expansion would be reduced to twenty thousand cubic feet, or thereabout, and if the prescribed conditions—*i. e.*, the percentage of surplus buoyancy—remained the same as in the seventy-foot-lift lock the low-lift lock would not function properly without considerable modification of design. A constantly-weighted differentiating air-tank, such as above described, can be successfully applied to make good such deficiency in the amount of expansion of the compressed-air charge in low lift-locks. When so used, its air content should be just enough for that purpose and the taper of its walls should be such that when fully immersed its air-pressure is nearly equal to the pressure in equilibrium in the surcharged elevated lock with the lock so loaded, and that when fully raised its pressure is equal to the maximum, and an air-pipe $B^3$ should lead from its air-chamber $B^4$ to the main valve 14 and communicate therewith in its lower part, as shown in Figs. 6 to 9, inclusive, the said pipe $B^3$, having a descending leg $B^5$ of such height that when the main valve 14 is trapped the sealing-water can stand in the leg $B^5$ and seal it also, and when the main valve 14 is untrapped the pipe $B^3$ is also untrapped and communicates freely with the main conduit 13 and with the locks A AA.

The operation of the combination is as follows: When a lock is elevated and contains compressed air at maximum pressure, the main valve closed, the other lock depressed and floating freely, the elevated lock containing its surcharge and the depressed lock the draft of water with which it is to ascend, the differential tank $B^2$ in its highest position, containing its due volume of compressed air at maximum pressure, then, if the gates be closed, the pneumatic accumulator B cut off pneumatically, and the main valve 14 untrapped, the leg $B^5$ of the pipe $B^3$ is also untrapped and the two locks and the differential tank $B^2$ all communicate freely, and the compressed air will flow from the places of greatest pressure—*i. e.*, the elevated lock and the differential tank—to the place of least pressure—*i. e.*, the depressed lock—the air will be expanded and expelled, as before explained, from the elevated into the depressed lock, and at the same time the differential tank will descend and expel its content into the depressed lock, and the sum of the volumes of air thus transmitted to the depressed lock will be sufficient to raise it safely past the critical point, when the depth and weight of water on the plates 31 will be so far reduced that the pressure in said lock will be less than the pressure which would be in equilibrium in the elevated lock with its load. The ascending lock will continue to ascend until it is arrested by its stops and the descending lock will continue to descend until its plates 31 are immersed and its air-pressure thereby increased, whereupon, the pressure in the descending lock being now greater than the pressure which would begin to raise the lowered differential tank $B^2$, said tank will begin to be raised by air transferred to it from the descending lock, and as it rises the horizontal area of its figure of displacement decreases, the head of its contained air inversely proportionately increases, and at the same time and in the same ratio the pressure in the descending lock increases, because the extraneous load borne on its plates 31 increases, and the air is expelled at ever-increasing pressure from the descending lock into the differential tank and the newly-elevated lock until the descending lock has reached its lowest desired position, at which time the pressure in the system has reached the maximum in both locks and the differential tank and the newly-elevated lock is thrust up against its stops with the desired surplus buoyancy. The main valve 14 should now be trapped, which operation also traps the riser $B^5$, and the locks and differentiating tank are all pneumatically disconnected. The elevated lock may now be connected with the pneumatic accumulator B, the gates opened, and the newly-depressed lock will automatically pontoon itself, as above described, and when the elevated lock has been surcharged and the gates closed the locks will be ready for another stroke.

From the above description of the functions of the compensating storage-reservoirs M, flotation-chambers N, cushion-chambers O, and the roof-plates 31, covering the horizontal extensions of the air-chamber 7 beyond the lock-chamber 17, it will be obvious that their proper automatic functioning depends upon their proper proportioning one to another and also primarily upon their being attached to the movable locking member in correct positions, so that when the movable locking member is depressed they will function properly with the water in which the movable member floats. In most locations it is economical and desirable that the water of the lower level 2 should be utilized for the flotation of the movable locking member, as illustrated in Figs. 1 to 10, inclusive, because such an organization avoids the expense of constructing a dry-dock in which to land the depressed lock and the dangers incident to its proper maintenance; but in special cases, such as illustrated in Figs. 13 and 14, the first cost can be much reduced by building the entire apparatus above ground, the water-chambers to contain the water in which the movable locking member floats being tubular sections $5^a$, the lock-chambers 17 being always in the air, the air-chamber 7 being made in tubular sections $7^a$ of such height that when the movable member is depressed the upper roof-plates 31 will be suitably submerged in the water in the chambers $5^a$ and take on a load of water sufficient to induce in the air-chambers the desired maximum air-pressure, and the compensating storage-reservoirs M, flotation-chambers N, and cushion-chambers O being properly proportioned and attached to the tubular air-chamber sections $7^a$ in such positions that when the movable member is depressed they will function with the water in which it floats in the manner hereinbefore described.

The upper bearing $18^b$ on the gate-post is preferably formed on a ferrule $18^c$, which is first lined on the gate-post and then keyed on with wedges $18^i$, and an arm $18^d$ overhangs a shoulder or runaway $18^e$, formed on the gate $18^a$ and engages therewith by a roller $18^f$, pivoted on the arm $18^d$. The pin-teeth $18^g$ of the wheel-segment of the gate are riveted at the inner end into a plate secured on the gate, and at the other into a heavy angle-bar the standing leg of which forms the runaway $18^e$, Figs. 71 to 73 further illustrating this construction.

Fig. 68 illustrates the method of conveying the air from the controlling-valve at the interlocker to the separate gate-engines. It will be obvious that when the lock, as A, is elevated and its adjacent gated opening 18 is registering with a gated opening 4 in the head-wall 3 the adjacent gates $4^a$ in the head-wall and $18^a$ in the lock must be opened for the passage of boats between the lock-chamber 17 and the upper level 1, and its outboard-gate $18^a$ must be closed to retain the water and vessel in its lock-chamber 17. At the same time the other lock, as AA, is depressed and its outboard-gate must be opened that vessels may pass between the depressed lock and the lower level 2, and entry and exit of vessels to and from its lock-chamber 17 will be greatly facilitated in case both gates be opened and the water can move freely in advance of and behind the boat instead of being forced through the narrow interstices between the skin of the boat and the sill and posts of the gate-opening, as must be the case were only the outward gate opened. It is therefore desirable that air should be admitted at one and the same time to both the gate-engines on the depressed lock and cut off from the gate-engine of that gated opening 4 in the upper level or head-wall 3 which is axial and adapted to register with the depressed lock, and that air should be admitted to the gate-engines of the other opening 4 in the head-wall and the adjacent registering inboard-gate opening 18 of the elevated lock, and that it should be cut off from the outboard-gate engine thereof, and that when the positions of the locks are reversed the distribution of air to the gate-engines should be inverse. It will be seen that the inboard-gates of both locks may be opened every time. The head-wall gates must be opened alternately, each when its axial lock is elevated and registers with it, and the outboard-gate of each lock must be opened when it is depressed and remain closed when it is elevated. If the friction of the gates were a direct and constant coefficient of the hydrostatic pressure acting against them when closed, the problem would be very simple, as the engines could be made of only sufficient power to open the gates when they were subject to less than a certain pressure, in which case air could be piped to all the engines and a gate would be opened only when it was in predetermined relations to the water-surfaces; but this simple plan is inadmissible. The first requirement of the gates is to work. They must be supplied with sufficient power to move them beyond peradventure in case one of the other gates is carried away, and when ice is floating or forming, and to break or cut through any obstruction of common occurrence, such as floating sticks, tow-lines, or others of the small numerous floating objects common in much-navigated waters. It is therefore necessary to provide positive distribution for the operating air-service, and in order to keep the interlocking mechanism simple it is desirable that automatic controlling-valves be used where they can be without disadvantage. Such a desired system is shown diagrammatically in Fig. 68, in which $J^e$ is a three-way valve controlling the air-supply pipe $g^4$, which at its connection with the valve $J^e$ has two branches $g^{47}$ and $g^{48}$, each connecting with one delivery-port thereof. One branch, as $g^{47}$, has a branch $g^{49}$, serving the engine of the head-wall gate $4^a$, and a check-valve $g^{50}$ beyond said branch $g^{49}$. The other branch, $g^{48}$, also has a check-valve $g^{50}$, and beyond said check-valves the branches $g^{47}$ and $g^{48}$ unite and are connected with the supply-pipe $g^4$ on the locks by a loop of flexible tubing $g^{51}$. A ball-valve $g^{52}$ is located in the lock service-pipe $g^4$ between the inboard and outboard gates, being at such a height that when the lock is depressed it is submerged, its float $g^{53}$ is elevated, and the valve $g^{52}$ opened, and when the lock is elevated the float $g^{53}$ falls and closes the valve $g^{52}$. When the lock is elevated and registering with the opening 4 in the head-wall 3, the three-way valve $J^e$ is moved to connect the air-service with the branch $g^{47}$, by which it is piped to the engine on the head-wall, and the inboard-engine on the lock is cut off from the outboard-lock engine by the closing of the ball-valve $g^{52}$, and by the check-valve $g^{50}$ in the branch $g^{48}$ air is prevented from returning through the branch $g^{48}$ to the idle end of the three-way valve $J^e$. When the lock is depressed, the valve $J^e$ connects the supply with the branch $g^{48}$, by which it is piped to both the lock-gate engines, the ball-valve $g^{52}$ being then open, and at the same time the check-valve $g^{50}$ in the branch $g^{47}$ cuts off the air-service from the engine of the gate $4^a$.

Figure 79:
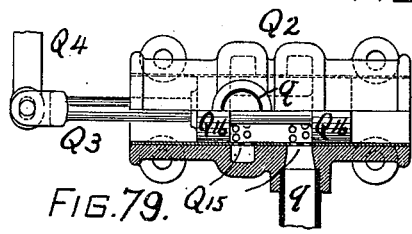
Figure 80:
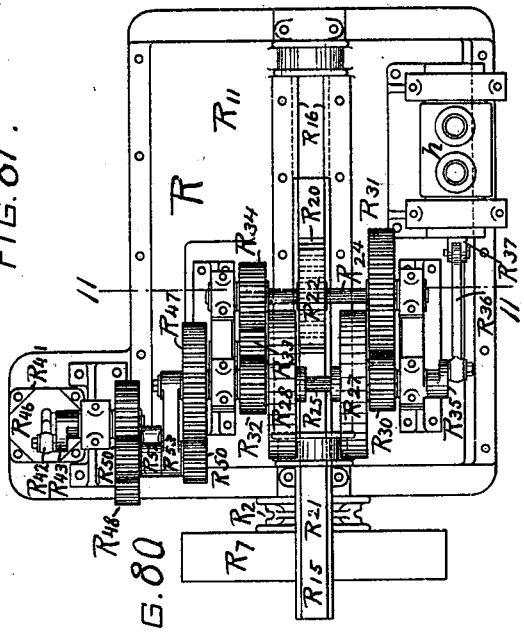

Fig. 67 shows in diagram an organization Q, which pneumatically controls a lock device $j^2$, connected with the interlocker, which may be thereby secured against being moved, so that the operations of the lock are entirely suspended in case a gate is open or improperly seated until each and every gate in the system is properly closed and seated, and Figs. 78 to 86, inclusive, show the details thereof. An air-pipe $q$ connects with the air-chamber 7 of each lock near the outboard-gate and extends thence to a valvular organization $Q'$, operated by the outboard lockgate, thence to a similar organization operated by the inboard lock-gate, thence to a similar organization operated by the gate $4^a$ of the head-wall opening 4, and thence to the interlocker, where it operates the safety locking device $j^2$, before referred to. In its passage through the pipe air has to pass a valve $Q^2$ at each gate, and each of said valves is so connected with its gate that if the gate be open or improperly seated the valve is closed, the air-service is cut off, and the interlocker is securely locked. The valve $Q^2$, which may be of any preferred type, is shown in Fig. 79 as a piston-valve, with two ports $Q^{15}$ and a double piston $Q^{16}$, such that it may inclose and connect the ports $Q^{15}$ or separate them and waste the air from one port, the valve being moved by means of a stem $Q^3$ and lever $Q^4$, which is controlled by a cam $Q^5$, formed in a wheel $Q^6$, geared to a gate, as $18^a$. For convenience of construction the cam-wheel $Q^6$ is an element in a worm-gearing the worm $Q^7$ of which has suitable bearings and is geared by bevel-wheels $Q^8$ to the driving-shaft $g^{13}$, which is geared to the gate-segment $18^g$ by the spur-gear $g^{14}$. The apparatus being suitably set, when the gate $18^a$ is properly seated the functional part $Q^9$ of the cam $Q^5$ moves the lever $Q^4$, and thereby the valve-piston $Q^{16}$, to the position shown in Fig. 79, inclosing the valve-ports $Q^{15}$ between the pistons $Q^{16}$ and establishing free passage for air past this particular organization. When the gate is not properly seated, the lever engages the concentric part of the cam $Q^5$ and the valve-piston $Q^{16}$ is moved, so as to separate the two ports $Q^{15}$ and waste air from that one which is nearest to the interlocker.

In order that compressed air may pass from the air-chamber 7 of the lock to the interlocker, it is obviously necessary that each of the gates be properly seated, for if one gate were not properly seated its connected valve $Q^2$ would be closed against the passage of the compressed air and would waste the air from that section of the pipe $q$ between it and the similar organization or organizations between it and the interlocker or, in case of the organization connected with the gate $4^a$, between it and the interlocker.

Figs. 66 and 69 show, diagrammatically, the relations between a lock, as A, its hydraulic stops $K^3$, a hydraulic accumulator-intensifier I, connected with them, the interlocker J, and an automatic adjustable stop-machine R, which automatically stops and controls the motions of the lock when at or near the upper limit of its stroke. The hydraulic accumulator-intensifier I is of the type described in Letters Patent of the United States No. 635,847, granted and issued to me under date of October 31, 1899, and is adapted to generate two pressures—a normal or lesser and a higher or intensified pressure. The total effect of the normal pressure when acting in all the hydraulic stops $K^3$, connected with a lock, is less than the superbuoyancy of the lock, so that a lock can overcome the power of the accumulator at normal pressure, retract the hydraulic stops, raise the accumulator-weight $I^2$, and rise, while the total effort of the higher or intensified pressure, acting in all the stops, exceeds the surplus buoyancy of the lock, and the intensified pressure will overcome the lock's buoyancy and push it down.

The combination of the superbuoyant lock or lock having an elastic support exceeding in lift the downward effort of its load with the synchronizing rolling shafts of the auxiliary C and the hydraulic stops $K^3$ and hydraulic accumulator-intensifier I and valve-controlled hydraulic connections between the latter attains the result of a safety and facility of operation which have never before been attained in locking apparatus. The superbuoyancy of the lock gives absolute immunity from danger of dropping the load, the synchronizing shafts give a like immunity from the danger of a lock's pitching under unequal loading, and the hydraulic stops $K^3$ and accumulator-intensifier I, with their valve-controlled hydraulic connections and immediately-available power at varying pressures, enable the operator to absolutely control the motion and elevation of the elevated lock and to move it up or down under valvular control within limits narrow, it is true, but sufficient in range for the conditions of practical and efficient operation. The tendency of the locks to rise is opposed by the hydraulic stops, and when the valve $h$, controlling the latter, is closed the lock is held stationary. If the valve $h$ be opened, the lock retracts the stops, raises the accumulator-weight $I^2$, and thereby stores up power which can, when desired, be used to lower the lock by opening the intensifying-valve $i$ coincidently with and slightly in lead of the valve $h$, thus raising or intensifying the hydraulic pressure and utilizing such intensified pressure in the stops $K^3$.

The connection with the automatic stop-machine removes the personal equation in the operation of stopping the motion of the elevated lock at the proper altitude, and its combination with the hydraulic control renders it safe to "swell" the boats in and out of the elevated lock, and thus to greatly expedite the passage of boats and increase the capacity of the locks. To this end the ascending lock contains a draft of water considerably exceeding the maximum draft of the boats. When it is elevated, it is automatically stopped with the water-surface in its lock-chamber 17 level with that in the upper level 1, and its inboard gated opening 18 is registered and connected with the adjacent gated opening 4 in the head-wall 3. The inclosed space between the gates $18^a$ and $4^a$ is filled or nearly filled with water, and the gates $18^a$ and $4^a$ are opened, so that the lock-chamber 17 connects with the upper level 1.

The boat just locked up is "swelled" out into the upper level by opening the hydraulic valve $h$, the intensifying-valve $i$ being closed, and the lock by its buoyancy retracts the hydraulic stops $K^3$ and raises the accumulator-weight $I^2$, rises, and as it rises tends to lift the water in the lock-chamber 17 to a higher level than the water-surface in the upper level 1, with which it is connected, and the boat is swelled out of the lock. The lock rises until the draft or depth of water measured from the water-surface in the upper level 1 to the sill of the gated opening 18 is the proper navigable draft, whereupon the automatic stop-machine R arrests the motion by closing the hydraulic valve $h$. The boat goes out as the lock rises, and the overplus of water in the lock-chamber tending to flow out into the upper level 1 overcomes the inertia of the boat and as the boat goes out falls behind it into the space it vacates.

When a boat is entering the lock, the intensifying-valve $i$ is opened coincidently with and slightly in lead of the hydraulic valve $h$. Hydraulic power at intensified pressure is admitted to the hydraulic stops $K^3$, and they force the lock down a sufficient distance so that the draft in the lock-chamber measured from the water-surface in the upper level 1 exceeds the draft which obtained in the ascending lock and water enters the lock in quantity equal to the sum of that used to swell out the leaving boat plus the desired surcharge to operate the locks, the entering boat being thus swelled in, the automatic stop-machine R arresting the motion by closing the hydraulic valve $h$ and intensifying-valve $i$.

The hydraulically-controlled motions could be made, at a considerable loss of power, by wasting on the upstroke the content of the hydraulic cylinders and using for the downstroke an accumulator of ordinary construction; but the system shown requires much less power.

The accumulator-intensifier I has an annular weight $I^2$, preferably built in place, of concrete, about a central well $I^3$, large enough to admit workmen to assemble, repair, or dismantle the apparatus, a lower central accumulator-cylinder $I^4$, and a ram $I^5$, working therein, on which the weight $I^2$ is suspended and which is counterbored to form the cylinder $I^6$ for the intensifying-ram $I^7$, the reactions of the rams being suitably supported, preferably by a frame built within the well $I^3$. The hydraulic distribution and service pipe $I^8$ connects with the accumulator-cylinder $I^4$, has a branch $I^9$ for pump service, a riser $I^{10}$, leading to the intensifying-valve $i$, from which a pipe $I^{11}$ leads to the intensifying-cylinder $I^6$, the branch $I^{11}$ being joined to the intensifying-ram $I^7$, which has a central bore connecting with the cylinder $I^6$. A circulating-pipe $I^{12}$ connects the intensifying-valve $i$ with a service-tank $I^{13}$, and a compressed-air service-pipe $I^{14}$ connects the valve $J^1$ of the interlocker J with an operating-cylinder and piston $I^{15}$, by which the intensifying-valve $i$ is opened, closure being effected by a spring $I^{16}$. The valve $i$ is a balanced three-way valve. In the figure it is shown cutting off the intensifying-cylinder $I^6$ from the accumulator-cylinder $I^4$ and connecting it with the circulating-tank $I^{13}$, so that the weighted ram can move freely upward, water being then expelled from the intensifying-cylinder $I^6$ into the circulating-tank, and can move down without causing a vacuum in the cylinder $I^6$, as water from said tank can freely enter it. To reverse the intensifying-valve $i$, air from the interlocker is admitted under the piston $I^{15}$, the valve-piston $I^{18}$ is raised thereby, so as to cover the upper port and cut communication with the circulating-pipe $I^{12}$ and tank $I^{13}$ and inclose and connect the ports to the pipes $I^{11}$ and $I^{10}$ and the accumulator and intensifying cylinders $I^4$ and $I^6$. When the accumulator-weight descends, with the intensifying-valve its connecting the cylinders $I^4$ and $I^6$, a part of the water expelled from the cylinder $I^4$ goes into the cylinder $I^6$ and intensifies the pressure, the intensification depending on the fraction thus diverted, or, what is another form of statement, on the relative effective areas of the two rams.

The apparatus can be computed either by the mechanical law of work equivalent or the mathematical law of summation of series, of which it offers a mechanical proof. For example, if the effective area of the ram $I^7$ be one-third that of the ram $I^5$ then the pressure generated in the cylinder $I^4$ by the weight $I^2$ being operative in the cylinder $I^6$ on a surface one-third the area of that of the ram $I^5$ will intensify the pressure therein one-third, which one-third, acting in like manner, will intensify it one-ninth, which will intensify it one twenty-seventh, &c., to summation, the intensification of pressure being as the series $$\tfrac{1}{3}+\tfrac{1}{9}+\tfrac{1}{27}+\tfrac{1}{81}+\tfrac{1}{243}, \&c., = \tfrac{1}{2}.$$

Explaining it by work equivalent, if when the cylinders are disconnected the weight induces a pressure of one thousand then when the weight descends one unit the work done is one thousand power units and the connected hydraulic stops, to which all the work is transmitted, will overcome equal resistance or one thousand through one unit. If, now, the pressure be intensified, only two-thirds of a unit of volume goes to the work in the stops, while one-third goes to intensify pressure. The work being the same and the stroke of the stops only two-thirds, the pressure must be equal to the work divided by the distance moved in doing work or $$1,000 \div \tfrac{2}{3} = 1,500.$$

As shown applied in Figs. 1, 2, 5, 6, 10, 43, and 44 and in diagram in Figs. 66 and 69, the hydraulic stops $K^3$ are located one at each of the anchorages alongside the locks. All the stops connected with a lock are piped together, so that if one stop springs a leak or one section of the hydraulic service-pipe be ruptured the hydraulic pressure will fall in all the stops equally and there will be no danger that one stop or the stops on one side of a lock will yield while the others resist, which would be dangerous to the lock and to the guides 51.

The hydraulic valve $h$, which controls communication between the stops and the accumulator-intensifier, is intended to be closed by the automatic stop-machine R and to be opened by the operation of a valve $J^h$, which is part of the interlocker. The automatic stop-machine R, Figs. 80 to 95, is driven by an endless chain $r$, connected to the lock, running over suitable guiding-pulleys $r'$, and meshing with a chain sprocket-driving pulley $R^2$ on the machine R, which pulley is adjustably connected to the driving-shaft $R^3$ by a worm $R^4$ meshing with a worm-wheel $R^5$, keyed to the driving-shaft $R^3$, the bearings and abutments $R^6$ of the worm $R^4$ being on a disk $R^7$, secured to the driving sprocket-pulley $R^2$, so that when the worm $R^4$ is turned the sprocket-pulley $R^2$ is angularly adjusted relatively to the driving-shaft and the point of attachment of the chain $r$ to the lock, their relative positions being indicated by a pointer $R^8$ on a graduated dial $R^9$, which to give the reading of a long adjustment may have a spiral groove in which the hooked end of the pointer $R^8$ engages, the pointer having radial travel in the bearing $R^{10}$, so as to maintain the engagement.

In general terms, the stop mechanism consists in a bed plate or frame $R^{11}$, supporting the main shaft in bearings, a differentially-threaded drum $R^{12}$, keyed on the driving-shaft and having a slow-pitch thread $R^{13}$ on the drum $R^{12}$, intended merely to maintain the engagement of motive parts during the great part of the travel of the lock when it is not desired the stop-machine shall function, and a quick-pitch thread $R^{14}$, which is the functional part and is preferably cut in an enlarged section of the drum and to the bottom of the slow thread $R^{13}$. A traveler $R^{15}$, adapted to be reciprocated in guides $R^{16}$, formed on the frame $R^{11}$, is provided on its reverse face with a male differential thread-section $R^{17}$, having a quick-pitch thread $R^{18}$ and slow-pitch thread $R^{19}$, adapted to mesh, respectively, with the quick and slow pitch threads $R^{14}$ and $R^{13}$ on the drum $R^{12}$. Obviously the longitudinal motion of the traveler $R^{15}$ relatively to the angular motion of the drum $R^{12}$ and the lock, as A, which actuates it, will be proportional to the pitch-threads engaged at the instant under consideration. Motion is transmitted from the traveler $R^{15}$ to the hydraulic valve $h$ by means of toothed gearing actuating a crank linked directly to the piston $h^2$ of the valve $h$.

The elements of the transmission consist in a rack $R^{20}$, formed on the obverse face of the traveler $R^{15}$, on both sides of which are contact-planes $R^{21}$, coincident with the pitch plane of the rack $R^{20}$, and a wheel-segment $R^{22}$, (best seen in Figs. 88 and 91,) having flat engagement-surfaces $R^{23}$, tangent to the pitch line, on each side of the toothed section, said segment being keyed to a driving-shaft $R^{24}$, which is connected with the valve-operating crank-shaft $R^{25}$ by a double transmission-gearing adapted to turn the crank-shaft always in the same direction (backward) whichever way the drum $R^{12}$ and the wheel-segment $R^{22}$ may be rotated by the lock. In this transmission, as seen in Figs. 87 and 88, left-hand ratchet-wheels $R^{26}$ are keyed to the crank-shaft $R^{25}$, contiguous to disks $R^{27}$ $R^{28}$, loose on said shaft, each provided with multiple left-handed pawls $R^{29}$. The disk $R^{27}$ is fastened to a spur-wheel $R^{30}$, which meshes with a spur-wheel $R^{31}$, keyed to the driving-shaft $R^{24}$. The disk $R^{28}$ is fastened to a spur-wheel $R^{32}$, which by means of an intermediate wheel $R^{33}$ on an idle shaft trains with a spur-wheel $R^{34}$, keyed on the driving-shaft $R^{24}$. The crank-shaft $R^{25}$ has on its near end a crank $R^{35}$, pivotally connected by a link $R^{36}$ to the stem $R^{37}$ of the valve $h$, and its opposite end is connected to a positive differential crank-motion $R^{38}$, adapted to impart rotation to the crank-shaft by fluid pressure (compressed air) transmitted from the interlocker by a pipe $R^{39}$, the air acting to move a piston $R^{40}$, working in a cylinder $R^{41}$ and connected by a link $R^{42}$ to a crank $R^{43}$, which is connected with the positive differential crank-motion $R^{38}$, the crank-pin $R^{44}$ of the crank $R^{43}$ engaging a slot $R^{45}$ in the outer end of the link $R^{42}$ for purposes to be hereinafter explained. A piston-and-crank movement not being reliably operative when it approaches the dead-point, the top of the cylinder $R^{41}$ is nearly closed with a head $R^{46}$, and the cylinder is made of such length relatively to the crank length that the piston $R^{40}$ in making its full stroke will move the crank $R^{43}$ considerably less than a half-circle—say one hundred and forty-four degrees—thus limiting the motion so that it will be positive, the slot $R^{45}$ being provided so that after the piston $R^{40}$ has been arrested by the head $R^{46}$ the crank-pin can pass its upper dead-point, revolve in the other side of its circle, pass its lower dead-point, and return the piston $R^{40}$ to its lower position, ready for another upstroke.

The positive differential crank-motion consists in a spur-gear $R^{47}$, keyed centrally on the valve-operating crank-shaft $R^{25}$, and a similar spur-gear $R^{48}$, which may be of equal diameter, keyed eccentrically on the shaft $R^{49}$ of the crank $R^{43}$, the spur-gears $R^{47}$ and $R^{48}$ being trained together by intermediate spur-gears $R^{50}$, keyed to a spindle $R^{51}$, which has its bearings in the outer ends of two links $R^{52}$ and $R^{53}$, the other ends of which are centrally pivoted, respectively, on the wheels $R^{47}$ and $R^{48}$. The functions and mode of operation of this apparatus are as follows: The lock, as A, when in motion moves the endless chain $r$ and by its engagement with the chain-sprocket driving-pulley $R^2$ rotates the main shaft $R^3$ and the drum $R^{12}$. When the drum rotates, the engagement of the differential threads $R^{13}$ $R^{14}$ on the drum with the differential male threads $R^{19}$ $R^{18}$ on the reverse face of the traveler $R^{15}$ causes it to traverse in its guides $R^{16}$ and at proper times to engage the rack $R^{20}$ on its obverse face with the toothed wheel-segment $R^{22}$, keyed to the driving-shaft $R^{24}$, and thereby causes the apparatus to function, functioning being prevented at other times by the contact of the pitch-face $R^{21}$ on the traveler with a tangential face $R^{23}$ on the segment $R^{22}$. The apparatus is intended to function only when the lock is at and near the upper limit of its stroke, the precise points of functioning being determined with reference to the stage of water in the upper level 1 of the canal, to which stage the apparatus is adjusted periodically by turning the worm $R^4$ and changing the angular position of the main shaft $R^3$ and the drum $R^{12}$ relatively to the driving sprocket-pulley $R^2$ and to the point of attachment of the chain $r$ to the lock A, the worm being suitably rotated until the reading of the pointer $R^8$ on the dial $R^9$ corresponds with the observed stage of the water in the upper level. While the lock is making its upstroke, it turns the drum and for the greater part of the lock's stroke the slow thread $R^{13}$ on the drum engages the slow male threads $R^{19}$ on the traveler $R^{15}$, which moves slowly from right to left and the pitch-face $R^{21}$ thereon engages the left-hand tangential face $R^{23}$ on the segment $R^{22}$, the machine not functioning, the object being at such time to keep the parts in mesh throughout the stroke and at the same time to reduce the size of the apparatus. When the lock has so risen that the surface of its contained water is, say, twelve inches lower than the water-surface in the upper level 1, the quick thread $R^{14}$ on the drum engages the quick male thread $R^{18}$ on the traveler $R^{15}$, which is thence moved with relatively great quickness, its rack $R^{20}$ engages the toothed portion of the wheel-segment $R^{22}$ and rotates the segment, together with the driving-shaft $R^{24}$, forward, and by the engagement of the spur-wheels $R^{31}$ and $R^{30}$ rotates the disk $R^{27}$ backward—i. e., against the hands of a watch—so that one of its pawls $R^{29}$ engages its contiguous ratchet-wheel $R^{26}$ and rotates the crank-shaft $R^{25}$ in the same direction, the spur-gears $R^{34}$, $R^{33}$, and $R^{32}$ at the same time rotating the other disk $R^{28}$ forward, so that its pawls $R^{29}$ will run over the contiguous ratchet $R^{26}$. At the same time the positive differential crank-motion $R^{38}$ is rotated, idly moving the piston $R^{40}$ in the cylinder $R^{41}$. The rotation of the crank shaft $R^{25}$ and its crank $R^{35}$ moves the piston $h^2$ of the hydraulic valve $h$. The valve $h$ is closed when the lock begins its upstroke, and the apparatus is so timed by the adjustment that just before the lock-brackets $28^b$ engage the hydraulic stops $K^3$ the automatic apparatus opens the hydraulic valve $h$ to allow the lock to rise to its desired position aforesaid, retracting the stops $K^3$, raising the weight $I^2$ of the hydraulic accumulator I, and storing hydraulic power therein, and when the lock is raised to the desired position it again closes the valve $h$, the crank-shaft making, as near as may be, a revolution while the lock is rising, say, twelve inches. The water-surfaces being now coincident in the lock-chamber 17 and the upper level 1, the operator at the interlocker J moves the proper levers $L'$ $L^2$ $L^3$ $L^4$ to close the main valve 14, open the accumulator-valve $U^7$, inflate the jointing-pipes $4^e$, and make the joint between the adjacent faces of the lock and head-wall flood the space between the gates thereof and open the gates. When the gates are opened and the boat which has been locked up is about to leave the lock, the operator at the interlocker moves a lever $L^5$, which opens a valve establishing connection between a source of compressed air and the cylinder $R^{41}$. The piston $R^{40}$ is forced out, the crank $R^{43}$ and crank-shaft $R^{49}$ of the positive differential motion are rotated, say, one hundred and forty-four degrees, and the differential crank-motion $R^{38}$ rotates the valve-crank shaft $R^{25}$, say, two hundred and ten degrees, opening the valve $h$, (the intensifying-valve $i$ being yet closed,) whereupon the lock overcomes the accumulator-pressure in the hydraulic stops, rises, retracts them, and lifts the accumulator-weight $I^2$, again storing hydraulic power, and such upward motion of the locks rotates the drum $R^{12}$ and functions the automatic stop-machine R in a manner similar to that before described to close the hydraulic valve $h$ and automatically stop the lock when it has risen, say, eight inches and has swelled the boat out into the upper level. To prepare the lock for its descent, it must be lowered sufficiently so that water will flow into its lock-chamber 17 from the upper level 1 to the amount used to swell out the boat locked up plus the "surcharge" or excess draft and weight necessary to properly effect the translation, and if there be a boat ready to lock down it is swelled into the lock-chamber by the water so flowing into it. To this end the operator at the interlocker moves a lever $L^5$, which admits compressed air to the under side of the piston $I^{15}$, connected with the intensifying-valve $i'$, and opens said valve, and immediately subsequent thereto admits air to the under side of the piston $R^{40}$ of the differential crank-motion $R^{38}$, and thereby opens the hydraulic valve $h$ in the manner before described. The intensified hydraulic power is thereupon admitted to the hydraulic stops and pushes the lock down the desired amount, so that the necessary volume and weight of water can flow into it from the upper level 1 and swell in the incoming boat, if there be one. As the lock moves downward the chain-gearing $r$ rotates the drum $R^{12}$ backward, the engaged quick threads $R^{14}$ and $R^{18}$ on the drum, and the traveler $R^{15}$ move the traveler from left to right, rotating the segment $R^{22}$, shaft $R^{24}$, and gear $R^{31}$ backward, and through the agency of the gear $R^{33}$ rotating the gear $R^{32}$ and disk $R^{28}$ backward, so that one of its pawls $R^{29}$ will engage the contiguous ratchet-wheel $R^{26}$ and rotate the crank-shaft $R^{25}$ and crank $R^{35}$ also backward, which motion automatically closes the valve $h$ and arrests the downward motion of the lock, the gear-wheel $R^{31}$ on the driving-shaft $R^{24}$ at such time turning the wheel $R^{30}$ and disk $R^{27}$ forward, so that its pawls will run over the contiguous ratchet $R^{26}$, and the differential crank-motion $R^{38}$, being idly rotated, restoring the piston $R^{40}$ to lower operative position. At this end of the cycle of motions the slow male differential thread $R^{19}$ is about to mesh with the slow female thread $R^{13}$ on the drum $R^{12}$. The pitch-surface $R^{21}$ on the traveler $R^{15}$ is about to contact with the tangential surface $R^{23}$ on the segment $R^{22}$, and the automatic machine R is about to enter the idle part of its rotative movement, the machine not functioning again until the upper limit of the succeeding stroke of the lock. It has been recited that the upward motion of the lock in, say, twelve inches of its stroke functions to open and close the valve $h$ and in, say, the succeeding eight inches functions to close it, while in an equal total downward motion of, say, twenty inches it functions merely to close the valve. The trains $R^{30}$, $R^{31}$, and $R^{32}$, $R^{33}$ and $R^{34}$ indicate by their relative dimensions this difference in duty.

The positive differential crank-motion $R^{38}$ by properly proportioning its members can be made to give great variations in peripheral and angular velocities. The eccentrically hung spur-wheel $R^{48}$ has an eccentric motion about its shaft-bearing $R^{49}$, and in its eccentric motion swings the train $R^{50}$ bodily about the center of the wheel $R^{47}$, giving it an angular velocity, due to the eccentric motion. At the same time the wheel $R^{50}$, in mesh with $R^{48}$, has a varying peripheral velocity corresponding with the axially linear velocity of a point in a hypocycloid, moving very slowly when the contact point is adjacent and very rapidly when it is opposite to the crank-shaft $R^{49}$, and the transmission-gear $R^{50}$, in mesh with the gear $R^{47}$, further varies the velocity of the latter as the point of tangency travels around the pitch-circle with the angular movement of the link $R^{53}$, due to the eccentricity of the wheel $R^{48}$.

In the machine from the working drawings of which the illustrative figures referred to were reduced the piston $R^{40}$ moves the crank $R^{43}$ one hundred and forty-four degrees—from seventy-two degrees below to seventy-two degrees above the transverse axis—thereby causing the differential crank-motion $R^{38}$ to rotate the valve-crank $R^{35}$ two hundred and ten degrees. The lock in the next stage of the cycle moves the crank $R^{35}$ one hundred and fifty degrees, completing its revolution, and through the differential crank-motion R³⁸ rotates the crank R⁴³ two hundred and sixteen degrees, completing its revolution.

In this apparatus a piston-valve with cup-packing is used as an automatic cut-off valve, and there is necessarily an uncertain and variable "slip" in the point of cut-off. The positive differential crank-motion takes up the slip twice in a complete cycle, each time returning the apparatus to a positive point of departure by the contact of the piston R⁴⁰ with the head R⁴⁶.

It has been recited that the lock motions are adjustable to varying heights of the water-surfaces in the upper and lower levels, so that the locks will automatically stop and come to rest in proper relation thereto, a function of the highest importance, as it permits the engineer to build his canals without waste-weirs and utilize his levels for water-storage, making the overflow-points high enough to retain a very high stage of water and the sills and other points limiting the navigable draft low enough to give the desired draft at very low stages, the variation being taken up in the locks automatically in the lower level, and when they are elevated by adjustment of the automatic stop apparatus to the upper level the capacity to make the joints between the lock and head-wall openings 18 and 4 at any desired stage being obtained by simply extending downwardly the apron $a$ on the lock, against which the dilatable rubber jointing-pipe 4ᶜ impinges. The necessity is involved of correspondingly lengthening the hydraulic cylinders K⁶ and rams K¹⁰ of the hydraulic stops K³, so that at different stages of water in the upper level there will be idle sections therein, and as the cylinders are inverted when the lock descends the ram will follow it down and hang with its full length out of the cylinder, and were it not guarded against the downward motion of the rams after the hydraulic valve $h$ is closed would tend to cause vacuum in the cylinders and indraft of air past the packings into the cylinders, which would be objectionable. This is prevented, and at the same time the extra length of the cylinders is utilized for buffer purposes by locating a vacuum-chamber K¹⁶ about forty feet above each hydraulic engine K³, connecting it with the hydraulic piping by a branch K¹² and extending a branch K¹³ upward from the vacuum-chamber K¹⁶, in which is provided a pet-valve K¹⁴ and a shock device, consisting in a coiled pipe K¹⁵, (shown in plan in Fig. 76,) which descends uniformly from its point of connection with the branch K¹³ to its closed outer end, so as not to make an air-trap. When the hydraulic ram K¹⁰ depends in the position shown in Fig. 69, fluid from the vacuum-chamber K¹⁶ flows into the cylinder K⁶. When the rising lock first engages the stops, and before the hydraulic valve $h$ is opened to connect them with the hydraulic accumulator, fluid is forced from the cylinders K⁶ through the hydraulic pipes into the vacuum-chambers K¹⁶, the frictional resistance serving to buffer the motion. Air which may gather in the system can be discharged when the valve $h$ is open by the pet-valve K¹⁴, and if automatic shock-valves of any well-known type were used in lieu of the hand-operated valves such air would be discharged every time the lock ascended. The coiled tube K¹⁵ acts on the well-known principle, utilized in pressure-gages, that a curved pipe tends to be straightened by internal pressure, because the mean-pressure surfaces perpendicular to the radius of convexity vary on the convex and on the concave side, their ratio being as the radii from the center of gravity of the semicircles which are elements of them.

Figs. 15 and 16 show a preferred setting for a battery of locks intended to overcome a considerable lift. The upper level 1 is separated from the lower level 2 by an intermediate level 200; a pair of locks are located in the lower level 2, adapted to lock vessels between it and the intermediate level 200, and a similar pair in the intermediate level, adapted to lock vessels between it and the upper level 1. An accumulator B¹⁰, having a compressed air-chamber somewhat larger than the air-chamber of one of the locks, is located at any convenient point. The air conduits and valves are so disposed that the locks can be worked either parallel or in tandem or in balance with the accumulator. For example, any lock, as A, connecting the upper and intermediate levels, can be worked in balance with its mate AA, or with either of the locks A′, A A′, connecting the intermediate and lower levels, or it can be worked with the accumulator B. A preferred type of valvular control for the air-conduits of such a system is shown in Figs. 17 and 18. The separate conduits 13 from each lock and the accumulator are led to a central valve system, in which five main U-trap valves of the type hereinbefore described are so disposed that one leg of each connects with a manifold or central dome 14ᶻ, and connection may be quickly and easily made between the air-chambers of any desired members of the organization by unsealing the corresponding valves.

In the operation of a lock apparatus of the character herein set forth the personal equation should be eliminated, so that the operator's carelessness may not injure the plant by initiating one of the functions out of proper sequence or when the antecedent function is not yet completed. The principal dangers to which such an apparatus is liable are, first, initiating the upstroke of the depressed lock while the gates thereof are open, in which case the water would run out of the lock-chamber, and were no provision made to relieve or counteract the lifting-force the motion would be unduly accelerated, the rising lock would come in violent contact with its stops, and the apparatus would be unduly strained; second, initiating the downstroke of the elevated lock while its lock-chamber is connected with the upper level and the gates are open, in which event the vessel in the lock would probably be swamped; third, opening the gates when they should remain closed; fourth, operating the main air-valve in the air-conduit when the gates are not properly seated or before the locks have fully completed their stroke or when proper pressures do not obtain in the compressed-air charge, in which latter case the motion of translation, if initiated, cannot be properly completed because of lack of a sufficient store of power.

To eliminate the personal equation of the operator and to absolutely prevent such or any improper or wrongly-timed functioning of the lock-apparatus accessories, I have provided a sequence machine or interlocker, which is indicated diagrammatically in its relation to the apparatus at J, Figs. 66 and 67, and does not in and of itself form part of my present invention.

In order to prevent damage to the gates by concussion of boats, which may accidentally ram them, I provide in each such gate a cushioning device $18^h$ in the form of a plurality of elastic trusses or frames, similar to that described in my pending application, Serial No. 647,941, filed August 12, 1897. Each such truss is crescent-shaped, conforming, substantially, to the shape of the gate, and has an outer tension-chord $18^t$ and an inner compression-chord $18^j$, the outer chord being made in a curve of radius slightly exceeding the radius of the gate and the inner chord curved in the same direction, but to a much greater radius. The chords are suitably united at their ends, preferably by shoes $18^k$, and elastic web members $18^m$, preferably in the form of coiled springs, are interposed between the chord members $18^t$ and $18^j$. The outer or tension chord $18^t$ clears the outer skin of the gate, and the inner or compression chord $18^j$ extends beyond the inner face thereof considerably into the lock-chamber, and the trusses bear only at their ends, preferably on sliding shoes $18^n$. Adjusting devices $18^o$, preferably in the form of gibs $18^p$, adapted to be set up by bolts $18^r$, are provided, by means of which the trusses can be set in proper relation to the gate. The operation of this device is as follows: A body which would otherwise ram and possibly injure the gate delivers its blow upon the inwardly-projecting chords $18^j$ of the trusses, which are thereby deflected, the momentum of the boat being absorbed by the elastic resistance of the trusses and the consequent strain being sustained thereby and delivered directly to the gate-post without causing strain in the gate. In a truss constructed in the manner above described the outer chord is in tension and the inner chord and all the web members are in compression.

It has been recited that the motion of a movable locking member is gradually arrested or cushioned, so that it may be stopped without jar or shock, the cushioning of the upward motion being effected by the yielding resistance of the hydraulic stops K and of the downward motion by the gradual immersion of the floats O. A further and more readily adjustable method of cushioning the apparatus is by throttling the connection between the air-chambers 7 of the movable locking members. While this can be satisfactorily accomplished in many ways, the preferred method is to so proportion and locate the connections and outlets of the air-conduit section 9 on the movable locking member that the discharge is automatically throttled by the member itself at the desired points in its motion. This function of the movable member is illustrated in Figs. 24, 25, 96, 97, and 98.

As illustrated in Figs. 24 and 25, the upper end of the vertically-extending conduit-section $9^c$ is cut off so as nearly to fit the form of the wall of the U bend $13^k$. When used in this way, the movable conduit-section should be so light as to be supported by the compressed air. When so constructed and operated, the shaped upper end of the section $9^c$ will gradually approach the wall of the return-bend $13^k$ near and at the upper limit of the stroke of the movable member and automatically throttle the air connection. In order to cushion the downward motion, the connection of the conduit-section 9 with the air-chamber 7 is so located with reference to the lock-floor 71 that as the movable member approaches the lower limit of its stroke the inlet of the conduit-section 9 is gradually immersed, so that its discharge capacity is gradually reduced, and finally the inlet is wholly immersed before the floor 71 comes in contact with the water, so that a body of compressed air is retained in the air-chamber 7, forming a permanent cushion between the floor and the surface of the water within the said air-chamber.

Figure 98:
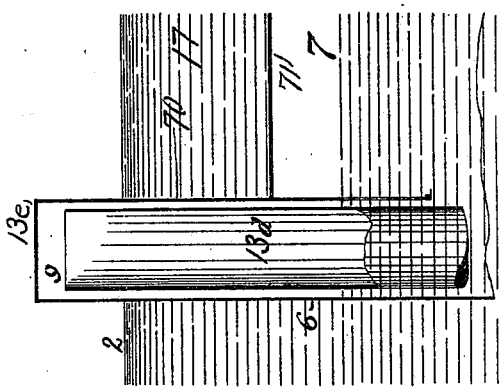
Figure 97:
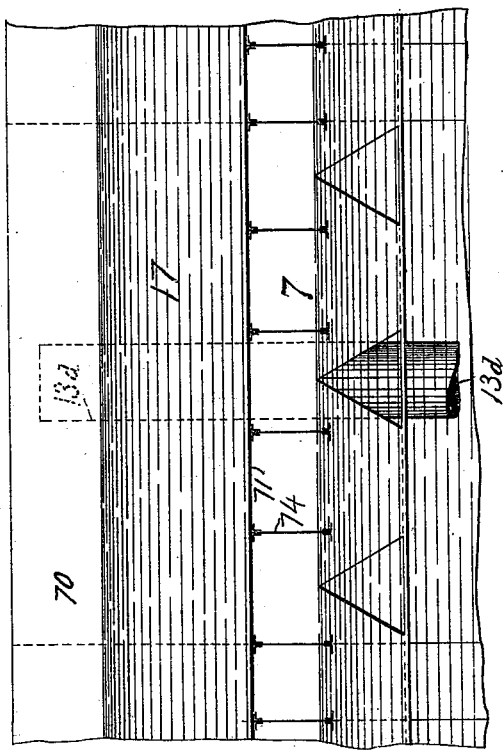

The construction shown in Figs. 96, 97, and 98 has similar functions, hood $13^e$, which registers with the stand-pipe extensions $13^d$ of the conduit 13, having its inner lower wall suitably extended below the floor 71 and serrated or notched on its lower edge, or it may be pierced with openings, so that the sealing of said wall in the water within the air-chamber 7 will be graduated, as and for the purpose above set forth.

I claim as my invention and desire to secure by Letters Patent—

1. In an automatically-operating pneumatic-balance-lock apparatus, the combination, substantially as set forth, of upper and lower levels in a waterway, gated openings in the upper level, two movable locking members adapted to float and operate in water, each having upper floats and an upper, gated, lock-chamber adapted to register and connect with one of the gated openings of the upper level, and a downwardly-opening air-chamber adapted to retain a compressed-air charge by permanently sealing the lower walls thereof in water, the maximum air-pressure being such as to expel from the air-chamber of the movable locking member when elevated, a volume and weight of water exceeding by a determinate amount, the weight thereof, and render it superbuoyant when elevated; the movable members being adapted to automatically vary the air-pressure of the contained charge of compressed air between the maximum and the minimum, in successive positions of their cycle of motion, anchors restraining the movable locking members, when elevated and superbuoyant, and a valve-controlled air-conduit, adapted to connect and disconnect the air-chambers of the movable locking members.

2. In an automatically-operating pneumatic-balance-lock apparatus, the combination, substantially as set forth, of upper and lower levels in a waterway, gated openings in the upper level, two movable locking members adapted to float and operate in water, each having upper floats and an upper, gated, lock-chamber adapted to register and connect with one of the gated openings of the upper level, and a downwardly-opening air-chamber adapted to retain a compressed-air charge by permanently sealing the lower walls thereof in water, the maximum pressure being such as to expel from the air-chamber of the movable locking member when elevated, a volume and weight of water exceeding by a determinate amount, the weight thereof, and render it superbuoyant when elevated; the movable members being adapted to automatically vary the air-pressure of the contained charge of compressed air between the maximum and the minimum, in successive positions of their cycle of motion, anchors restraining the movable locking members, when elevated and superbuoyant, a valve-controlled air-conduit, adapted to connect and disconnect the air-chambers of the movable locking members, and a constantly-weighted pneumatic accumulator.

3. In an automatically-operating pneumatic-balance-lock apparatus, the combination, substantially as set forth, of upper and lower levels in a waterway, gated openings in the upper level, two movable locking members adapted to float and operate in water, each having an upper, gated, lock-chamber adapted to register and connected with one of the gated openings of the upper level, and a downwardly-opening air-chamber adapted to retain a compressed-air charge by permanently sealing the lower walls thereof in water, the maximum air-pressure being such as to expel from the air-chamber of the movable locking member when elevated, a volume and weight of water exceeding by a determinate amount, the weight thereof, and render it superbuoyant when elevated; the movable members being adapted to automatically vary the pressure of the contained charge of compressed air between the maximum and the minimum, in successive positions of their cycle of motion, anchors restraining the movable locking members, when elevated and superbuoyant, a valve-controlled air-conduit, adapted to connect and disconnect the air-chambers of the movable locking members, and an auxiliary synchronizing and leveling apparatus connected with each of the movable locking members, and hydraulic stops.

4. In an automatically-operating pneumatic-balance-lock apparatus, the combination, substantially as set forth, of upper and lower levels in a waterway, gated openings in the upper level, two movable locking members adapted to float and operate in water, each having an upper, gated, lock-chamber adapted to register and connect with one of the gated openings of the upper level, and a downwardly-opening air-chamber adapted to retain a compressed-air charge by permanently sealing the lower walls thereof in water, the maximum air-pressure being such as to expel from the air-chamber of the movable locking member when elevated, a volume and weight of water exceeding by a determinate amount, the weight thereof, and render it superbuoyant when elevated; the movable members being adapted to automatically vary the air-pressure of the contained air charge of compressed air between the maximum and the minimum, in successive positions of their cycle of motion, anchors restraining the movable locking members, when elevated and superbuoyant, a valve-controlled air-conduit, adapted to connect and disconnect the air-chambers of the movable locking members, an auxiliary synchronizing and leveling apparatus connected with each of the movable locking members, hydraulic stops, and a hydraulic accumulator.

5. In an automatically-operating pneumatic-balance-lock apparatus, the combination, substantially as set forth, of upper and lower levels in a waterway, gated openings in the upper level, two movable locking members adapted to float and operate in water, each having an upper, gated, lock-chamber adapted to register and connect with one of the gated openings of the upper level, and a downwardly-opening air-chamber adapted to retain a compressed-air charge by permanently sealing the lower walls thereof in water, the maximum air-pressure being such as to expel from the air-chamber of the movable locking member when elevated, a volume and weight of water exceeding by a determinate amount, the weight thereof, and render it superbuoyant when elevated; the movable members being adapted to automatically vary the air-pressure of the contained charge of compressed air between the maximum and the minimum, in successive positions of their cycle of motion, anchors restraining the movable locking members, when elevated and superbuoyant, a valve-controlled air-conduit, adapted to connect and disconnect the air-chambers of the movable locking members, an auxiliary synchronizing and leveling apparatus connected with each of the movable locking members, hydraulic stops, and a hydraulic accumulator-intensifier adapted to give two pressures.

6. In an automatically-operating pneumatic-balance-lock apparatus, the combination, substantially as set forth, of upper and lower levels in a waterway, gated openings in the upper level, two movable locking members adapted to float and operate in the water in the lower level, each having upper floats and an upper, gated, lock-chamber adapted to register and connect with one of the gated openings of the upper level, and a downwardly-opening air-chamber of larger horizontal area than the lock-chamber, and adapted to retain a compressed-air charge by permanently sealing the lower walls thereof in the water in the lower level, the maximum air-pressure being such as to expel from the air-chamber of the movable locking member when elevated, a volume and weight of water exceeding by a determinate amount, the weight thereof, and render it superbuoyant when elevated; and the movable members being adapted to automatically vary the air-pressure of the contained charge of compressed air between the maximum and the minimum, in successive positions in their cycle of motion, anchors restraining the movable locking members, when elevated and superbuoyant, a valve-controlled air-conduit, adapted to connect and disconnect the air-chambers of the movable locking members, and an auxiliary synchronizing and leveling apparatus connected with each of the movable locking members.

7. In an automatically-operating pneumatic-balance-lock apparatus, the combination, substantially as set forth, of upper and lower levels in a waterway, gated openings in the upper level, two movable locking members adapted to float and move vertically in the water in the lower level, each having upper floats and an upper, gated, lock-chamber adapted to register and connect with one of the gated openings of the upper level, and a downwardly-opening air-chamber of larger horizontal area than the lock-chamber, and adapted to retain a compressed-air charge by permanently sealing the lower walls thereof in the water in the lower level, the maximum air-pressure being such as to expel from the air-chamber of the movable locking member, when elevated, a volume and weight of water exceeding, by a determinate amount, the weight thereof, and render it superbuoyant when elevated; and the movable members being adapted to automatically vary the air-pressure of the contained charge of compressed air between the maximum and the minimum, in successive positions in their cycle of motion, anchors restraining the movable locking members, when elevated and superbuoyant, a valve-controlled air-conduit, adapted to connect and disconnect the air-chambers of the movable locking members; an auxiliary synchronizing and leveling apparatus connected with each of the movable locking members, and a constantly-weighted pneumatic accumulator.

8. In an automatically-operating pneumatic-balance-lock apparatus, the combination, substantially as set forth, of upper and lower levels in a waterway, gated openings in the upper level, two movable locking members adapted to float and operate in the water in the lower level, each having an upper, gated, lock-chamber adapted to register and connect with one of the gated openings of the upper level, and a downwardly-opening air-chamber of larger horizontal area than the lock-chamber, adapted to retain a compressed-air charge by permanently sealing the lower walls thereof in the water in the lower level, the maximum air-pressure being such as to expel from the air-chamber of the movable locking member, when elevated, a volume and weight of water exceeding by a determinate amount, the weight thereof, and render it superbuoyant when elevated; the movable members being adapted to automatically vary the air-pressure of the contained charge of compressed air between the maximum and the minimum, in successive positions in their cycle of motion, anchors restraining the movable locking members, when elevated and superbuoyant, a valve-controlled air-conduit, adapted to connect and disconnect the air-chambers of the movable locking members; an auxiliary synchronizing and leveling apparatus connected with each of the movable locking members, and hydraulic stops.

9. In an automatically-operating pneumatic-balance-lock apparatus, the combination, substantially as set forth, of upper and lower levels in a waterway, gated openings in the upper level, two movable locking members adapted to float and operate in the water of the lower level, each having an upper, gated, lock-chamber adapted to register and connect with one of the gated openings of the upper level, and a downwardly-opening air-chamber of larger horizontal area than the lock-chamber, adapted to retain a compressed-air charge by permanently sealing the lower walls thereof in the water in the lower level, the maximum air-pressure being such as to expel from the air-chamber of the movable locking member when elevated, a volume and weight of water exceeding by a determinate amount, the weight thereof, and render it superbuoyant when elevated; the movable members being adapted to automatically vary the air-pressure of the contained charge of compressed air between the maximum and the minimum, in successive positions in their cycle of motion, anchors restraining the movable locking members, when elevated and superbuoyant, a valve-controlled air-conduit, adapted to connect and disconnect the air-chambers of the movable locking members, an auxiliary synchronizing and leveling apparatus connected with each of the movable locking members, hydraulic stops and a hydraulic accumulator.

10. In an automatically-operating pneumatic-balance-lock apparatus, the combination, substantially as set forth, of upper and lower levels in a waterway, gated openings in the upper level, two movable locking members adapted to float and operate in the water in the lower level, each having an upper, gated, lock-chamber adapted to register and connect with one of the gated openings of the upper level, and a downwardly-opening air-chamber of larger horizontal area than the lock-chamber, adapted to retain a compressed-air charge by permanently sealing the lower walls thereof in the water in the lower level, the maximum air-pressure being such as to expel from the air-chamber of the movable locking member when elevated, a volume and weight of water exceeding by a determinate amount, the weight thereof, and render it superbuoyant when elevated; the movable members being adapted to automatically vary the air-pressure of the contained charge of compressed air between the maximum and the minimum, in successive positions in their cycle of motion, anchors restraining the movable locking members, when elevated and superbuoyant, a valve-controlled air-conduit, adapted to connect and disconnect the air-chambers of the movable locking members, an auxiliary synchronizing and leveling apparatus connected with each of the movable locking members, hydraulic stops, and a hydraulic-accumulator intensifier, adapted to give two pressures.

11. The combination of a member adapted to transfer vessels between different levels in a waterway, said member being elastically supported by an upward force, exceeding its weight or downward effort, and downwardly-acting, hydraulic apparatus adapted to be retracted by the movable member, to permit the rising thereof and which by the application of hydraulic power, will be extended, to lower the movable member, and a source of hydraulic power connected with the hydraulic apparatus.

12. The combination of a member adapted to transfer vessels between different levels in a waterway, said member being elastically supported by an upward force, exceeding its weight or downward effort, and downwardly-acting, hydraulic apparatus, adapted to be retracted by the movable member, to permit the rising thereof, and which, by the application of hydraulic power, will be extended, to lower the movable member, a source of hydraulic power connected with the hydraulic apparatus, and a hydraulic accumulator.

13. The combination of a member adapted to transfer vessels between different levels in a waterway, said member being elastically supported by an upward force, exceeding its weight or downward effort, and downwardly-acting, hydraulic apparatus, adapted to be retracted by the movable member, to permit the rising thereof, and which, by the application of hydraulic power, will be extended, to lower the movable member, a source of hydraulic power connected with the hydraulic apparatus, and a hydraulic accumulator-intensifier, connected with said hydraulic apparatus, and adapted to give a lesser pressure, such that when it is acting in the hydraulic apparatus, the movable member will retract it and rise, and a greater pressure, such that when it is acting in the hydraulic apparatus it will extend it and lower the movable member.

14. The combination of a movable member adapted to transfer vessels between different levels in a waterway, said member having an open-bottomed air-chamber with permanently-sealed lower walls, and containing a charge of compressed air, which expels from its air-chamber a weight of water exceeding the weight and downward effort of the movable member, when loaded, and hydraulic apparatus adapted to be retracted by the movable member, to permit the rising thereof, and which, by the application of hydraulic power, will be extended, to lower the movable member, and a source of hydraulic power connected with the hydraulic apparatus.

15. The combination of a movable member adapted to transfer vessels between different levels in a waterway, said member having an open-bottomed air-chamber with permanently-sealed lower walls, and containing a charge of compressed air, which expels from its air-chamber a weight of water exceeding the weight and downward effort of the movable member, when loaded, and hydraulic apparatus adapted to be retracted by the movable member, to permit the rising thereof, and which, by the application of hydraulic power, will be extended, to lower the movable member, a source of hydraulic power connected with the hydraulic apparatus, and a hydraulic accumulator.

16. The combination of a movable member adapted to transfer vessels between different levels in a waterway, said member having an open-bottomed air-chamber with permanently-sealed lower walls, and containing a charge of compressed air, which expels from its air-chamber a weight of water exceeding the weight and downward effort of the movable member, when loaded, and hydraulic apparatus adapted to be retracted by the movable member, to permit the rising thereof, and which, by the application of hydraulic power, will be extended, to lower the movable member, a source of hydraulic power connected with the hydraulic apparatus, and a hydraulic accumulator-intensifier.

17. In a pneumatic-balance-lock apparatus, the combination, substantially as set forth, of upper and lower levels in a waterway, gated openings in the upper level, movable locking members adapted to float and operate in water, each having a gated lock-chamber adapted to register and connect with one of the gated openings in the upper level, and a downwardly-opening air-chamber adapted to retain a compressed-air charge by permanently sealing its lower walls in water, the maximum air-pressure being such as to expel from the air-chamber of the movable locking member, when elevated, a volume and weight of water exceeding by a determinate amount the weight thereof and render it superbuoyant, when elevated; the movable members being adapted to automatically vary the air-pressure of the contained charge of compressed air between the maximum and the minimum, in successive positions in their cycle of motion, a differential pneumatic accumulator adapted to induce the maximum pressure when elevated and a less pressure when depressed, and valve-controlled air-conduits adapted to connect and disconnect the movable locking members and the differential pneumatic accumulator.

18. In a pneumatic-balance-lock apparatus, the combination, substantially as set forth, of upper and lower levels in a waterway, gated openings in the upper level, movable locking members adapted to float and operate in water, each having a gated lock-chamber adapted to register and connect with one of the gated openings in the upper level, and a downwardly-opening air-chamber adapted to retain a compressed-air charge by permanently sealing its lower walls in water, the maximum air-pressure being such as to expel from the air-chamber of the movable locking member, when elevated, a volume and weight of water exceeding by a determinate amount the weight thereof and render it superbuoyant, when elevated; the movable members being adapted to automatically vary the air-pressure of the contained charge of compressed air between the maximum and the minimum, in successive positions in their cycle of motion, a differential pneumatic accumulator, having a lower open-bottomed air-chamber of horizontal area decreasing from its top toward its bottom, and adapted to give, when elevated, the maximum pressure obtaining in the movable locking members, and to give when depressed a less pressure; and valve-controlled air-conduits adapted to connect and disconnect the movable locking members and the differential pneumatic accumulator.

19. In a pneumatic-balance-lock apparatus, the combination, substantially as set forth, of upper and lower levels in a waterway, gated openings in the upper level, movable locking members adapted to float and operate in water, each having a gated lock-chamber adapted to register and connect with one of the gated openings in the upper level, and a downwardly-opening air-chamber adapted to retain a compressed-air charge by permanently sealing its lower walls in water, the maximum air-pressure being such as to expel from the air-chamber of the movable locking member, when elevated, a volume and weight of water exceeding by a determinate amount the weight thereof and render it superbuoyant, when elevated; the movable members being adapted to automatically vary the air-pressure of the contained charge of compressed air between the maximum and the minimum, in successive positions in their cycle of motion, a differential pneumatic accumulator, adapted to induce the maximum pressure when elevated, and a less pressure when depressed, air-conduits connecting with air-chambers of the movable locking members and the differential accumulator, a U-bend in the conduit connecting the movable locking members, which is adapted to be sealed with water and unsealed, forming a valve controlling said conduits, a descending leg in the conduit connecting with the air-chamber of the differential accumulator, and uniting with the lower part of said U-bend.

20. In a pneumatic-balance-lock apparatus, the combination, substantially as set forth, of upper and lower levels in a waterway, gated openings in the upper level, movable locking members adapted to float and operate in water, each having a gated lock-chamber adapted to register and connect with one of the gated openings in the upper level, and a downwardly-opening air-chamber adapted to retain a compressed-air charge by permanently sealing its lower walls in water, the maximum air-pressure being such as to expel from the air-chamber of the movable locking-chamber, when elevated, a volume and weight of water exceeding by a determinate amount the weight thereof and render it superbuoyant, when elevated; the movable members being adapted to automatically vary the air-pressure of the contained charge of compressed air between the maximum and the minimum, in successive positions in their cycle of motion, a differential pneumatic accumulator, adapted to induce the maximum pressure when elevated and a less pressure when depressed, valve-controlled air-conduits adapted to connect and disconnect the movable locking members and the differential pneumatic accumulator, anchors restraining the movable locking members when elevated and superbuoyant, a constantly-weighted pneumatic accumulator, and auxiliary synchronizing apparatus.

21. In a pneumatic-balance-lock apparatus, the combination, substantially as set forth, of upper, intermediate, and lower levels, two gated openings in the upper level, two movable locking members pneumatically operative in the intermediate level, each adjacent to, and adapted to register and connect with, one of the gated openings in the upper level, two gated openings in the intermediate level, two movable locking members pneumatically operative in the lower level, each adapted to register and connect with one of the gated openings in the intermediate level, a pneumatic accumulator having an air-chamber of sufficient capacity to receive the air charge from one of the movable locking members, when it is descending, or to supply thereto sufficient air to raise it, and air-conduits by which any one of the pneumatically-operative members can be connected with any other.

22. In a pneumatic-balance-lock apparatus, the combination, substantially as set forth, of upper, intermediate and lower levels, two gated openings in the upper level, two movable locking members pneumatically operative in the intermediate level, each adjacent to and adapted to register and connect with, one of the gated openings in the upper level, two gated openings in the intermediate level, two movable locking members pneumatically operative in the lower level, each adapted to register and connect with one of the gated openings in the intermediate level, a pneumatic accumulator having an air-chamber of sufficient capacity to receive the air charge from one of the movable locking members, when it is descending, or to supply thereto sufficient air to raise it, an air-conduit connecting with each of the pneumatically-operative members and leading thence to a common valve, and a valvular mechanism adapted to open or close pneumatic communication between any one of the pneumatic members and any other one.

23. The combination, substantially as set forth, of a movable member, adapted to transfer vessels between different levels in a waterway, and an open-bottomed air-chamber affixed to the movable member, adapted to be lifted clear of the water when the said member is elevated, and immersed or partially immersed when the said member is depressed.

24. The combination, substantially as set forth, of a movable member adapted to transfer vessels between different levels in a waterway, an open-bottomed air-chamber, adapted to be lifted clear of the water when said member is elevated, and immersed, or partially immersed, when said member is depressed, and a valve adapted to discharge the air caught in said chamber as it becomes immersed.

25. The combination, substantially as set forth, of a movable member adapted to transfer vessels between different levels in a waterway, an air-chamber adapted to communicate with the water in which the movable member is operative, and a valve connected with said chamber and adapted to permit the admission of air to said chamber while the movable member is ascending, to retain compressed air therein while descending, and to permit the escape of air after said chamber is immersed.

26. The combination, substantially as set forth, of a movable member adapted to transfer vessels between different levels in a waterway, an open-bottomed air-chamber connected with the movable member and adapted to retain a charge of compressed air by permanently sealing its lower walls in water, and floats connected with the movable member and adapted to float said member in a determinate depressed position.

27. The combination, substantially as set forth, of a movable member having an open-bottomed lower air-chamber with permanently-sealed lower walls, and an open-bottomed cushioning air-chamber which is lifted clear of the water when the movable member is elevated, and when said member is depressed is partially immersed and serves to float the same in a determinate position.

28. The combination, substantially as set forth, of a movable member having a lower open-bottomed air-chamber with permanently-sealed lower walls, an open-bottomed flotation air-chamber, a valve connected with said chamber adapted to discharge air caught when the chamber is immersed, and to retain air subsequently supplied thereto, said chamber being lifted clear of the water when the movable member is elevated and slightly immersed when it is depressed, and means for supplying air to said flotation-chamber after the movable member has been depressed.

29. In a pneumatic balance-lock, the combination, substantially as set forth, of open-bottomed flotation-chambers, which, when the lock is in its lowest position, are slightly immersed, valves connected with the flotation-chambers adapted to permit the escape of the air caught in said chambers as they are immersed, and to retain air subsequently supplied to them, compensating storage-reservoirs placed lower than the flotation-chambers, which are deeply immersed when the lock is in its lowest position, and have bottom openings adapted to communicate with the water in which the lock operates, said reservoirs being adapted to communicate freely with the atmosphere when the lock is ascending, and not to communicate therewith when the lock is descending, and valvular mechanism adapted to remain open while the lock is ascending, to remain closed while the lock is descending, and after the lock has reached its lowest position, to establish communication between the compensating storage-reservoirs and the flotation-chambers.

30. In a pneumatic balance-lock, the combination, substantially as set forth, of open-bottomed flotation-chambers, which, when the lock is in its lowest position, are slightly immersed, valves connected with said chambers adapted to permit the escape of the air caught therein as they are immersed, and to retain air subsequently supplied to them, and compensating storage-reservoirs placed lower than the flotation-chambers, which are deeply immersed when the lock is in its lowest position, and have bottom openings adapted to communicate with the water in which the lock operates, said reservoirs being adapted to communicate freely with the atmosphere when the lock is ascending, and not to communicate therewith when the lock is descending, and automatic valvular mechanism adapted to remain open while the lock is ascending, to remain closed while the lock is descending, and after the lock has reached its lowest position, to establish communication between the compensating storage-reservoirs and the flotation-chambers.

31. The combination, substantially as set forth, of a movable locking member, having an open-bottomed chamber adapted to be slightly immersed when the lock is in its lowest position, and a valve formed of a U-bend, one leg of which rises within the chamber, and the other leg without the chamber, the two legs being connected at the bottom, and a lower hole in the wall of the valve which is small in diameter relatively to the diameter of the legs of the valve.

32. The combination, substantially as set forth, of a movable locking member, and an air-chamber connecting at the bottom with the water in which said member is operative, and provided with an automatic valvular mechanism, consisting in a valve and a rocking mechanism adapted to hold the valve closed while the movable member is descending, to open the valve after the mechanism is immersed, and to keep the valve open while the movable member is ascending.

33. The combination, substantially as set forth, of a movable locking member, with an air-chamber connecting at the bottom with the water in which said member is operative, and provided with an automatic valvular mechanism, consisting in a valve, a rocking mechanism connected with the valve, and two hollow bodies connected with the rocking mechanism, the smaller of said hollow bodies having an open-bottomed air-chamber, and the larger having a water-chamber and a downwardly-opening air-chamber, and provided with a relatively small discharge-opening from each of the said chambers.

34. The combination, substantially as set forth, of a movable locking member, and an air-chamber connecting at the bottom with the water in which said member is operative, and provided with an automatic valvular mechanism, consisting in a valve, a rocking mechanism connected with the valve, and consisting in two walking-beams pivoted one above the other, and two hollow bodies of unequal sizes pivoted on the walking-beams, the smaller having an open-bottomed air-chamber, and the larger being divided into a water-chamber and a downwardly-opening air-chamber, and having a relatively small opening in the air and water chambers.

35. The combination, substantially as set forth, of a movable member having an air-chamber, an air-conduit on *terra firma*, and a hydraulically-sealed telescopic-joint connection between the air-chamber of the movable member and the conduit, consisting in a plurality of vertically-extending conduit-sections, and a like plurality of vertically-depending conduit-sections, each of which registers with one of the vertically-extending conduit-sections, has a controlled motion relatively thereto, and is sealed in a hydraulic seal enveloping the vertically-extending section.

36. The combination, substantially as set forth, of a movable member, having an air-chamber, an air-conduit on *terra firma*, and a hydraulically-sealed telescopic-joint connection between the air-chamber of the movable member and the conduit, consisting in a plurality of water-seal chambers, an equal number of vertically-extending conduit-sections, and an equal number of vertically-depending conduit-sections, each of which is sealed and operative in one of the water-chambers, and has a controlled motion relative thereto.

37. The combination, substantially as set forth, of a movable member, having a downwardly-opening air-chamber, an air-conduit on *terra firma*, vertically-extending conduit-sections on the movable member and on *terra firma*, annular water-chambers formed about the vertically-extending sections, and two vertically-depending conduit-sections, each enveloping one of the vertically-extending sections, and sealed in a water-chamber, the two being united at the top and adapted to be moved vertically substantially one-half of the distance normally traversed by the movable member.

38. The combination, substantially as set forth, of a movable member, having a downwardly-opening air-chamber, an air-conduit on *terra firma*, vertically-extending conduit-sections on the movable member and on *terra firma*, annular water-chambers formed about the vertically-extending sections, and two vertically-depending conduit-sections, each enveloping one of the vertically-extending sections, and sealed in a water-chamber, the two being united at the top and adapted to be moved vertically substantially one-half of the distance normally traversed by the movable member, and counterbalanced to, as nearly as may be, equilibrium with the lifting effort of the compressed air.

39. The combination, substantially as set forth, of a movable member having an air-chamber, a conduit on *terra firma*, a tower having vertical parallel guides, vertically-extending conduit-sections on the movable member and on *terra firma*, annular water-chambers formed about said sections, and vertically-depending conduit-sections, each registering with a vertically-extending section, and sealed in a water-chamber, the depending sections being united at the top, provided with guides engaging the tower-guides, and adapted to be moved vertically between limiting-stops, one on the movable member, the other fixed.

40. The combination, substantially as set forth, of a movable member having an air-chamber, a conduit on *terra firma*, a tower having vertical parallel guides, vertically-extending conduit-sections on the movable member and on *terra firma*, annular water-chambers formed about said sections, vertically-depending conduit-sections each registering with a vertically-extending section, and sealed in a water-chamber, the depending sections being united at the top, and a guide-frame engaging the tower-guides, in which frame the united depending conduit-sections are centrally pivoted, and adapted to be moved vertically.

41. The combination, substantially as set forth, of a movable member having an air-chamber, a conduit on *terra firma*, a tower having vertical parallel guides, vertically-extending conduit-sections on the movable member and on *terra firma*, annular water-chambers formed about said sections, vertically-depending conduit-sections each registering with a vertically-extending section, and sealed in a water-chamber, a guide-frame, pivots, and spring-buffers the depending sections being united at the top, centrally pivoted, and cushioned on the spring-buffers in the guide-frame, which engages the tower-guides, and is vertically movable therein.

42. The combination, substantially as set forth, of a gate having an orbital motion about the vertical axis of a cylindrical seat, a wheel-segment formed on the gate, a wheel meshing therewith and secured on a shaft rotatable in bearings on the wall of the structure supporting the seat, and a pneumatic gate-opening engine geared to said shaft, said engine having a cylinder, a piston working therein, a piston-rod, and a rack attached to the piston-rod and meshing with gearing adapted to rotate the gate.

43. The combination, substantially as set forth, of a gate having an orbital motion about the vertical axis of a cylindrical seating-face, a wheel-segment formed on the gate, a wheel meshing therewith and secured to a shaft rotatable in bearings on the structure supporting the seat, a chain sprocket-wheel secured to said shaft, a pneumatic gate-engine having a cylinder, a piston, a piston-rod, a rack secured thereto, a pinion meshing therewith and secured to a shaft rotatable in bearings and having a chain sprocket-wheel, and a chain connecting the two chain sprocket-wheels.

44. The combination, substantially as set forth, of a gate and a pneumatic gate-engine having an air-supply pipe, and an exhaust-passage controlled by an automatic choke-valve.

45. The combination, substantially as set forth, of a gate, a seat on which said gate makes a tight joint, a gear-segment formed on the gate, a gear-wheel meshing therewith, secured on a shaft rotatable in bearings on the wall of the structure supporting the seat, a pneumatic gate-operating engine, a piston working therein, and a rack attached to the piston-rod and meshing with rotatable gearing connected with the shaft.

46. The combination, substantially as set forth, of a movable member adapted to transfer vessels between different levels in a waterway, engagement-stops, and a retractable engaging piece adapted, when extended, to engage, and when retracted, to pass the engagement-stops.

47. The combination, substantially as set forth, of a movable member adapted to transfer vessels between different levels in a waterway, engagement-stops, a retractable engaging piece, and mechanism for retracting the same.

48. The combination, substantially as set forth, of a movable member adapted to transfer vessels between different levels in a waterway, a bracket secured to the wall of the movable member, a pivotal bearing formed in the bracket, an engaging piece pivoted thereon, an abutment against which the other end of the engaging piece bears when extended, and mechanism for extending and retracting the engagement-piece.

49. The combination, substantially as set forth, of a bracket, suspenders at the outer side thereof, a stirrup, a filler in the stirrup, a shoe fitted to the filler adapted to move in guides and provided with a pivotal bearing, an engaging piece pivotally supported therein, an abutment against which the other end of the engagement-piece bears, when it is extended, and mechanism for retracting and extending the engaging piece.

50. An engagement-piece, formed of an open metal frame, connected with a timber strut, one end of which is adapted to pivotally support the engaging piece, and the other is pivotally connected with a swiveled contact-block, having a slight vertical motion in parallel guides secured on the metal frame.

51. The combination, substantially as set forth, of a pneumatic lock, having a lock-chamber, and a lower air-chamber, a relief-valve case connecting with the air-chamber, a float operative in the water of the lock-chamber, and a valve adapted to cover and uncover ports in the valve-case when the water in the lock-chamber is respectively at and below a safe stage.

52. The combination, substantially as set forth, of an air-chamber and a water-chamber, a cylindrical valve-case extending into the air-chamber, ports in the valve-case, an open-ended cylindrical valve working in the case, a hollow float, and a passage connecting the interior of the float with the face of the valve between the packings thereof.

53. The combination, substantially as set forth, of an air-conduit, a U-bend or trap therein, a water-supply, feed and waste water pipes connecting with the trap, and pneumatic weirs adapted to control the flow of water through the feed and waste pipes.

54. The combination, substantially as set forth, of an air-conduit, a U-bend or trap therein, a water-supply, feed and waste water pipes connected with the trap, an upper bend in each of said pipes, an air-supply to each of said upper bends, and a valve controlling the feed and exhaust of compressed air to and from said bends.

55. The combination, substantially as set forth, of an air-conduit, a U-bend or trap therein, a water-supply, a feed-water pipe connected with the trap, descending to a bend, ascending to an upper bend, descending to another bend, and ascending to its connection with the water-supply, a waste-water pipe, connected with the trap, descending to a bend, ascending to an upper bend, and descending to an outlet permanently sealed in water, an air-supply, and air-pipes connecting the upper bends of the feed and waste water pipes with an air-valve controlling the feed and exhaust of compressed air to and from said bends.

56. In a pneumatic weir, the combination, substantially as set forth, of a water-supply, a compressed-air supply, a water-conduit connected with the water-supply by a supply branch, and having an upper bend located lower than the water-supply level, a discharge branch having a discharge lower than the bend, and adapted to be sealed with water of sufficient depth to balance and retain the compressed-air pressure, a gathering-reservoir, connected with and located above, and to the discharge side of, the lowest point of the descending limb of the discharge branch, a valve-controlled compressed-air-supply pipe connected with the upper bend, and an air-circulating pipe connecting the gathering-reservoir with the upper bend.

57. The combination, substantially as set forth, of upper and lower levels in a waterway, a gated opening in one of said levels, a movable locking member having a lock-chamber adapted to register a gated opening with the gated opening in the level, a water-supply, a feed-water pipe and a waste-pipe connected with the space inclosed between the gates and the walls of the openings of the level, and the movable member, pneumatic weirs formed one in the water-feed pipe and the other in the water-waste, and valve-controlled compressed-air service-pipes connecting the weirs with a source of compressed air.

58. The combination, substantially as set forth, in a waterway, of a lower level, and an upper level, a gated opening in one of said levels, a movable locking member having a lock-chamber, adapted to register a gated opening with the gated opening of the level, jointing-faces at right angles with their axes, a dilatable packing-pipe secured to one face, and a contact-surface on the other face, against which the packing-pipe bears when dilated, the latter being downwardly extended in an apron to provide for making joints at varying stages of water.

59. The combination, substantially as set forth, of a movable member, adapted to engage a hydraulic stop, a hydraulic stop, a controlling hydraulic valve, a hydraulic supply-pipe, and a branch thereof extending upward and provided with a closed chamber.

60. The combination, substantially as set forth, of a movable member adapted to engage a hydraulic stop, a hydraulic stop, a controlling hydraulic valve, a hydraulic supply-pipe, a branch thereof extending upward and provided with a cushion device consisting in a pipe-coil having a closed outer end from which the coil-pipe ascends to its union with the hydraulic pipe.

61. The combination, substantially as set forth, of a movable locking member having a gated lock-chamber, an interlocking apparatus controlling the sequential operations of the movable member, and a lock device connected with the interlocking apparatus and the gate or gates, said lock device being unlocked when the gates are closed and properly seated, and locked at other times.

62. The combination, substantially as set forth, of a movable locking member having a gated lock-chamber, an interlocking apparatus controlling the sequential operations of the movable member, a lock device connected with the interlocking apparatus and operated automatically by compressed air, a source of compressed air, a valvular mechanism connected with the gate and adapted to open and close a valve controlling the air-supply, when the gate is seated and unseated, and an air-pipe connecting the valvular mechanism with the lock device of the interlocking apparatus.

63. The combination, substantially as set forth, of an interlocking apparatus, a stop device connected therewith operative by compressed air, a gate transmission-gear adapted to open and close a gate, a valvular mechanism connected with the transmission-gear, a governing-valve therein operative by the transmission-gear, and air-supply pipes connecting the valve with a source of compressed air and with the stop device.

64. The combination, substantially as set forth, of a gate, transmission-gear adapted to open and close said gate, a worm-gearing operated by the transmission-gear, a cam connected with the worm-gear, a valve, and a lever actuated by the cam and controlling the valve.

65. The combination, substantially as set forth, of a movable locking member, a hydraulic stop which engages said member, a hydraulic supply, a valve controlling said supply, and an automatic stop-machine adapted to open and close the hydraulic controlling-valve, and geared to the movable locking member.

66. The combination, substantially as set forth, of a movable locking member, a hydraulic stop which engages said member, a hydraulic supply, a valve controlling said supply, an automatic stop-machine adapted to open and close the hydraulic controlling-valve, and a chain-gearing connecting the automatic stop-machine with the movable locking member.

67. The combination, substantially as set forth, of waterway-levels, a gated opening in the upper level, a movable locking member having a gated lock-chamber adapted to register, when elevated, a gated opening with the gated opening of the upper level, a hydraulic stop which engages the movable member, a hydraulic supply, a valve controlling said supply, and an automatic stop-machine geared to the movable member, and adapted to open and close the hydraulic governing-valve, its operating-points being adjustable to varying stages of water in the waterway-levels.

68. The combination, substantially as set forth, of waterway-levels, a gated opening in the upper level, a movable locking member having a gated lock-chamber, which, when elevated, registers its gated opening with the gated opening of the upper level, a hydraulic stop which engages the movable member, a hydraulic supply, a hydraulic controlling-valve, an automatic stop-machine adjustably geared to the movable member, and a dial and pointer connected with the automatic stop-machine, by which said machine may be set to varying water-stages in the waterway.

69. The combination, substantially as set forth, of a shaft, a driving-wheel connected thereto, a differential worm-gearing connected therewith, a reciprocating traveler meshing, by differential threads, with the differential worm, and having also a rack-section and a plane pitch-face, a wheel-segment engaging the traveler, and adapted to be rotated and held stationary, respectively, thereby, a valve, and transmission-gear connecting the traveler and the valve.

70. The combination, substantially as set forth, of a shaft, a driving-wheel adjustably connected thereto, a differential worm-gearing connected therewith, a reciprocating traveler meshing with the differential worm by differential threads, and having also a rack-section and a plane pitch-face, a wheel-segment having a toothed portion adapted to engage the rack of the traveler, and tangential pitch planes adapted to engage its pitch-face, a valve, a crank and crank-shaft connected with and adapted to operate the valve, two ratchet-and-pawl gears on the crank-shaft, and a direct and a reverse transmission-gear, each connecting the segment with one of the ratchet-and-pawl gears, so that the crank-shaft will be turned always in the same direction while the segment reverses.

71. A differential worm-gear having a slow-pitch thread in one portion, a quick-pitched thread in another portion, and a driven member having a quick-pitched thread and a slow-pitched thread, the quick and slow pitch threads of the two members, respectively, engaging in different parts of the motion of the driven member, and giving it a differential motion.

72. The combination, substantially as set forth, of a movable locking member, a hydraulic stop engaging said member, a hydraulic supply, a hydraulic controlling-valve, a crank and crank-shaft operating said valve, transmission-gears connecting the movable member and the crank-shaft, and adapted to open and close the valve thereby, and a positive differential crank motion, independently operating the crank-shaft, taking up the slip of the valve, and restoring the mechanism to fixed positions in its cycle of motion.

73. The combination, substantially as set forth, of a movable locking member, a hydraulic stop engaging said member, a hydraulic supply, a hydraulic controlling-valve, a crank and crank-shaft operating said valve, transmission-gear connecting the movable member and the crank-shaft, rotating it always in the same direction, and adapted to open and close the valve thereby, a positive differential crank motion connected with the crank-shaft, independently operated by a piston moved by compressed air, operating in a cylinder, and linked to a crank connected with an eccentrically-hung spur-gear, a spur-gear on the valve crank-shaft, links, pivoted at one end and centrally, on each of the spur-gears, and at the other ends on a common pin or spindle, and a gear or gears fastened to said spindle, meshing with the spur-gears first named and putting them in train; the outward motion of the piston being adapted to move the connected differential motion less than a half-circle; and the transmission-gear connected with the movable member completing the cycle of motion of the differential crank-motion apparatus.

74. The combination, substantially as set forth, of a movable member adapted to transfer a vessel between different levels in a waterway, and having a lower air-chamber adapted to retain compressed air by sealing its lower walls in water in which it operates, said air-chamber being formed in a tubulous series of sections, open at the bottom, and tubulous series of chambers containing water, in which the sections of the air-chamber work and are sealed in the water therein.

75. The combination, substantially as set forth, of a movable member adapted to transfer vessels between different levels in a waterway, a gated lock-chamber therein, a unital air-chamber extending under the lock-chamber, and a tubulous series of open-bottomed sections connected with and depending therefrom.

76. The combination, substantially as set forth, of a waterway-section, a tubulous series of masonry-lined chambers therein, anchors connected with the masonry, guide-frames connected with the anchors and the masonry, a movable member adapted to transfer vessels between different levels in the waterway, and a tubulous series of lower, open-bottomed, air-chamber sections formed thereon, operative in the tubulous series of chambers of the waterway, and adapted to retain a charge of compressed air by immersing or sealing their lower walls in the water in the chambers.

77. The combination, substantially as set forth, of a movable member adapted to transfer vessels between different levels, and having a gated lock-chamber and a tubulous series of open-bottomed air-chambers adapted to retain compressed air by sealing their lower walls in water, and a tubulous series of water-chambers raised above the general level of the site where the apparatus is located.

78. The combination, substantially as set forth, of a movable member adapted to transfer vessels between different levels, and having a gated lock-chamber and a tubulous series of lower open-bottomed air-chambers adapted to retain compressed air by sealing their lower walls in water, and an open-bottomed air chamber or chambers, attached to the upper portion of a chamber or chambers of the series and which is lifted clear of the water when the movable member is elevated, and immersed or partially immersed when it is depressed.

79. The combination, substantially as set forth, of a movable member having an upper gated lock-chamber and a tubulous series of open-bottomed air-chambers adapted to retain compressed air by sealing the lower walls in water, and an open-bottomed air chamber or chambers, attached to the upper portion of a chamber or chambers of the series, and which is lifted clear of the water and immersed, respectively, when the movable member is elevated and depressed, and is provided with a valve which is adapted to discharge the air caught when said chamber is immersed, and to retain air subsequently supplied thereto.

80. The combination, substantially as set forth, of a movable member having a gated lock-chamber and a tubulous series of open-bottomed air-chambers adapted to retain compressed air by sealing their lower walls in water, and an air chamber or chambers attached to a chamber or chambers of the series, and adapted to communicate with the water in which the movable member is operative, and provided at the top with a valvular mechanism adapted to admit air while the movable member is ascending, retain air while it is descending, and after it is depressed to permit the discharge of air from said chamber.

81. The combination, substantially as set forth, of a tubulous series of water-chambers, a movable member having a gated lock-chamber and a tubulous series of open-bottomed air-chambers operative in the water-chambers and adapted to retain compressed air by sealing their lower walls in the water thereof, one or more chambers of the series being provided with an open-bottomed air-chamber, adapted to be partially immersed, retain air, and cushion the movable member when it is depressed, an open-bottomed air-chamber which is slightly immersed at such time, and is provided with a valve adapted to discharge air caught when the chamber is immersed and to retain air subsequently supplied thereto, and an air chamber or chambers, interior to one or more of the tubulous system, and adapted to communicate with the water in the water-chamber in which it is operative, and provided with a valvular mechanism adapted to admit air while the movable member is ascending, to retain air while it is descending, and, after it is depressed, to permit the discharge of the air from said chamber.

82. The combination, substantially as set forth, of a series of gated aqueducts or waterway-sections elevated above the surface of the ground, at successive levels, a plurality of tubulous series of water-chambers, also elevated in whole or in part, movable locking members, each adapted to connect, alternately, when elevated and depressed, respectively, with the adjacent end of each of two successive aqueduct-sections, and to transfer vessels between them, each movable member having a gated lock-chamber and a tubulous series of open-bottomed air-chamber sections, registering with a tubulous series of water-chambers, and adapted to retain a compressed-air charge by sealing their lower walls in the water thereof, and air-conduits connecting the air-chambers with a source of compressed air.

83. The combination, substantially as set forth, of a waterway-section, a movable member therein adapted to lift a vessel, anchors secured to *terra firma*, rigid frames connected therewith, and adapted to guide the movable member during its translation, stirrups secured to the frames, and hydraulic stops secured in the stirrups and adapted to engage the movable member.

84. The combination, substantially as set forth, of a movable member adapted to lift a vessel and operative in a waterway-section, an open-bottomed air-chamber thereon, having metal walls, and adapted to retain compressed air by sealing its lower walls in water, and a bottom section made of timber and united to the metal structure.

85. The combination, substantially as set forth, in a movable member adapted to lift vessels, in a waterway-section, and having a lower air-chamber adapted to retain compressed air, of a series of transverse plates forming the roof of the air-chamber, and a series of transverse frames or girders with strut and tie members, secured at the ends to the walls of the air-chamber, and disposed in pairs, one united to each edge of a transverse floor-plate and having the adjacent strut members laced together.

86. The combination, substantially as set forth, of upper and lower levels in a waterway, a gated opening in the upper level, and a movable locking member adapted to transfer vessels between them, having a gated lock-chamber adapted to retain water to a depth and draft exceeding the draft of the vessels, and when elevated to register with a gated opening in the upper level, and to be vertically movable after it is connected therewith and the gates are opened.

87. The combination, substantially as set forth, of upper and lower levels in a waterway, a gated opening in the upper level, and a movable locking member adapted to transfer vessels between them, floating and operative in the lower level, and having a gated lock-chamber adapted to retain water; said movable member having open-bottomed air-chambers adapted to cushion its descent, and to float it at a desired level relatively to the water-surface in the lower level, and, by the subsequent admission of air to said air-chambers, to cause said movable member to rise slightly and float at a desired higher level.

88. The combination, substantially as set forth, of upper and lower levels in a waterway, a movable member adapted to float and be vertically movable in the lower level, and having a gated lock-chamber adapted to retain water, open-bottomed air-chambers adapted to cushion the descent of the movable member and to float it at a desired level relatively to the water-surface in the lower level, and, when subsequently supplied with air, to cause the movable member to float at a desired higher level, and means for compressing air during the descent of the movable member and of subsequent automatically supplying it to said open-bottomed air-chambers.

89. The combination, substantially as set forth, of a lock apparatus having a gated lock-chamber, a gate controlling an opening thereto, an engine adapted to operate the gate, an interlocking apparatus adapted to control in a determined sequence the operations necessary to manipulate the lock apparatus, a valve connected with the interlocking apparatus, adapted to control the operation of the gate-engine, a stop device connected with the valve, a control device connected with the gate, and fluid transmission between the stop device of the valve and the control device of the gate, whereby the stop device is caused to engage the valve when the gate is not properly seated, and disengage it when the gate is properly seated.

90. The combination, substantially as set forth, of a lock apparatus, having a gated lock-chamber, a gate controlling an opening thereto, an engine adapted to operate the gate, an interlocking apparatus adapted to control in a determined sequence the operations necessary to manipulate the lock apparatus, a valve connected with the interlocking apparatus adapted to control the power-supply to the gate-engine, a stop device connected with the valve, having a movable abutment and an engaging piece adapted to engage and disengage the valve, a control device connected with the gate and having a valvular mechanism adapted to operate a valve thereof, a source of compressed air connected with the valvular mechanism, and a pipe connecting the valve thereof with the stop device on the interlocking apparatus, whereby fluid-pressure, controlled by the gate in its motion, can be transmitted to the stop device, and cause it to engage and disengage the valve thereof.

91. The combination, substantially as set forth, of a lock apparatus, with upper and lower waterway-levels, a gated opening in the upper level, a movable member adapted to transfer vessels between said levels, and having a lock-chamber with gated openings, the inboard one of which is adapted to register and connect with the upper-level opening, gates controlling the openings, engines adapted to open and close the gates, an interlocking apparatus adapted to control in determined sequence the operations necessary to manipulate the lock apparatus, a stop device connected with the interlocking apparatus, a source of fluid-pressure exterior to the outboard lock-gate, fluid transmission thence to the stop device of the interlocking apparatus, stop and waste valves at each gate adapted to cut off the fluid transmission thence to the stop device of the interlocking apparatus, and to waste it on the side nearest the interlocking apparatus, and a valvular mechanism connected with each gate adapted to open and close one of said stop and waste valves, and to control the fluid transmission to the stop device of the interlocking apparatus and to waste it therefrom.

92. The combination, substantially as set forth, of a lock apparatus, with upper and lower waterway-levels, a gated opening in the upper level, a movable member adapted to transfer vessels between said levels and having a gated lock-chamber with gated openings, the inboard one of which is adapted to register and connect with the upper-level opening, gates controlling the openings, fluid-operated engines adapted to open and close the gates, a source of fluid-pressure connected with a valve or valves, a valve or valves controlling the fluid transmission by two branch pipes, one of which is connected with the engine operating the upper-level gate, check-valves in the branches, which branches are united beyond said check-valves, a distributing-pipe connected with said branches, and with both the lock-gate engines, and an automatic float-valve controlling said pipe between the lock-gate engines.

93. The combination, substantially as set forth, of upper and lower waterway-sections, a movable locking member adapted to connect and transfer vessels between said sections, and means for automatically controlling the motions of said locking member in their proper sequence.

94. The combination, substantially as set forth, of a movable locking member provided with a downwardly-opening air-chamber adapted to retain a compressed-air charge by permanently sealing its lower walls in water, and a conduit-section connected therewith, the inlet of the connection of the conduit-section with the air-chamber being adapted to be gradually immersed near and at the lower limit of the stroke of the movable member.

95. The combination, substantially as set forth, of a movable member, having a downwardly-opening air-chamber adapted to retain a compressed-air charge by permanently sealing its lower walls in water, a conduit-section connected therewith, and means for automatically throttling the discharge of air from the movable member near and at the limits of its motion.

96. The combination, substantially as set forth, of a movable member having a downwardly-opening air-chamber, adapted to retain a compressed-air charge, by permanently sealing its lower walls in water, a conduit-section connected therewith, and a telescopic pipe-joint connecting the movable member with a conduit on *terra firma*, the outer end of the conduit-section, connected to the movable member, being shaped to approximately fit a wall of the telescopic-joint connection.

97. The combination, substantially as set forth, of a gate controlling an opening adapted to the passage of vessels, and a buffer adapted to cushion the impact of vessels.

98. The combination, substantially as set forth, of a gate controlling an opening adapted to the passage of vessels, and an elastic buffer supported only at its ends, and adapted to cushion the impact of vessels without straining the gate.

99. The combination, substantially as set forth, of a gate controlling an opening adapted to the passage of vessels, and a buffer formed in a plurality of elastic frames, supported only at the ends, and adapted to cushion the impact of vessels without straining the gate.

100. The combination, substantially as set forth, of upper and lower levels in a waterway, a gated opening in one of said levels, a movable locking member having a lock-chamber adapted to register a gated opening with the gated opening in the level, a water-supply, a feed-water pipe connected with the space inclosed between the gates and the walls of the openings of the level and the movable member, a pneumatic weir formed in the feed-water pipe, and a valve-controlled pipe connecting said pneumatic weir with a source of compressed air.

101. The combination, substantially as set forth, of upper and lower levels in a waterway, a gated opening in one of said levels, a movable locking member having a lock-chamber adapted to register a gated opening with the gated opening in the level, a water-supply and a water-waste pipe connected with the space inclosed between the gates and the walls of the openings of the level and the movable member, a pneumatic weir formed in the water-waste pipe, and a valve-controlled pipe connecting said pneumatic weir with a source of compressed air.

102. The combination, substantially as set forth, of upper and lower levels in a waterway, a gated opening in one of said levels, a movable locking member adapted to register a gated opening with the gated opening of the level, jointing faces on the level and on the movable member, and a packing-pipe adapted to be attached to one of the jointing faces by a substantially central projection, and to be connected with a source of compressed air, said jointing pipe being so fabricated that it will lie flat when deflated, and can be inflated with compressed air so as to fill and pack the space between the jointing faces.

103. In a pneumatic-balance-lock apparatus, the combination, substantially as set forth, of upper and lower waterway-sections, and a movable locking member having an upper gated lock-chamber and a lower downwardly-opening air-chamber with permanently-sealed lower walls and connected with a source of compressed air; said movable locking member being adapted to connect and transfer vessels between said sections and to automatically control its own motions in their proper sequence.

104. In a pneumatic-balance-lock apparatus, the combination, substantially as set forth, of waterway-sections, two movable locking members each adapted to connect and transfer vessels between two of said sections and provided with a gated lock-chamber and a downwardly-opening air-chamber with its lower walls permanently sealed, said air-chambers being adapted to contain a charge of compressed air to float and operate the said members, and a valve-controlled air-conduit adapted to connect the said air-chambers of said locking members; each of said movable locking members being provided with means to automatically control its own motions in their proper sequence, and in the act of descending to its lowest position, to induce in the compressed-air charge a predetermined maximum pressure, which, acting in the elevated locking member, will induce therein a lifting effort which will exceed the weight of said member and its normal load by a predetermined amount.

CHAUNCEY N. DUTTON.

Witnesses:
PAUL F. DIEDRICH,
PAUL SERNOE.